(12) United States Patent
Zhang et al.

(10) Patent No.: US 12,347,854 B1
(45) Date of Patent: Jul. 1, 2025

(54) SILICON DOMINANT ANODES CONTAINING PYROLYZED CARBON

(71) Applicant: Enevate Corporation, Irvine, CA (US)

(72) Inventors: Qing Zhang, Irvine, CA (US); Ian Browne, Irvine, CA (US); Younes Ansari, Irvine, CA (US); Benjamin Yong Park, Irvine, CA (US); Rahul Kamath, Irvine, CA (US)

(73) Assignee: Enevate Corporation, Irvine, CA (US)

( * ) Notice: Subject to any disclaimer, the term of this patent is extended or adjusted under 35 U.S.C. 154(b) by 0 days.

(21) Appl. No.: 18/736,855

(22) Filed: Jun. 7, 2024

(51) Int. Cl.
*H01M 4/38* (2006.01)
*H01M 4/04* (2006.01)
*H01M 4/62* (2006.01)
*H01M 10/0525* (2010.01)
*H01M 4/02* (2006.01)

(52) U.S. Cl.
CPC ......... *H01M 4/386* (2013.01); *H01M 4/0404* (2013.01); *H01M 4/0471* (2013.01); *H01M 4/622* (2013.01); *H01M 4/625* (2013.01); *H01M 10/0525* (2013.01); *H01M 2004/027* (2013.01)

(58) Field of Classification Search
None
See application file for complete search history.

(56) References Cited

U.S. PATENT DOCUMENTS

2019/0088922 A1\* 3/2019 Zhamu .................... C01B 33/00

\* cited by examiner

*Primary Examiner* — Wyatt P McConnell
(74) *Attorney, Agent, or Firm* — McAndrews, Held & Malloy, Ltd.

(57) ABSTRACT

Systems and methods utilizing aqueous-based polymer binders for silicon-dominant anodes containing pyrolyzed carbon may include an electrode coating layer on a current collector, where the electrode coating layer is formed from silicon and a water soluble polymer and may comprise one or more additional materials. The electrode coating layer may include more than 70% silicon and the anode may be in a lithium ion battery.

17 Claims, 33 Drawing Sheets

High Si slurry formulations

| Pyrolyzed Anode | 90:10[1] | 94:6[1] | 96:4[1] | 94:2:4[2] |
|---|---|---|---|---|
| Slurry Composition[3] | | | | |
| Silicon | 26.16% | 38.14% | 48.56% | 47.55% |
| Water-soluble PAI Binder | 73.72% | 61.74% | 51.32% | 51.33% |
| Super P | - | - | - | 1.01% |
| Surfactant | 0.12% | 0.12% | 0.12% | 0.11% |

FIG. 20

[1] Si : Pyrolytic Carbon
[2] Si : Carbon : Pyrolytic Carbon
[3] Viscosity adjusted with DI water to match coating process

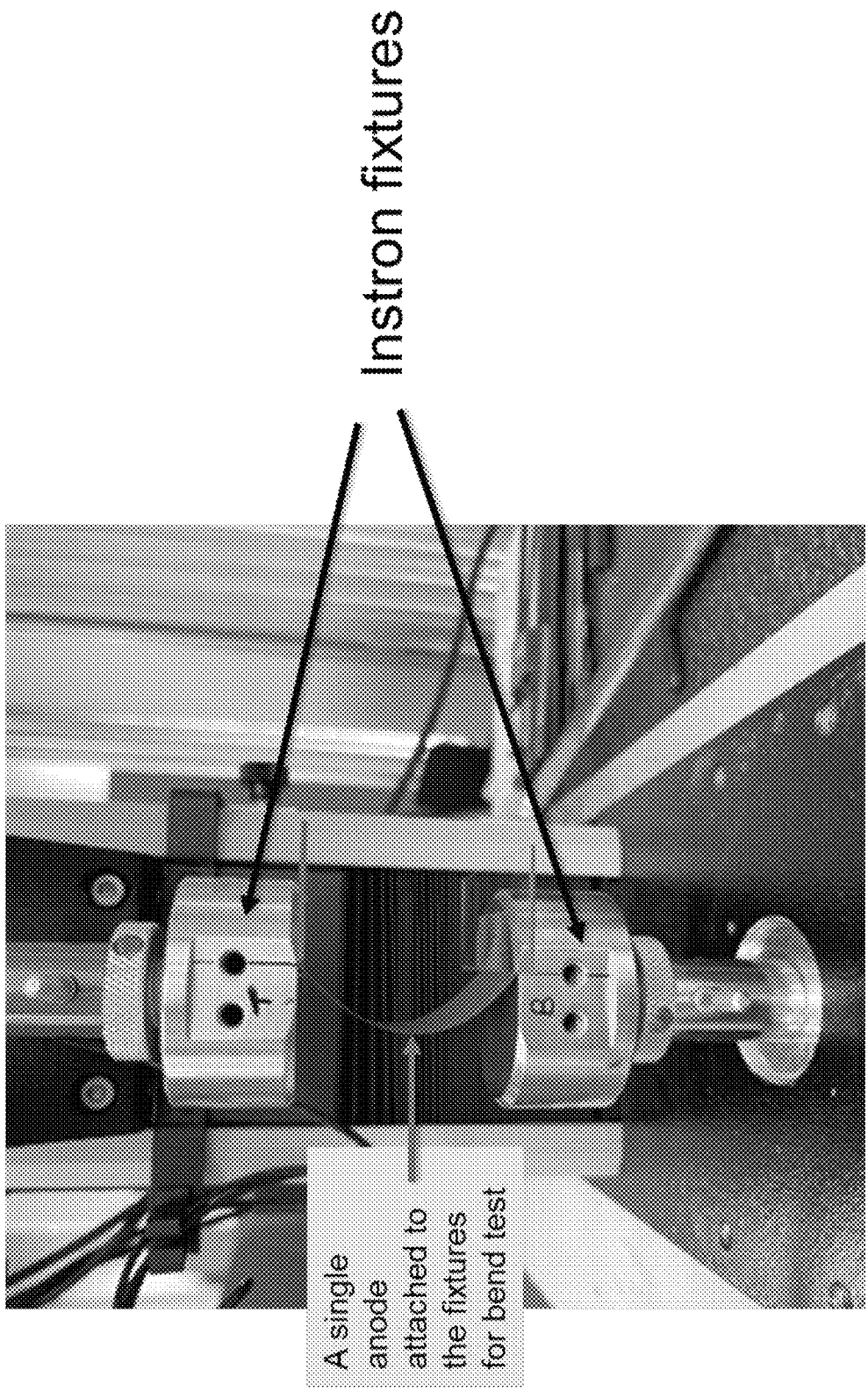

SILICON DOMINANT ANODES CONTAINING PYROLYZED CARBON

CROSS-REFERENCE TO RELATED APPLICATIONS/INCORPORATION BY REFERENCE

N/A

FIELD

Aspects of the present disclosure relate to energy generation and storage. More specifically, certain embodiments of the disclosure relate to using aqueous based polymers to fabricate silicon-based anode materials containing pyrolyzed carbon.

BACKGROUND

Conventional approaches for battery electrodes may be costly, cumbersome, and/or inefficient—e.g., they may be complex and/or time-consuming to implement, and may limit battery lifetime.

Further limitations and disadvantages of conventional and traditional approaches will become apparent to one of skill in the art, through comparison of such systems with some aspects of the present disclosure as set forth in the remainder of the present application with reference to the drawings.

BRIEF SUMMARY

A system and/or method for using aqueous based polymers to fabricate silicon-based anode materials containing pyrolyzed carbon, substantially as shown in and/or described in connection with at least one of the figures, as set forth more completely in the claims.

These and other advantages, aspects and novel features of the present disclosure, as well as details of an illustrated embodiment thereof, will be more fully understood from the following description and drawings.

BRIEF DESCRIPTION OF SEVERAL VIEWS OF THE DRAWINGS

FIG. 20 shows some high silicon formulations, in accordance with an example embodiment of the disclosure.

and PVA as a secondary polymer (red line) at 4C/0.5C (4.2-3.2V), in accordance with an example embodiment of the disclosure: FIG. 26A shows discharge capacity versus cycle number; FIG. 26B shows discharge capacity retention versus cycle number.

FIG. 27A shows discharge capacity in Ampere-hours; FIG. 27B shows the discharge capacity normalized to the discharge capacity of the first cycle.

FIG. 30 shows the Instron machine used for the bend test, in accordance with an example embodiment of the disclosure.

FIG. 33A shows the anode without PEO after a 4 mm bending test; FIG. 33B shows the anode without PEO after a 2 mm bending test; FIG. 33C shows the WPAI/PEO/CCN anode after a 4 mm bending test; and FIG. 33D shows the WPAI/PEO/CCN anode after a 2 mm bending test.

DETAILED DESCRIPTION

Figure 1:
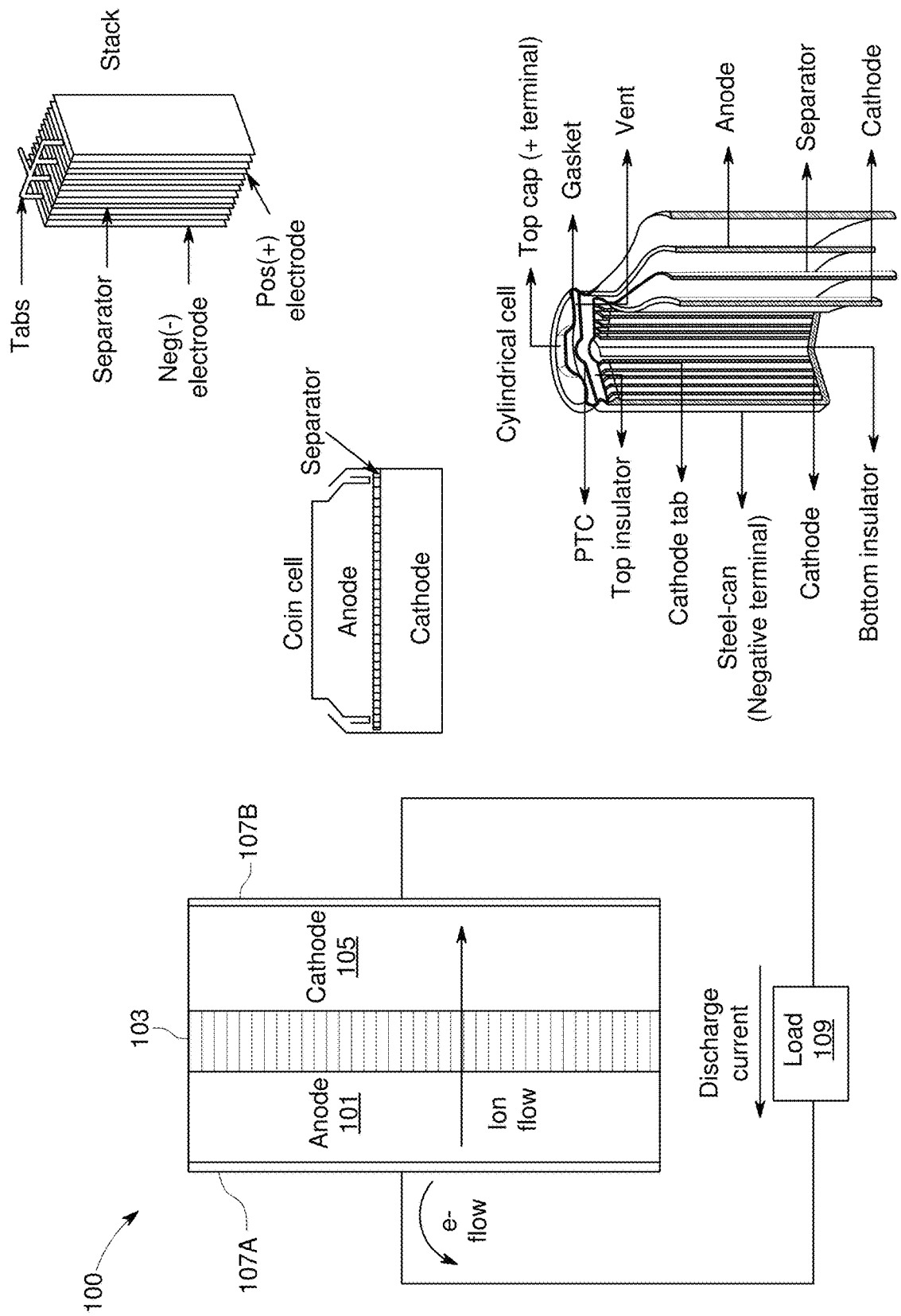
FIG. 1 is a diagram of a battery, in accordance with an example embodiment of the disclosure.

FIG. 1 is a diagram of a battery with silicon-dominant anodes, in accordance with an example embodiment of the disclosure. Referring to FIG. 1, there is shown a battery 100 comprising a separator 103 sandwiched between an anode 101 and a cathode 105, with current collectors 107A and 107B. There is also shown a load 109 coupled to the battery 100 illustrating instances when the battery 100 is in discharge mode. In this disclosure, the term "battery" may be used to indicate a single electrochemical cell, a plurality of electrochemical cells formed into a module, and/or a plurality of modules formed into a pack. Furthermore, the battery 100 shown in FIG. 1 is a very simplified example merely to show the principle of operation of a lithium-ion cell. Examples of realistic structures are shown to the right in FIG. 1, where stacks of electrodes and separators are utilized, with electrode coatings typically on both sides of the current collectors. The stacks may be formed into different shapes, such as a coin cell, cylindrical cell, or prismatic cell, for example.

The development of portable electronic devices and electrification of transportation drive the need for high-performance electrochemical energy storage. Small-scale (<100 Wh) to large-scale (>10 KWh) devices primarily use lithium-ion (Li-ion) batteries over other rechargeable battery chemistries due to their high performance.

The anode 101 and cathode 105, along with the current collectors 107A and 107B, may comprise the electrodes, which may comprise plates or films within, or containing, an electrolyte material, where the plates may provide a physical barrier for containing the electrolyte as well as a conductive contact to external structures. In other embodiments, the anode/cathode plates are immersed in electrolyte while an outer casing provides electrolyte containment. The anode 101 and cathode are electrically coupled to the current collectors 107A and 107B, which comprise metal or other conductive material for providing electrical contact to the electrodes as well as physical support for the active material in forming electrodes.

The configuration shown in FIG. 1 illustrates the battery 100 in discharge mode, whereas in a charging configuration, load 109 may be replaced with a charger to reverse the process. In one class of batteries, the separator 103 is generally a film material, made of an electrically insulating polymer, for example, that prevents electrons from flowing from anode 101 to cathode 105, or vice versa, while being porous enough to allow ions to pass through the separator 103. Typically, the separator 103, cathode 105, and anode 101 materials are individually formed into sheets, films, or active material coated foils. Sheets of the cathode, separator, and anode are subsequently stacked or rolled with the separator 103 separating the cathode 105 and anode 101 to form the battery 100. In some embodiments, the separator 103 is a sheet and generally utilizes winding methods and stacking in its manufacture. In these methods, the anodes, cathodes, and current collectors (e.g., electrodes) may comprise films.

In an example scenario, the battery 100 may comprise a solid, liquid, or gel electrolyte. The separator 103 preferably does not dissolve in typical battery electrolytes such as compositions that may comprise: Ethylene Carbonate (EC), Fluoroethylene Carbonate (FEC), Propylene Carbonate (PC), Dimethyl Carbonate (DMC), Ethyl Methyl Carbonate (EMC), Diethyl Carbonate (DEC), etc. with dissolved $LiBF_4$, $LiAsF_6$, $LiPF_6$, and $LiClO_4$ etc. In an example scenario, the electrolyte may comprise Lithium hexafluorophosphate ($LiPF_6$) and lithium bis(trifluoromethanesulfonyl)imide (LiTFSI) that may be used together in a variety of electrolyte solvents. Lithium hexafluorophosphate ($LiPF_6$) may be present at a concentration of about 0.1 to 4.0 molar (M) and lithium bis(trifluoromethanesulfonyl)imide (LiTFSI) may be present at a concentration of about 0 to 4.0 molar (M). Solvents may comprise one or more of ethylene carbonate (EC), fluoroethylene carbonate (FEC), and/or ethyl methyl carbonate (EMC) in various percentages. In some embodiments, the electrolyte solvents may comprise one or more of EC from about 0-40%, FEC from about 2-40%, and/or EMC from about 50-70%

The separator 103 may be wet or soaked with a liquid or gel electrolyte. In addition, in an example embodiment, the separator 103 does not melt below about 100 to 120° C. and exhibits sufficient mechanical properties for battery applications. A battery, in operation, can experience expansion and contraction of the anode and/or the cathode. In an example embodiment, the separator 103 can expand and contract by at least about 5 to 10% without failing, and may also be flexible.

The separator 103 may be sufficiently porous so that ions can pass through the separator once wet with, for example, a liquid or gel electrolyte. Alternatively (or additionally), the separator may absorb the electrolyte through gelling or other processes even without significant porosity. The porosity of the separator 103 is also generally not too porous to allow the anode 101 and cathode 105 to transfer electrons through the separator 103.

The anode 101 and cathode 105 comprise electrodes for the battery 100, providing electrical connections to the device for the transfer of electrical charge in charge and discharge states. The anode 101 may comprise silicon, carbon, or combinations of these materials, for example. Typical anode electrodes comprise a carbon material that includes a current collector such as a copper sheet. Carbon is often used because it has excellent electrochemical properties and is also electrically conductive. Anode electrodes currently used in rechargeable lithium-ion cells typically have a specific capacity of approximately 200 milliampere hours per gram. Graphite, the active material used in most lithium-ion battery anodes, has a theoretical energy density of 372 milliampere hours per gram (mAh/g). In comparison, silicon has a high theoretical capacity of 4200 mAh/g. To increase the volumetric and gravimetric energy density of lithium-ion batteries, silicon may be used as the active material for the cathode or anode. Silicon anodes may be formed from silicon composites, with more than 50% silicon or more by weight in the anode material on the current collector, for example.

In an example scenario, the anode 101 and cathode 105 store the ion used for the separation of charge, such as lithium. In this example, the electrolyte carries positively charged lithium ions from the anode 101 to the cathode 105 in discharge mode, as shown in FIG. 1 for example, and vice versa through the separator 105 in charge mode. The movement of the lithium ions creates free electrons in the anode 101 which creates a charge at the positive current collector 107B. The electrical current then flows from the current collector through load 109 to the negative current collector 107A. The separator 103 blocks the flow of electrons inside the battery 100, allows the flow of lithium ions, and prevents direct contact between the electrodes.

While battery 100 is discharging and providing an electric current, the anode 101 releases lithium ions to the cathode 105 via the separator 103, generating a flow of electrons from one side to the other via the coupled load 109. When the battery is being charged, the opposite happens where lithium ions are released by the cathode 105 and received by the anode 101.

The materials selected for the anode 101 and cathode 105 are important for the reliability and energy density possible for the battery 100. The energy, power, cost, and safety of current Li-ion batteries need to be improved in order to, for example, compete with internal combustion engine (ICE) technology and allow for the widespread adoption of electric vehicles (EVs). High energy density, high power density, and improved safety of lithium-ion batteries are achieved with the development of high-capacity and high-voltage cathodes, high-capacity anodes and functionally non-flammable electrolytes with high voltage stability and interfacial compatibility with electrodes. In addition, materials with low toxicity are beneficial as battery materials to reduce process costs and promote consumer safety.

The performance of electrochemical electrodes, while dependent on many factors, is largely dependent on the robustness of electrical contact between electrode particles, as well as between the current collector and the electrode particles. The electrical conductivity of silicon anode electrodes may be manipulated by incorporating conductive additives with different morphological properties. 0-dimensional carbon (for example, Super P), and 1-dimensional carbon (for example, vapor-grown carbon fibers, single-walled or multi-walled carbon nanotubes and other 1D carbon structures) and the mixture of the two have previously been incorporated separately into the anode electrode resulting in improved performance of the anode. The synergistic interactions between the two carbon materials may facilitate electrical contact throughout the large volume changes of the silicon anode during charge and discharge. These contact points facilitate the electrical contact between anode material and current collector to mitigate the isolation (island formation) of the electrode material while also improving conductivity in between silicon regions.

State-of-the-art lithium-ion batteries typically employ a graphite-dominant anode as an intercalation material for lithium. Silicon-dominant anodes, however, offer improvements compared to graphite-dominant Li-ion batteries. Silicon exhibits both higher gravimetric (4200 mAh/g vs. 372 mAh/g for graphite) and volumetric capacities (2194 mAh/L vs. 890 mAh/L for graphite). In addition, silicon-based anodes have a low lithiation/delithiation voltage plateau at about 0.3-0.4V vs. Li/Li+, which allows it to maintain an open circuit potential that avoids undesirable Li plating and dendrite formation. While silicon possesses high theoretical capacity (4200 mAh/g, it also suffers from severe volume fluctuation (>300%) during lithiation/de-lithiation (charging/discharging) during throughout battery operation. Thus despite silicon's excellent electrochemical activity, achieving a stable cycle life for silicon-based anodes is challenging due to silicon's large volume changes during lithiation and delithiation. Silicon regions may lose electrical contact from the anode as large volume changes coupled with its low electrical conductivity separate the silicon from surrounding materials in the anode.

Silicon-carbon composite electrodes, comprised of silicon particles suspended in a carbon matrix attached to a current collector, provide superior energy density to industry-standard graphite electrodes if paired with high-voltage, high-capacity cathodes, such as NMC, NCA, NCMA, etc. They also have superior cycle life and initial coulombic efficiency compared to silicon electrodes comprised of silicon particles, conductive additives, and polymeric binders.

In addition, the large silicon volume changes exacerbate solid electrolyte interphase (SEI) formation, which can further lead to electrical isolation and, thus, capacity loss. Expansion and shrinkage of silicon particles upon charge-discharge cycling causes pulverization of silicon particles, which increases their specific surface area. As the silicon surface area changes and increases during cycling, SEI repeatedly breaks apart and reforms. The SEI thus continually builds up around the pulverizing silicon regions during cycling into a thick electronic and ionic insulating layer. This accumulating SEI increases the impedance of the electrode and reduces the electrode electrochemical reactivity, which is detrimental to cycle life. Therefore, silicon anodes require a strong conductive matrix that (a) holds silicon particles in the anode, (b) is flexible enough to accommodate the large volume expansion and contraction of silicon, and (c) allows fast conduction of electrons within the matrix. Binders may be used in anode technologies to maintain the integrity of the anode during excessive volume changes during lithiation.

Although there has been a significant amount of effort to develop silicon anodes, the primary focus of developing these anodes is in dealing with the following three key issues: 1) Silicon nanoparticles—the majority of the silicon-based anodes that have high silicon content use silicon nanoparticles to reduce particle fracturing due to particle volume changes. Nano-silicon is expensive and generally requires special processing methods to prepare in large scale, which are not cost effective for large scale battery manufacturing. 2) Carbon additives—silicon-based electrode manufacturers commonly use carbon additives and binders mixed in organic solvents. The use of organic based binders and solvents has challenges associated with the toxicity and high cost. 3) Non-conducting binder material—the final anode formulation still contains non conducting polymeric binder that does not contribute to the electrochemical performance. As a result of this "dead weight" of the binder, the improvement of gravimetric energy density of the resulting cells may be limited.

One of the ways to reduce the volume expansion within the cell by absorbing the expansion of the silicon in empty space of the electrode is to increase the particle size of silicon by using particles in the micrometer range instead of nanometer range. In thin electrodes, using particles with diameters proportionally large compared to electrode thickness (such as 5-20 micron particles in a 30 micron coating) ultimately reduces the final electrode apparent density and introduces porosity (due to increased surface roughness and lower compressibility during calendering), which allows the silicon to expand more freely without fracturing the supporting matrix. However, even the baseline anodes containing micrometer size Si particles (up to 90% Silicon by weight) showed x y expansion of >1% which limits some of the real-world applications where expansion closer to 0% is desired. In order to improve energy density, thinner foils <20 μm thick are desired. In some cases, high expansion may cause buckling of the cell and/or tearing of the electrodes.

By comparing electrodes with silicon in the micrometer range—for instance <5 micron vs >10 microns—we can observe a reduction in volume expansion. This difference in expansion is attributed to the difference in the measured density of the electrode, which is unexpected as it is the opposite of the usual relationship. Generally the tap density is expected to be higher for larger particles, however since the coatings disclosed herein may be about 10-60 microns thick (in some embodiments, the coatings may be 20-50 microns thick, or about 30-40 microns thick), larger particles ultimately result in a lower measured density because of increased surface roughness and lower compressibility during calendaring.

Among the recent advancements in silicon-based anode development, one is the direct coated anode using organic solvent-based binders followed by heat treatment to convert the binder into a carbon matrix. Embodiments of the present disclosure address at least one or more of the following key advancements: 1) use of environmentally friendly water-based anode processing to allow safer, cheaper and faster processing and scalability; 2) Si dominant anodes with high Si content (>70 wt. %) for high capacity; and 3) the development of Si dominant anodes free of non-conducting binders capable of fast charging (>2C), i.e. anodes that contain only carbon and silicon. Although solvent-based anodes have had some effectiveness in improving cycle performance, these anodes may have weak adhesion to the current collector and contain non-continuous carbon media that leads to unacceptable performance. Although the introduction of carbon additives can somewhat improve the conductivity of the anode, the existence of carbon additives may weaken the adhesion of anode materials to the current collector. Thus, the binder plays an important role in improving the performance of silicon anodes.

Currently, polymeric binders may be used in silicon anode technologies to maintain the integrity of the anode during excessive volume changes during lithiation. Although polyvinylidene difluoride (PVDF) is commonly used in graphite cells, it is not capable of handling the excessive volume changes of silicon. Additionally, PVDF is soluble only in toxic organic solvents such as NMP, which require solvent recovery systems to recycle the solvent. In an example scenario, polymeric binders that are capable of mitigating the capacity fade of Si anodes occurring at a high rate and long-term cycling are disclosed. Water-based anode fabrication is of interest for large scale manufacturing of anodes to reduce the cost and eliminate the use of toxic solvents. Objectives of a aqueous-based anode polymer include: 1) ease of processing—the resin being highly soluble in water allowing for ease of adjusting viscosity during coating; 2) high carbon yield and film-forming properties upon pyrolysis to create a conductive matrix around and between silicon particles; 3) a homogeneous distribution of polymeric components in water and the slurry without phase separation during the slurry formulation or coating; and 4) possessing a relatively low pyrolysis temperature that is compatible with the thermal behavior of the associated current collector. Note that aqueous-based materials are also referred to as water-based or water-soluble, these are materials that are partially or fully soluble in water or an aqueous solution.

Commercially available water-soluble polymers can have significantly low carbon yield (<10 wt. %) and develop microcracks during pyrolysis. As a result, these water-soluble polymers exhibit poor mechanical properties in the anode after pyrolysis. Polymer resins and their derivatives with high carbon yield upon pyrolysis are desired to yield a continuous carbon medium while keeping the robustness of the anode. Although available polymers and their blends may be capable of achieving a high char yield, most of these polymers are insoluble in water. Therefore, there is a trade-off among the functions of active materials, conductive additives, and polymer binders. The balance may be adversely impacted by high energy density silicon anodes with low conductivity and huge volume variations described above.

According to certain embodiments, water-soluble (aqueous-based) polymers are used as binders to fabricate silicon-based anode materials. These binders may also include various modifiers and/or additives in order to achieve the desired properties. These modifiers and/or additives may assist in any or all of, stabilizing, strengthening and/or adjusting the properties of the binder and may also serve as a carbon source themselves. The modifiers and/or additives comprise one or more additional components such as pH modifiers, viscosity modifiers, strengthening additives, surfactants and/or anti-foaming agents.

As the demands for both zero-emission electric vehicles and grid-based energy storage systems increase, lower costs and improvements in energy density, power density, and safety of lithium (Li)-ion batteries are highly desirable. Enabling the high energy density and safety of Li-ion batteries requires the development of high-capacity, and high-voltage cathodes, high-capacity anodes, and accordingly functional electrolytes with high voltage stability, interfacial compatibility with electrodes and safety.

A lithium-ion battery typically includes a separator and/or electrolyte between an anode and a cathode. In one class of batteries, the separator, cathode, and anode materials are individually formed into sheets or films. Sheets of the cathode, separator, and anode are subsequently stacked or rolled with the separator separating the cathode and anode (e.g., electrodes) to form the battery. Typical electrodes include electro-chemically active material layers on electrically conductive metals (e.g., aluminum and copper). Films can be rolled or cut into pieces which are then layered into stacks. The stacks are of alternating electro-chemically active materials with the separator between them.

As discussed above, a lithium-ion battery typically includes a separator and/or electrolyte between an anode and a cathode. Separators may be formed as sheets or films, which are then stacked or rolled with the anode and cathode (e.g., electrodes) to form the battery. The separator may comprise a single continuous or substantially continuous sheet or film, which can be interleaved between adjacent electrodes of the electrode stack. The separator may be configured to facilitate electrical insulation between the anode and the cathode, while still permitting ionic transport. In some embodiments, the separator may comprise a porous material. Functional compounds may be used to modify the separator to prepare different types of functional separators to improve the cycle performance of Li-ion batteries or Li-metal batteries.

Si is one of the most promising anode materials for Li-ion batteries due to its high specific gravimetric and volumetric capacity (discussed above), and low lithiation potential (<0.4 V vs. Li/Li$^+$). Cathode materials may include Lithium Nickel Cobalt Manganese Oxide (NMC (NCM): LiNi$_x$Co$_y$Mn$_z$O$_2$, x+y+z=1); Lithium Iron Phosphate (LFP: LiFePO$_4$/C); Lithium Nickel Manganese Spinel (LNMO: LiNi$_{0.5}$Mn$_{1.5}$O$_4$); Lithium Nickel Cobalt Aluminium Oxide (NCA: LiNi$_a$Co$_b$Al$_c$O$_2$, a+b+c=1); Lithium Manganese Oxide (LMO: LiMn$_2$O$_4$); LMFP (LiMn$_x$Fe$_{(1-x)}$PO$_4$)/C, x<1), NCMA (Li[Ni$_x$Co$_y$Mn$_z$Al$_q$]O$_2$, x+y+z+q=1), and Lithium Cobalt Oxide (LCO: LCOO$_2$).

Among the various cathodes presently available, layered lithium transition-metal oxides such as Ni-rich LiNi$_x$Co$_y$Mn$_z$O$_2$ (NCM, 0≤x, y, z<1), NCMA (Li[Ni$_x$Co$_y$Mn$_z$Al$_q$]O$_2$, x+y+z+q=1), or LiNi$_x$Co$_y$Al$_z$O$_2$ (NCA, 0≤x, y, z<1) are promising ones due to their high theoretical capacity (~280 mAh/g) and relatively high average operating potential (3.6 V vs Li/Li$^+$). In addition to Ni-rich NCM or NCA cathode, LiCoO$_2$ (LCO) is also a very attractive cathode material because of its relatively high theoretical specific capacity of 274 mAh g$^{-1}$, high theoretical volumetric capacity of 1363 mAh cm$^{-3}$, low self-discharge, high discharge voltage, and good cycling performance. Coupling Si anodes with high-voltage Ni-rich NCM (or NCA) or LCO cathodes can deliver more energy than conventional Li-ion batteries with graphite-based anodes, due to the high capacity of these new electrodes. However, both Si-based anodes and high-voltage Ni-rich NCM (or NCA) or LCO cathodes face formidable technological challenges, and long-term cycling stability with high-Si anodes paired with NCM or NCA cathodes has yet to be achieved.

For anodes, silicon-based materials can provide significant improvement in energy density. However, the large volumetric expansion (e.g., >300%) during the Li alloying/dealloying processes can lead to disintegration of the active material and the loss of electrical conduction paths, thereby reducing the cycling life of the battery. In addition, an unstable solid electrolyte interphase (SEI) layer can develop on the surface of the cycled anodes and leads to an endless exposure of Si particle surfaces to the liquid electrolyte. This results in an irreversible capacity loss at each cycle due to the reduction at the low potential where the liquid electrolyte reacts with the exposed surface of the Si anode. In addition, oxidative instability of the conventional non-aqueous electrolyte takes place at voltages beyond 4.5 V, which can lead to accelerated decay of cycling performance. Because of the generally inferior cycle life of Si compared to graphite, only a small amount of Si or Si alloy is used in conventional anode materials.

The cathode (e.g., NCM (or NCA) or LCO) usually suffers from inferior stability and a low capacity retention at a high cut-off potential. The reasons can be ascribed to the unstable surface layer's gradual exfoliation, the continuous electrolyte decomposition, and the transition metal ion dissolution into electrolyte solution; further causes for inferior performance can be: (i) structural changes from layered to spinel upon cycling; (ii) Mn- and Ni-dissolution giving rise to surface side reactions at the graphite anode; and (iii) oxidative instability of conventional carbonate-based electrolytes at high voltage. The major limitations for LCO cathodes are high cost, low thermal stability, and fast capacity fade at high current rates or during deep cycling. LCO cathodes are expensive because of the high cost of Co. Low thermal stability refers to an exothermic release of oxygen when a lithium metal oxide cathode is heated. In order to make good use of Si anode/NCM or NCA cathode, and Si anode/LCO cathode-based Li-ion battery systems, the aforementioned barriers need to be overcome.

As discussed above, Li-ion batteries are being intensively pursued in the electric vehicle markets and stationary energy storage devices. To further improve the cell energy density, high-voltage layered transition metal oxide cathodes, examples including Ni-rich (e.g. NCA, NCM), Li-rich cathodes, and high capacity and low-voltage anodes, such as Si, Ge, etc may be utilized. However, the performance deterioration of full cells, in which these oxides are paired with Si or other high capacity anodes, increases markedly at potentials exceeding 4.30 V, limiting their wider use as high-energy cathode materials. Although a higher Ni content provides a higher specific capacity for Ni-rich NCM or NCA cathodes, it involves surface instability because of the unstable Ni$^{4+}$ increase during the charging process. As it is favorable to convert the unstable Ni$^{4+}$ into the more stable Ni$^{3+}$ or Ni$^{2+}$, Ni$^{4+}$ triggers severe electrolyte decomposition at the electrode/electrolyte interface, leading to the reduction of Ni$^{4+}$ and the oxidative decomposition of the electrolytes. Electrolyte decomposition at the electrolyte/electrode interface causes the accumulation of decomposed adducts on the NCM cathode surface. This hinders Li+ migration between the electrolyte and electrode, which in turn results in the rapid fading of the cycling performance. Thus the practical integration of a silicon anode in Li-ion batteries faces challenges such as large volume changes, unstable solid-electrolyte interphase, electrolyte drying out, etc.

As discussed above, typical electrodes include a current collector such as a copper sheet. Carbon is deposited onto the collector along with an inactive binder material. Carbon is often used because it has excellent electrochemical properties and is also electrically conductive. If the current collector layer (e.g., copper layer) was removed, the carbon would likely be unable to mechanically support itself. Therefore, conventional electrodes require a support structure such as the collector to be able to function as an electrode. The electrode (e.g., anode or cathode) compositions described in this application can produce self-supported electrodes. The need for a metal foil current collector is eliminated or minimized because the conductive carbonized polymer is used for current collection in the anode structure as well as for mechanical support. In typical applications for the mobile industry, a metal current collector is typically added to ensure sufficient rate performance. The carbonized polymer can form a substantially continuous conductive carbon phase in the entire electrode as opposed to particulate carbon suspended in a non-conductive binder in one class of conventional lithium-ion battery electrodes. Advantages of a carbon composite blend that utilizes a carbonized polymer can include, for example, 1) higher capacity, 2) enhanced overcharge/discharge protection, 3) lower irreversible capacity due to the elimination (or minimization) of metal foil current collectors, and 4) potential cost savings due to simpler manufacturing.

In order to increase the volumetric and gravimetric energy density of lithium-ion batteries, silicon may be used as the active material for the cathode or anode. Several types of silicon materials, e.g., silicon nanopowders, silicon nanofibers, porous silicon, and ball-milled silicon, have also been reported as viable candidates as active materials for the negative or positive electrodes. Small particle sizes (for example, sizes in the nanometer range) generally can increase cycle life performance. They also can display very high initial irreversible capacity. However, small particle sizes also can result in very low volumetric energy density (for example, for the overall cell stack) due to the difficulty of packing the active material. Larger particle sizes, (for example, sizes in the micron range) generally can result in higher density anode material compared to nanometer-sized particles. As mentioned earlier, larger particle sizes when used in thin active material layers where the size of the particle is more than one third of the thickness can lead to electrodes with lower apparent density. However, the expansion of the silicon active material can result in poor cycle life due to particle cracking. For example, silicon can swell over 300% upon lithium insertion. Because of this expansion, anodes including silicon should be allowed to expand while maintaining electrical contact between the silicon particles. The use of aqueous-based polymers as disclosed herein for Si anodes may allow for free spaces to be created among Si particles during the pyrolysis process. These free spaces may allow for the necessary expansion, creating the extra volume required for Si expansion during cycling.

In one embodiment, silicon particles with D50 (median particle size) in the 5-20 micron range and Dmax (i.e. D100; maximum particle size) of less than 45 μm relate to lower electrode density and less electrode expansion as compared to particles less than 5 microns. Porosity is a key factor in limiting expansion. Porosity is affected by the particle size, the composition (resin quantity), the thickness target in the calendering process, and the pyrolysis temperature (which affects final mass and electrode dimension changes). Very low particle sized silicon makes electrodes low in density. Higher particle sizes can make the electrodes higher in density. However, when the higher particle sizes are used in electrodes that are thin (e.g. the particle size diameter is larger than % of the thickness of the coating), the apparent density of the coating will be low.

Cathode electrodes (positive electrodes) described herein may include metal oxide cathode materials, such as Lithium Cobalt Oxide ($LiCoO_2$) (LCO), Ni-rich oxides, high voltage cathode materials, lithium-rich oxides, nickel-rich layered oxides, lithium-rich layered oxides, high-voltage spinel oxides, and high-voltage polyanionic compounds. Ni-rich oxides and/or high voltage cathode materials may include NCM and NCA. Example of NCM materials include, but are not limited to, $LNi_{0.6}Co_{0.2}Mn_{0.2}O_2$ (NCM-622) and $LiNi_{0.8}Co_{0.1}Mn_{0.1}O_2$ (NCM-811). Lithium-rich oxides may include $xLi_2Mn_3O_2 \cdot (1-x)LiNi_aCo_bMn_cO_2$ ($0 \leq x<1$). Nickel-rich layered oxides may include $LiNi_{1+x}M_{1-x}O_2$ (where M=Co, Mn or Al; $0 \leq x<1$). Lithium-rich layered oxides may include $LiNi_{1+x}M_{1-x}O_2$ (where M=Co, Mn or Ni; $0 \leq x<1$). High-voltage spinel oxides may include $LiNi_{0.5}Mn_{1.5}O_4$. High-voltage polyanionic compounds may include phosphates, sulfates, silicates, etc. Other materials include LMFP ($LiMn_xFe_{(1-x)}PO_4$)/C, x<1) and NCMA ($Li[Ni_xCo_yMn_zAl_q]O_2$, x+y+z+q=1).

In certain embodiments, the positive electrode may be one of NCA, NCM, LMO or LCO. The NCM cathodes include NCM 9 0.5 0.5, NCM811, NCM622, NCM532, NCM433, NCM111, and others. In further embodiments, the positive electrode comprises a lithium-rich layered oxide $xLi_2MnO_3 \cdot (1-x)LiNi_aCo_bMn_cO_2$ (a+b+c=1; $0 \leq x<1$); nickel-rich layered oxide $LiNi_{1-x}M_xO_2$ (M=Co, Mn and Al; $0 \leq x<1$); or lithium rich layered oxide $LiNi_{1+x}M_{1-x}O_2$ (M=Co, Mn and Ni; $0 \leq x<1$) cathode.

As described herein and in U.S. patent application Ser. Nos. 13/008,800 and 13/601,976, entitled "Composite Materials for Electrochemical Storage" and "Silicon Particles for Battery Electrodes," respectively, the entirety of which is hereby incorporated by reference, certain embodiments utilize a method of creating monolithic, self-supported anodes using a carbonized polymer. Because the polymer is converted into an electrically conductive and electrochemically active matrix, the resulting electrode is conductive enough that, in some embodiments, a metal foil or mesh current collector can be omitted or minimized. The converted polymer also acts as an expansion buffer for silicon particles during cycling so that a high cycle life can be achieved. In certain embodiments, the resulting electrode is an electrode that is comprised substantially of active material. In further embodiments, the resulting electrode is substantially active material. The electrodes can have a high energy density of between about 500 mAh/g to about 1200 mAh/g that can be due to, for example, 1) the use of silicon, 2) elimination or substantial reduction of metal current collectors, and 3) being comprised entirely or substantially entirely of active material.

As described herein and in U.S. patent application Ser. No. 14/800,380, entitled "Electrolyte Compositions for Batteries," the entirety of which is hereby incorporated by reference, composite materials can be used as an anode in most conventional Li-ion batteries; they may also be used as the cathode in some electrochemical couples with additional additives. The composite materials can also be used in either secondary batteries (e.g., rechargeable) or primary batteries (e.g., non-rechargeable). In some embodiments, the composite materials can be used in batteries implemented as a pouch cell, as described in further details herein. In certain embodiments, the composite materials are self-supported structures. In further embodiments, the composite materials are self-supported monolithic structures. For example, a collector may be included in the electrode comprised of the composite material. In certain embodiments, the composite material can be used to form carbon structures discussed in U.S. patent application Ser. No. 12/838,368 entitled "Carbon Electrode Structures for Batteries," the entirety of which is hereby incorporated by reference. Furthermore, the composite materials described herein can be, for example, silicon composite materials, carbon composite materials, and/or silicon-carbon composite materials.

In some embodiments, the largest dimension of the silicon particles can be less than about 40 μm, less than about 1 μm, between about 10 nm and about 40 μm, between about 10 nm and about 1 μm, less than about 500 nm, less than about 100 nm, and about 100 nm. All, substantially all, or at least some of the silicon particles may comprise the largest dimension described above. For example, an average or median largest dimension of the silicon particles can be less than about 40 μm, less than about 1 μm, between about 10 nm and about 40 μm, between about 10 nm and about 1 μm, less than about 500 nm, less than about 100 nm, and about 100 nm. Note that particle sizes may be described using values such as D10, D50 and D90. These are percentile values that can be determined from the particle size distribution and indicate the size below which 10%, 50% or 90% of all particles may be found, respectively. As discussed above, D50 also indicates the median particle size and the value Dmax=D100 (maximum particle size).

Composite materials can also be called (or can comprise) active materials when referring to an electrode. The amount of silicon in the composite material can be greater than zero percent by weight of the mixture and composite material. In certain embodiments, the mixture may be a slurry that comprises an amount of silicon, the amount being within a range of from about 0% to about 95% by weight, including from about 30% to about 95% by weight of the mixture. The amount of silicon in the composite material can be within a range of from about 0% to about 35% by weight, including from about 0% to about 25% by weight, from about 10% to about 35% by weight, and about 20% by weight. In further certain embodiments, the amount of silicon in the mixture is at least about 30% by weight; greater than 0% and less than about 95% by weight; or between about 50% and about 95% by weight. Additional embodiments of the amount of silicon in the composite material include more than about 50% by weight, between about 30% and about 95% by weight, between about 50% and about 85% by weight, and between about 75% and about 95% by weight.

Anodes may be designed with variable Si % in the slurry, but post pyrolysis % Si can be controlled by combining polymers having different char yields and/or different pyrolysis temperatures. The final amount of silicon in the pyrolyzed anode is measured and, in one embodiment is about 80% by weight or more. The amount of silicon in the anode may also be about 85%, 90%, 95% by weight or more. Higher silicon embodiments include amounts of silicon in the pyrolyzed anode of about 95% or more, about 96% or more, about 97% or more, about 98% or more or about 99% or more % by weight. In some embodiments, the amount of silicon in the pyrolyzed anode is about 95-99%; about 96-99% or about 97-99% by weight.

In some embodiments, pyrolysis refers to heating the green anodes at temperatures above 350° C. in a reducing or inert environment (vacuum or $N_2$ or forming gas atmosphere). The heating rate and final dwell temperature affects the weight yield of the polymer binder. Heating rate may be about 0.5-30° C. per minute; in some embodiments, the heating rate is ≤5° C. per minute, or from about 0.5-4° C. per minute; or ≤10° C. per minute, or from about 0.5-9° C. per minute. Dwell temperatures may be from about 100-1000° C.; in some embodiments, the dwell temperature is about 300-900° C. Weight loss versus temperature is different for different binders and hence final composition also depends on the nature of the binder itself. Longer and higher dwell temps will also decrease the weight yield of the polymer binder. This may make the electrode more electrically conductive and/or to make the material less reactive in the cell causing less irreversible capacity loss. However, mass loss may also result in dimensional changes due to shrinking of the polymer and annealing of the current collector.

The silicon particles may or may not be pure silicon. For example, the silicon particles may be substantially silicon or may be a silicon alloy. In one embodiment, the silicon alloy includes silicon as the primary constituent along with one or more other elements. In another embodiment, the silicon particles are substantially pure silicon (not an alloy).

As described herein, micron-sized silicon particles can provide good volumetric and gravimetric energy density combined with good cycle life. In certain embodiments, to obtain the benefits of both micron-sized silicon particles (e.g., high energy density) and nanometer-sized silicon particles (e.g., good cycle behavior), silicon particles can have an average particle size in the micron range and a surface including nanometer-sized features. In some embodiments, the silicon particles have an average particle size (e.g., average diameter or average largest dimension) between about 0.1 μm and about 30 μm or between about 0.1 μm and all values up to about 30 μm. For example, the silicon particles can have an average particle size between about 0.5 μm and about 25 μm, between about 0.5 μm and about 20 μm, between about 0.5 μm and about 15 μm, between about 0.5 μm and about 10 μm, between about 0.5 μm and about 5 μm, between about 0.5 μm and about 2 μm, between about 1 μm and about 20 μm, between about 1 μm and about 15 μm, between about 1 μm and about 10 μm, between about 5 μm and about 20 μm, etc. Thus, the average particle size can be any value between about 0.1 μm and about 30 μm, e.g., 0.1 μm, 0.5 μm, 1 μm, 5 μm, 10 μm, 15 μm, 20 μm, 25 μm, and 30 μm.

The composite material can be formed by pyrolyzing a polymer precursor. The amount of carbon obtained from the precursor can be about 50 percent by weight of the composite material. In certain embodiments, the amount of carbon from the precursor in the composite material is about 10% to about 25% by weight. The carbon from the precursor can be hard carbon. Hard carbon can be a carbon that does not convert into graphite even with heating over 2800 degrees Celsius. Precursors that melt or flow during pyrolysis convert into soft carbons and/or graphite with sufficient temperature and/or pressure. Hard carbon may be selected since soft carbon precursors may flow and soft carbons and graphite are mechanically weaker than hard carbons. Other possible hard carbon precursors can include phenolic resins, epoxy resins, and other polymers that have a very high melting point or are crosslinked. A soft carbon precursor can be used if it does not melt at the heat treatment temperatures used. In some embodiments, the amount of carbon in the composite material has a value within a range of from about 10% to about 25% by weight, about 20% by weight, or more than about 50% by weight. In some embodiments, there may be greater than 0% and less than about 90% by weight of one or more types of carbon phases. In certain embodiments, the carbon phase is substantially amorphous. In other embodiments, the carbon phase is substantially crystalline. In further embodiments, the carbon phase includes amorphous and crystalline carbon. The carbon phase can be a matrix phase in the composite material. The carbon can also be embedded in the pores of the additives including silicon. The carbon may react with some of the additives to create some materials at interfaces. For example, there may be a silicon carbide layer between the silicon particles and the carbon.

As described herein and in U.S. patent application Ser. No. 17/945,790, entitled "Lower Pyrolysis Temperature Binder for Silicon-Dominant Anodes," the entirety of which is hereby incorporated by reference, certain embodiments utilize directly coated anodes comprising a silicon-dominated anode active material, a carbon-based binder, and a carbon-based additive, with the composition being configured for low-temperature pyrolysis. The onset of the pyrolysis may occur below 500° C. (such as about 400° C.) and carbonization may occur below 600° C. In some embodiments, the binder comprises PAI (Polyamide imide) having silicon particles therein, where the active material is pyrolyzed to turn the binder into a glassy carbon that provides a structural framework around the silicon particles and also provides electrical conductivity.

In certain embodiments, graphite particles are added to the mixture. Advantageously, graphite can be an electrochemically active material in the battery as well as an elastically deformable material that can respond to the volume change of the silicon particles. Graphite is the preferred active anode material for certain classes of lithium-ion batteries currently on the market because it has a low irreversible capacity. Additionally, graphite is softer than hard carbon and can better absorb the volume expansion of silicon additives. In certain embodiments, the largest dimension of the graphite particles is between about 0.5 microns and about 20 microns. All, substantially all, or at least some of the graphite particles may comprise the largest dimension described herein. In further embodiments, an average or median largest dimension of the graphite particles is between about 0.5 microns and about 20 microns. In certain embodiments, the mixture includes greater than 0% and less than about 80% by weight of graphite particles. In further embodiments, the composite material includes about 1% to about 20% by weight graphite particles. In further embodiments, the composite material includes about 40% to about 75% by weight graphite particles.

In certain embodiments, conductive particles which may also be electrochemically active are added to the mixture. Such particles can enable both a more electronically conductive composite as well as a more mechanically deformable composite capable of absorbing the large volumetric change incurred during lithiation and de-lithiation. In certain embodiments, a largest dimension of the conductive particles is between about 10 nanometers and about 7 millimeters. All, substantially all, or at least some of the conductive particles may comprise the largest dimension described herein. In further embodiments, an average or median largest dimension of the conductive particles is between about 10 nm and about 7 millimeters. In certain embodiments, the mixture includes greater than zero and up to about 80% by weight conductive particles. In further embodiments, the composite material includes about 45% to about 80% by weight conductive particles. The conductive particles can be conductive carbon including carbon blacks, carbon fibers, carbon nanofibers, carbon nanotubes, graphite, graphene, etc. Many carbons that are considered as conductive additives that are not electrochemically active become active once pyrolyzed in a polymer matrix. Alternatively, the conductive particles can be metals or alloys including copper, nickel, or stainless steel.

The composite material may also be formed into a powder. For example, the composite material can be ground into a powder. The composite material powder can be used as an active material for an electrode. For example, the composite material powder can be deposited on a collector in a manner similar to making a conventional electrode structure, as known in the industry.

In some embodiments, the full capacity of the composite material may not be utilized during the use of the battery in order to improve battery life (e.g., number charge and discharge cycles before the battery fails or the performance of the battery decreases below a usability level). For example, a composite material with about 70% by weight silicon particles, about 20% by weight carbon from a precursor, and about 10% by weight graphite may have a maximum gravimetric capacity of about 2500 mAh/g, while the composite material may only be used up to a gravimetric capacity of about 550 to about 850 mAh/g. Although, the maximum gravimetric capacity of the composite material may not be utilized, using the composite material at a lower capacity can still achieve a higher capacity than certain lithium-ion batteries. In certain embodiments, the composite material is used or only used at a gravimetric capacity below about 70% of the composite material's maximum gravimetric capacity. For example, the composite material is not used at a gravimetric capacity above about 70% of the composite material's maximum gravimetric capacity. In further embodiments, the composite material is used or only used at a gravimetric capacity below about 60% of the composite material's maximum gravimetric capacity or below about 50% of the composite material's maximum gravimetric capacity.

An electrolyte composition for a lithium-ion battery can include a solvent and a lithium-ion source, such as a lithium-containing salt. The composition of the electrolyte may be selected to provide a lithium-ion battery with improved performance. In some embodiments, the electrolyte may contain an electrolyte additive. As described herein, a lithium-ion battery may include a first electrode, a second electrode, a separator between the first electrode and the second electrode, and an electrolyte in contact with the first electrode, the second electrode, and the separator. The electrolyte serves to facilitate ionic transport between the first electrode and the second electrode. In some embodiments, the first electrode and the second electrode can refer to anode and cathode or cathode and anode, respectively. Electrolytes and/or electrolyte compositions may be a liquid, solid, or gel.

In lithium-ion batteries, the most widely used electrolytes are non-aqueous liquid electrolytes; these may comprise a lithium-containing salt (e.g. $LiPF_6$) and low molecular weight carbonate solvents as well as various small amounts of functional additives. $LiPF_6$ holds a dominant position in commercial liquid electrolytes due to its well-balanced properties. However, $LiPF_6$ has problems such as high reactivity towards moisture and poor thermal stability. These issues are primarily attributed to the equilibrium decomposition reaction of $LiPF_6$. The P—F bond in $LiPF_6$ and $PF_5$ is rather labile towards hydrolysis by inevitable trace amounts of moisture in batteries. Besides, as a strong Lewis acid, $PF_5$ is also able to initiate reactions with carbonate solvents and causes further electrolyte degradation. Moreover, a temperature rise further accelerates the decomposition reaction of $LiPF_6$ and consequently promotes subsequent parasitic reactions. This is also a reason for faster aging of current lithium-ion batteries at elevated temperatures, as compared to room temperature.

In some embodiments, the electrolyte for a lithium ion battery may include a solvent comprising a fluorine-containing component, such as a fluorine-containing cyclic carbonate, a fluorine-containing linear carbonate, and/or a fluoroether. In some embodiments, the electrolyte can include more than one solvent. For example, the electrolyte may include two or more co-solvents. In some embodiments, at least one of the co-solvents in the electrolyte is a fluorine-containing compound. In some embodiments, the fluorine-containing compound may be fluoroethylene carbonate (FEC), or difluoroethylene carbonate (F2EC). In some embodiments, the co-solvent may be selected from the group consisting of FEC, ethyl methyl carbonate (EMC), 1,1,2,2-tetrafluoroethyl 2,2,3,3-tetrafluoropropyl ether, difluoroethylene carbonate (F2EC), ethylene carbonate (EC), diethyl carbonate (DEC), dimethyl carbonate (DMC), propylene carbonate (PC), Dimethoxy ethane (DME), and gamma-butyrolactone (GBL), methyl acetate (MA), ethyl acetate (EA), and methyl propanoate. In some embodiments, the electrolyte contains FEC. In some embodiments, the electrolyte contains both EMC and FEC. In some embodiments, the electrolyte may further contain 1,1,2,2-tetrafluoroethyl 2,2,3,3-tetrafluoropropyl ether, EC, DEC, DMC, PC, GBL, and/or F2EC or some partially or fully fluorinated linear or cyclic carbonates, ethers, etc. as a co-solvent. In some embodiments, the electrolyte is free or substantially free of non-fluorine-containing cyclic carbonates, such as EC, GBL, and PC.

In further embodiments, electrolyte solvents may be composed of a cyclic carbonate, such as fluoro ethylene carbonate (FEC), di-fluoroethylene carbonate (DiFEC), Trifluoropropylene carbonate (TFPC), ethylene carbonate (EC), propylene carbonate (PC), etc; a linear carbonate, such as dimethyl carbonate (DMC), diethyl carbonate (DEC), ethyl methyl carbonate (EMC), etc, or other solvents, such as methyl acetate, ethyl acetate, or gamma butyrolactone, dimethoxyethane, 1,1,2,2-tetrafluoroethyl 2,2,3,3-tetrafluoropropyl ether, etc.

In some embodiments, the electrolyte composition may comprise a system of solvents (i.e. a solvent, plus one or more co-solvents). The solvents may be fluorinated or non-fluorinated. In some embodiments, the co-solvents may be one or more linear carbonates, lactones, acetates, propanoates and/or non-linear carbonates. In some embodiments, the co-solvents may be one or more carbonate solvents, such as one or more linear carbonates and/or non-linear carbonates, as discussed above. In some embodiments, an electrolyte composition may comprise one or more of EC at a concentration of 5% or more; FEC at a concentration of 5% or more; and/or TFPC at a concentration of 5% or more.

In some embodiments, the solvents in the electrolyte composition include, but are not limited to, one or more of ethyl methyl carbonate (EMC), methyl acetate, dimethyl carbonate (DMC), diethyl carbonate (DEC), gamma butyrolactone, methyl acetate (MA), ethyl acetate (EA), methyl propanoate, fluoro ethylene carbonate (FEC), di-fluoroethylene carbonate (DiFEC), Trifluoropropylene carbonate (TFPC), ethylene carbonate (EC), vinylene carbonate (VC) or propylene carbonate (PC). In further embodiments, the solvents include at least one of one or more of ethyl methyl carbonate (EMC), methyl acetate, dimethyl carbonate (DMC), diethyl carbonate (DEC), gamma butyrolactone, methyl acetate (MA), ethyl acetate (EA), methyl propanoate, along with at least one or more of fluoro ethylene carbonate (FEC), di-fluoroethylene carbonate (DiFEC), Trifluoropropylene carbonate (TFPC), ethylene carbonate (EC), vinylene carbonate (VC) or propylene carbonate (PC).

As used herein, a co-solvent of an electrolyte has a concentration of at least about 10% by volume (vol %). In some embodiments, a co-solvent of the electrolyte may be about 20 vol %, about 40 vol %, about 60 vol %, or about 80 vol %, or about 90 vol % of the electrolyte. In some embodiments, a co-solvent may have a concentration from about 10 vol % to about 90 vol %, from about 10 vol % to about 80 vol %, from about 10 vol % to about 60 vol %, from about 20 vol % to about 60 vol %, from about 20 vol % to about 50 vol %, from about 30 vol % to about 60 vol %, or from about 30 vol % to about 50 vol %.

For example, in some embodiments, the electrolyte may contain a fluorine-containing cyclic carbonate, such as FEC, at a concentration of about 10 vol % to about 60 vol %, including from about 20 vol % to about 50 vol %, and from about 20 vol % to about 40 vol %. In some embodiments, the electrolyte may comprise a linear carbonate that does not contain fluorine, such as EMC, at a concentration of about 40 vol % to about 90 vol %, including from about 50 vol % to about 80 vol %, and from about 60 vol % to about 80 vol %. In some embodiments, the electrolyte may comprise 1,1,2,2-tetrafluoroethyl 2,2,3,3-tetrafluoropropyl ether at a concentration of from about 10 vol % to about 30 vol %, including from about 10 vol % to about 20 vol %.

In some embodiments, the electrolyte is substantially free of cyclic carbonates other than fluorine-containing cyclic carbonates (i.e., non-fluorine-containing cyclic carbonates). Examples of non-fluorine-containing carbonates include EC, PC, GBL, and vinylene carbonate (VC).

In some embodiments, the electrolyte may further comprise one or more additives. As used herein, an additive of the electrolyte refers to a component that makes up less than 10% by weight (wt %) of the electrolyte. In some embodiments, the amount of each additive in the electrolyte may be from about 0.2 wt % to about 1 wt %, 0.1 wt/o to about 2 wt %, 0.2 wt % to about 9 wt %, from about 0.5 wt % to about 9 wt %, from about 1 wt % to about 9 wt %, from about 1 wt % to about 8 wt %, from about 1 wt % to about 8 wt %, from about 1 wt % to about 7 wt %, from about 1 wt % to about 6 wt %, from about 1 wt % to about 5 wt %, from about 2 wt % to about 5 wt %, or any value in between. In some embodiments, the total amount of the additive(s) may be from about 1 wt % to about 9 wt %, from about 1 wt % to about 8 wt %, from about 1 wt % to about 7 wt %, from about 2 wt % to about 7 wt %, or any value in between. In other embodiments, the percentages of additives may be expressed in volume percent (vol %).

In some embodiments, salts may be included in the electrolyte compositions. A lithium-containing salt for a lithium-ion battery may comprise a fluorinated or non-fluorinated salt. In further embodiments, a lithium-containing salt for a lithium-ion battery may comprise one or more of lithium hexafluorophosphate ($LiPF_6$), lithium tetrafluoroborate ($LiBF_4$), lithium hexafluoroarsenate monohydrate ($LiAsF_6$), lithium perchlorate ($LiClO_4$), lithium bis(trifluoromethanesulfonyl)imide (LiTFSI), lithium bis(fluorosulfonyl)imide (LiFSI), lithium bis(oxalato)borate (LiBOB), lithium difluoro(oxalate)borate (LiDFOB), lithium triflate ($LiCF_3SO_3$), lithium tetrafluorooxalato phosphate (LTFOP), lithium difluorophosphate ($LiPO_2F_2$), lithium pentafluoroethyltrifluoroborate (LiFAB), and lithium 2-trifluoromethyl-4,5-dicyanoimidazole (LiTDI), lithium bis(2-fluoromalonato)borate (LiBFMB), lithium 4-pyridyl trimethyl borate (LPTB), lithium 2-fluorophenol trimethyl borate (LFPTB), lithium catechol dimethyl borate (LiCDMB), lithium tetrafluorooxalatophosphate (LiFOP), etc. or combinations thereof. In certain embodiments, a lithium-containing salt for a lithium-ion battery may comprise lithium hexafluorophosphate ($LiPF_6$). In some embodiments, the electrolyte can have a salt concentration of about 1 moles/L (M). In other embodiments, the salt concentration can be higher than 1M; in further embodiments, the salt concentration can be higher than 1.2M.

The term "alkyl" refers to a straight or branched, saturated, aliphatic radical having the number of carbon atoms indicated. The alkyl moiety may be branched or straight chain. For example, C1-C6 alkyl includes, but is not limited to, methyl, ethyl, propyl, isopropyl, butyl, isobutyl, sec-butyl, tert-butyl, pentyl, isopentyl, hexyl, etc. Other alkyl groups include, but are not limited to heptyl, octyl, nonyl, decyl, etc. Alkyl can include any number of carbons, such as 1-2, 1-3, 1-4, 1-5, 1-6, 1-7, 1-8, 1-9, 1-10, 1-11, 1-12 2-3, 2-4, 2-5, 2-6, 3-4, 3-5, 3-6, 4-5, 4-6 and 5-6. The alkyl group is typically monovalent, but can be divalent, such as when the alkyl group links two moieties together.

The term "fluoro-alkyl" refers to an alkyl group where one, some, or all hydrogen atoms have been replaced by fluorine.

The term "alkylene" refers to an alkyl group, as defined above, linking at least two other groups, i.e., a divalent hydrocarbon radical. The two moieties linked to the alkylene can be linked to the same atom or different atoms of the alkylene. For instance, a straight chain alkylene can be the bivalent radical of —$(CH_2)_n$—, where n is 1, 2, 3, 4, 5, 6, 7, 8, 9, or 10. Alkylene groups include, but are not limited to, methylene, ethylene, propylene, isopropylene, butylene, isobutylene, sec-butylene, pentylene and hexylene.

The term "alkoxy" refers to alkyl group having an oxygen atom that either connects the alkoxy group to the point of attachment or is linked to two carbons of the alkoxy group. Alkoxy groups include, for example, methoxy, ethoxy, propoxy, iso-propoxy, butoxy, 2-butoxy, iso-butoxy, sec-butoxy, tert-butoxy, pentoxy, hexoxy, etc. The alkoxy groups can be further substituted with a variety of substituents described within. For example, the alkoxy groups can be substituted with halogens to form a "halo-alkoxy" group, or substituted with fluorine to form a "fluoro-alkoxy" group.

The term "alkenyl" refers to either a straight chain or branched hydrocarbon of 2 to 6 carbon atoms, having at least one double bond. Examples of alkenyl groups include, but are not limited to, vinyl, propenyl, isopropenyl, 1-butenyl, 2-butenyl, isobutenyl, butadienyl, 1-pentenyl, 2-pentenyl, isopentenyl, 1,3-pentadienyl, 1,4-pentadienyl, 1-hexenyl, 2-hexenyl, 3-hexenyl, 1,3-hexadienyl, 1,4-hexadienyl, 1,5-hexadienyl, 2,4-hexadienyl, or 1,3,5-hexatrienyl. Alkenyl groups can also have from 2 to 3, 2 to 4, 2 to 5, 3 to 4, 3 to 5, 3 to 6, 4 to 5, 4 to 6 and 5 to 6 carbons. The alkenyl group is typically monovalent, but can be divalent, such as when the alkenyl group links two moieties together.

The term "alkenylene" refers to an alkenyl group, as defined above, linking at least two other groups, i.e., a divalent hydrocarbon radical. The two moieties linked to the alkenylene can be linked to the same atom or different atoms of the alkenylene. Alkenylene groups include, but are not limited to, ethenylene, propenylene, isopropenylene, butenylene, isobutenylene, sec-butenylene, pentenylene and hexenylene.

The term "alkynyl" refers to either a straight chain or branched hydrocarbon of 2 to 6 carbon atoms, having at least one triple bond. Examples of alkynyl groups include, but are not limited to, acetylenyl, propynyl, 1-butynyl, 2-butynyl, isobutynyl, sec-butynyl, butadiynyl, 1-pentynyl, 2-pentynyl, isopentynyl, 1,3-pentadiynyl, 1,4-pentadiynyl, 1-hexynyl, 2-hexynyl, 3-hexynyl, 1,3-hexadiynyl, 1,4-hexadiynyl, 1,5-hexadiynyl, 2,4-hexadiynyl, or 1,3,5-hexatriynyl. Alkynyl groups can also have from 2 to 3, 2 to 4, 2 to 5, 3 to 4, 3 to 5, 3 to 6, 4 to 5, 4 to 6 and 5 to 6 carbons. The alkynyl group is typically monovalent, but can be divalent, such as when the alkynyl group links two moieties together.

The term "alkynylene" refers to an alkynyl group, as defined above, linking at least two other groups, i.e., a divalent hydrocarbon radical. The two moieties linked to the alkynylene can be linked to the same atom or different atoms of the alkynylene. Alkynylene groups include, but are not limited to, ethynylene, propynylene, butynylene, sec-butynylene, pentynylene, and hexynylene.

The term "cycloalkyl" refers to a saturated or partially unsaturated, monocyclic, fused bicyclic, bridged polycyclic, or spiro ring assembly containing from 3 to 12, from 3 to 10, or from 3 to 7 ring atoms, or the number of atoms indicated. Monocyclic rings include, for example, cyclopropyl, cyclobutyl, cyclopentyl, cyclohexyl, and cyclooctyl. Bicyclic and polycyclic rings include, for example, norbornane, decahydronaphthalene and adamantane. For example, C3-C8 cycloalkyl includes cyclopropyl, cyclobutyl, cyclopentyl, cyclohexyl, cyclooctyl, and norbornane. As used herein, the term "fused" refers to two rings which have two atoms and one bond in common. For example, in the following structure, rings A and B are fused

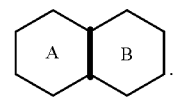

As used herein, the term "bridged polycyclic" refers to compounds wherein the cycloalkyl contains a linkage of one or more atoms connecting non-adjacent atoms. The following structures

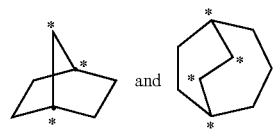 [SMILES: C1CC2CCC1C2 ; C1CC2CCC(C1)CC2]

are examples of "bridged" rings. As used herein, the term "spiro" refers to two rings that have one atom in common and the two rings are not linked by a bridge. Examples of fused cycloalkyl groups are decahydronaphthalenyl, dodecahydro-1H-phenalenyl and tetradecahydroanthracenyl; examples of bridged cycloalkyl groups are bicyclo[1.1.1]pentyl, adamantanyl, and norbomanyl; and examples of spiro cycloalkyl groups include spiro[3.3]heptane and spiro[4.5]decane.

The term "cycloalkylene" refers to a cycloalkyl group, as defined above, linking at least two other groups, i.e., a divalent hydrocarbon radical. The two moieties linked to the cycloalkylene can be linked to the same atom or different atoms of the cycloalkylene. Cycloalkylene groups include, but are not limited to, cyclopropylene, cyclobutylene, cyclopentylene, cyclohexylene, and cyclooctylene.

The term "aryl" refers to a monocyclic or fused bicyclic, tricyclic or greater, aromatic ring assembly containing 6 to 16 ring carbon atoms. For example, aryl may be phenyl, benzyl or naphthyl, preferably phenyl. Aryl groups may include fused multicyclic ring assemblies wherein only one ring in the multicyclic ring assembly is aromatic. Aryl groups can be mono-, di-, or tri-substituted by one, two or three radicals. Preferred as aryl is naphthyl, phenyl, or phenyl mono- or disubstituted by alkoxy, phenyl, halogen, alkyl or trifluoromethyl, especially phenyl or phenyl-mono- or disubstituted by alkoxy, halogen or trifluoromethyl, and in particular phenyl.

The term "arylene" refers to an aryl group, as defined above, linking at least two other groups. The two moieties linked to the arylene are linked to different atoms of the arylene. Arylene groups include, but are not limited to, phenylene.

The term "heteroaryl" refers to a monocyclic or fused bicyclic or tricyclic aromatic ring assembly containing 5 to 16 ring atoms, where from 1 to 4 of the ring atoms are a heteroatom such as N, O, or S. For example, heteroaryl includes pyridyl, indolyl, indazolyl, quinoxalinyl, quinolinyl, isoquinolinyl, benzothienyl, benzofuranyl, furanyl, pyrrolyl, thiazolyl, benzothiazolyl, oxazolyl, isoxazolyl, triazolyl, tetrazolyl, pyrazolyl, imidazolyl, thienyl, or any other radicals substituted, especially mono- or di-substituted, by e.g. alkyl, nitro or halogen. Pyridyl represents 2-, 3- or 4-pyridyl, advantageously 2- or 3-pyridyl. Thienyl represents 2- or 3-thienyl. Quinolinyl represents preferably 2-, 3- or 4-quinolinyl. Isoquinolinyl represents preferably 1-, 3- or 4-isoquinolinyl. Benzopyranyl, benzothiopyranyl represents preferably 3-benzopyranyl or 3-benzothiopyranyl, respectively. Thiazolyl represents preferably 2- or 4-thiazolyl, and most preferred 4-thiazolyl. Triazolyl is preferably 1-, 2- or 5-(1,2,4-triazolyl). Tetrazolyl is preferably 5-tetrazolyl.

Preferably, heteroaryl is pyridyl, indolyl, quinolinyl, pyrrolyl, thiazolyl, isoxazolyl, triazolyl, tetrazolyl, pyrazolyl, imidazolyl, thienyl, furanyl, benzothiazolyl, benzofuranyl, isoquinolinyl, benzothienyl, oxazolyl, indazolyl, or any of the radicals substituted, especially mono- or di-substituted.

The term "heteroalkyl" refers to an alkyl group having from 1 to 3 heteroatoms such as N, O and S. The heteroatoms can also be oxidized, such as, but not limited to, —S(O)— and —S(O)$_2$—. For example, heteroalkyl can include ethers, thioethers, alkyl-amines and alkyl-thiols.

The term "heteroalkylene" refers to a heteroalkyl group, as defined above, linking at least two other groups. The two moieties linked to the heteroalkylene can be linked to the same atom or different atoms of the heteroalkylene.

The term "heterocycloalkyl" refers to a ring system having from 3 ring members to about 20 ring members and from 1 to about 5 heteroatoms such as N, O and S. The heteroatoms can also be oxidized, such as, but not limited to, —S(O)— and —S(O)$_2$—. For example, heterocycle includes, but is not limited to, tetrahydrofuranyl, tetrahydrothiophenyl, morpholino, pyrrolidinyl, pyrrolinyl, imidazolidinyl, imidazolinyl, pyrazolidinyl, pyrazolinyl, piperazinyl, piperidinyl, indolinyl, quinuclidinyl and 1,4-dioxa-8-aza-spiro[4.5]dec-8-yl.

The term "heterocycloalkylene" refers to a heterocyclalkyl group, as defined above, linking at least two other groups. The two moieties linked to the heterocycloalkylene can be linked to the same atom or different atoms of the heterocycloalkylene.

The term "optionally substituted" is used herein to indicate a moiety that can be unsubstituted or substituted by one or more substituent. When a moiety term is used without specifically indicating as substituted, the moiety is unsubstituted.

In one embodiment of the present disclosure, a direct coated anode using water soluble (aqueous-based) binders followed by heat treatment to convert the binder to carbon matrix is disclosed. The present disclosure addresses at least one or more of the following key advancements: 1) use of environmentally friendly water-based anode processing to allow safer, cheaper and faster processing and scalability; 2) Si dominant anodes with high Si content (>70 wt. %) for high capacity; and 3) the development of Si dominant anodes free of non-conducting binders capable of fast charging (>2C), i.e. anodes that contain only carbon and silicon. Although solvent-based anodes have had some effectiveness in improving cycle performance, these anodes may have weak adhesion to the current collector and contain non-continuous carbon media that leads to unacceptable performance. Also, although the introduction of carbon additives can somewhat improve the conductivity of the anode, the existence of carbon additives may weaken the adhesion of anode materials to the current collector. Thus, the binder plays an important role in improving the performance of silicon anodes.

Currently, polymeric binders may be used in silicon anode technologies to maintain the integrity of the anode during excessive volume changes during lithiation. For example, polyvinylidene difluoride (PVDF) is commonly used as a binder in graphite cells, but it is not capable of handling the excessive volume changes of silicon. Additionally, PVDF is soluble only in toxic organic solvents such as NMP, which require solvent recovery systems to recycle the solvent. Binders such as cellulose may also be used in conventional electrodes. However, these binders have not been successfully used in Si dominant anodes since the polymer interconnection between Si and carbon additives are not strong enough for excessive volume changes of Si. Additionally, most of the polymeric binders are soluble only in toxic organic solvents (e.g., NMP).

Some water-soluble polymers such as carboxymethyl cellulose (CMC), sucrose, poly(acrylic acid) (PAA), poly (vinyl alcohol) (PVA), starch, chitosan, lignin, and gums (e.g., xanthan gum) have been used as binders for preparing Si anodes. However, these polymers have not created a successful binder system that shows superior electrochemical performance and is capable of large-scale production.

In the present disclosure, aqueous-based polymer binders are disclosed. These polymers (also called resins) may be used as binders to fabricate silicon-based anode materials through creation of a water-based electrode slurry that is used as an electrode coating layer and further heat-treated (pyrolyzed). The polymer binder solution may also include various modifiers and/or additives in order to achieve the desired properties. The modifiers and/or additives include but are not limited to pH modifiers, viscosity modifiers, strengthening additives, surfactants and anti-foaming agents. The modifiers and/or additives may assist in any or all of, stabilizing, strengthening and/or adjusting the properties of the binder and may also serve as a carbon source themselves. The modifiers and/or additives may also apply in more than one category, for example, a compound may be a pH modifier and a viscosity modifier, etc.

In the present disclosure, water-soluble (aqueous-based) polymers and methods of making anodes including such polymers are disclosed. Methods for making and using water-soluble (aqueous-based) polymers involve include, but are not limited to, one or more of the following steps: aqueous based polymer solutions for electrode preparation; preparing polymer compositions with one or more additional components such as pH modifiers, viscosity modifiers, strengthening additives, surfactants and/or anti-foaming agents using water as the solvent and the preparation of slurries with Si; and using such slurries for coating of Si dominant anode. In some embodiments, the anode is subjected to a heat treatment (pyrolysis). The aqueous-based (water-soluble) polymers may be used for all different types of Si or SiOx anodes with or without a conductive (e.g. graphite) additive.

Aqueous-based (water-based) polymers (resins) useful as binders include, but are not limited to, polyimides, polyamideimides, phenolic resins (may be crosslinked), polysiloxanes, polyurethanes, polyvinyls, acrylics, polysaccharides, and derivatives thereof. The polymer binder is pyrolyzed into carbon during making of the electrode. These materials are the primary component of the binder and may function alone, or contain various additives (see below). The primary polymers (main resins) may have a carbon yield upon pyrolysis of greater than about 30%; in some embodiments the carbon yield may be 40-50% or more.

Example primary aqueous-based polymers include, but are not limited to, Polyamideimides (e.g. intl-innotek (GT- 720W, GT-721W, GT-722W); China-innotek (e.g. PIW-015, PIW-025, PIW-026); Elantas (e.g. Elan-bind 1015, Elan-bind 1015 NF); Solvay Torlon AI series (e.g. Al30, Al30-LM, Al10, Al10-LM)); Polyimide; Ammonium Ligno-sulfonate; Kraft Lignin; Phenolic resins (e.g. Plenco (Novolac Resins); Resol Resins; Polymethylol phenol; ERPENE (phenolic resin emulsion); Formaldehyde based Resins; Melamine-formaldehyde based resins; Silane based resins (e.g. Gelest); Silicones; Polyurethanes; Poly(vinyl acetate)/poly(vinyl alcohol) complexes; TOCRYL (acrylic emulsion); Poly(methacrylic acid); Polymethyl methacrylate; ACRONAL (water-based acrylic and stryrene-acrylic emulsion) polymers; STYROFAN (carboxylated styrene-butadiene); Acrylic resins; Poly(acrylic acid); Glycogen; Carbohydrates; Cellulose, Cellulose crystals (including cellulose nano-crystals); HEC (Hydroxy Ethyl Cellulose); CMHEC (Carboxy methyl hydroxy ethyl cellulose); Starch; Pullulan (polysaccharide polymer); Dextran; Chitosan; Helios Resins (includes polyester, polyacrylic, polyester and styrene/acrylic polymers; specifically DOMOPOL (polyester); DOMACRYL (polyacrylic); DOMALKYD (polyester) and DOMEMUL (styrene/acrylic)); and Rotaxane. Also contemplated are polymers having one or more of the following backbones: Sucrose, Glucose, Sucralose, Xylitol, Sorbitol, Sucralose, Glucosidases, Galactose, and Maltose.

In some embodiments, the primary aqueous-based polymers have a pyrolyzed carbon yield of over 40% after the pyrolysis process (~300-900° C. in the absence of oxygen), where the residual carbon forms a conductive matrix in the anode to facilitate electron and ion transfer.

One component that may be utilized with the above primary aqueous-based polymer binders is a pH modifier. The pH may be modified to be more acidic or more basic using modifiers that serve as an acid or a base, respectively. The pH may be modified to affect solubility, corrosiveness of the slurry, and control reactions involving the ingredients. The pH modifiers may also serve to adjust the viscosity of the polymer solution. The pH modifiers may also have carbon residue when pyrolyzed and serve as a secondary carbon precursor. In the case where the pH modifier has a low carbon yield, the pH modifier may increase porosity within the electrode.

Example acidic pH modifiers include, but are not limited to, Mineral acids; Amic acid; Butane tetracarboxylic acid (BTC); Tetracarboxylic acid (TC); Carboxylic acid; Licanic acid; Methacrylic acid; Acetic acid; Aminomethanesulfonic acid; Anthranilic acid; Benzenesulfonic acid; Benzoic acid; Camphor-10-sulfonic acid; Citric acid; Folic acid; Formic acid; Fumaric acid; Gallic acid; Lactic acid; Maleic acid; Malonic acid; Methanesulfonic acid; Nitrilotriacetic acid; Oxalic acid; Peracetic acid; Phthalic acid; Propionic acid; phosphoric acid; Salicylic acid; Sorbic acid; Succinic acid; Sulfamic acid; Sulfanilic acid; Tannic acid; Thioacetic acid; Trifluoromethanesulfonic acid; Phosphates (including phosphate esters and phosphate diesters); Acrylic acids; Aminophenylboronic acid; Fuconic acid; Ranirestat; and Phosphatase. Acidic pH modifiers also may modify viscosity as well.

Example basic pH modifiers include, but are not limited to, Triethanolamine; Triethylamine; Tripropylamine; Tributylamine; Tripentylamine; Trihexylamine; Trioctylamine; Triphenylamine; N-Methyldiethanolamine; Butyldiethanolamine; Diethylamine; Ethylamine; Tetrabutylammonium hydroxide; Tetramethylammonium hydroxide; Tetramethylammonium hydroxide; Triisopropanolamine; Trolamine; Amino-2-propanol; Triisobutylamine; N-Isopropyl-N-methyl-tert-butylamine; 2-Amino-2-methyl-1-propanol; 1-Amino-2-butanol; 2-Amino-1-butanol; Diethanolamine; Ethanolamine; 2-Dimethylaminoethanol; N-Phenyldiethanolamine; 2-(Dibutylamino)ethanol; 2-(Butylamino)ethanol; N-tert-Butyldiethanolamine; N-Ethyldiethanolamine; Avridine; and 2-(Diisopropylamino)ethanol. Basic pH modifiers also may modify viscosity as well.

Another component that may be utilized with the above primary aqueous-based polymer binders is a viscosity modifier. Viscosity modifiers typically increase the viscosity of the slurry to ensure easy coating or other processing. The modifiers may affect thixotropic properties and render the slurry more stable. The viscosity modifiers may also have carbon residue when pyrolyzed and serve as a secondary carbon precursor. In the case where the viscosity modifier has a low carbon yield, the viscosity modifier may increase porosity within the electrode (see discussion of secondary polymers below). Additionally, any of the primary polymers listed above could be used as a viscosity modifier for any of the other primary polymers if there is a viscosity difference between them.

Example viscosity modifiers include, but are not limited to, Polyvinylalcohol; Polyols; Polyethylene-co-vinyl alcohol; Poly(allyl alcohol); Polyesters (e.g. n-butylcellosolve); Carboxymethylcellulose; Myo-Inositol; Mannitol; Pinitol; Ribose; Sorbitol; Fucose; Maltodextrin; Ganglioside; Maltose; Sucrose; Glucose; Sucralose; Xylitol; Fructose; Palatinose hydrate; Dextran Sucrase; Guanosine; Inulin; Sucrose Phosphorylase; Glucosidases; AmberLite; Raffinose; Mannose; Psicose; Hexokinase; NADHs; Phosphoglucose; Phosphomannose; Topiramate; Furfurals; Nuciferine; Galactose; Maltose; and Hydroxymethylcellulose. In some embodiments, the viscosity modifier is a neutral compound.

A further component that may be utilized with the above primary aqueous-based polymer binders is a strengthening additive. Most strengthening additives are solid materials. These solids may be added to strengthen the electrode before and after heat treatment (pyrolysis or other heat treatment). Some of the additives that are conductive such as carbon and metal can also improve electrical and heat conductivity.

Example strengthening additives include, but are not limited to, Carbon nanofibers; Carbon nanotubes and carbon nanotube-based nanostructures; Conductive carbon black; Graphene; Graphene oxide; Carbon nanofibers+conductive carbon black; Carbon nanotube/carbon nanotube-based nanostructures+conductive carbon black; Carbon nanotube/carbon nanotube-based nanostructures+graphene/graphene oxide; Conductive carbon black+graphene/graphene oxide; Carbon nanotube/carbon nanotube-based nanostructures+conductive carbon black+graphene/graphene oxide; Alumina fibers, zirconia fibers; and Metal whiskers or nanowire (e.g. copper, nickel, tungsten, stainless steel) and mixtures and combinations thereof.

An additional component that may be utilized with the above primary aqueous-based polymer binders is a surfactant and/or anti-foaming agent. Surfactants help wetting of the powders and allow for better dispersion. Foaming is when air is entrained—in the case where reducing the foam is desired, an anti-foaming agent can be added.

Example surfactants include, but are not limited to, FluorN561 and FluorN562 (non-ionic polymer fluorosurfactants such as ethylene glycol based polymeric fluorosurfactants); Triton X100 (t-Octylphenoxypolyethoxyethanol); Polyvinylpyrrolidone; Detergents; Anionic surfactants (e.g. sulfate, sulfonate, and phosphate, carboxylate derivatives; such as Linear alkylbenzene sulfonates and Dioctyl sodium sulfosuccinate); Cationic surfactants (such as cetyl trimethylammonium bromide, Cetylpyridinium chloride); Zwitterionic surfactants; Ethoxylates; and Carboxy methyl cellulose (CMC), nonionic surfactants (such as TritonX and others such as Polyoxyethylene glycol, Polysorbate, Nonoxynol-9).

Example anti-foaming agents include, but are not limited to, Alcohols (e.g. ethanol, propanol, isopropanol); Oil based defoamers (e.g. mineral oil, vegetable oil, white oil, EBS, paraffin waxes, ester waxes, or fatty alcohol waxes); Fatty acid soaps; Esters; Silicone-based defoamers; and Alkyl polyacrylates. Some materials may function as both a surfactant and an anti-foaming agent.

When using the above components in making an electrode slurry, the composition contains silicon and a primary water-based (aqueous-based) polymer and may contain one or more of the above additional components in the following amounts (by weight): less than about 50% pH modifier, less than about 30% strengthening additive, less than about 50% viscosity modifier, less than about 10% surfactant, less than about 10% anti-foaming agent (percentages do not include the weight of the water). In some embodiments, the slurry contains greater than about 50% Si.

In one embodiment, an electrode may be made from an electrode slurry, where the slurry contains silicon and a primary water-based polymer and further comprises additional components of a pH modifier, viscosity modifier, and a surfactant. In a specific embodiment, the pH modifier is N-methyldiethanolamine, the viscosity modifier is poly(vinyl alcohol) and the surfactant is a non-ionic polymer fluorosurfactant.

In another example embodiment, the following composition may be used where the slurry components are a water-soluble resin, triethanolamine, polyacrylic acid, surfactant, silicon and water, and the amounts of the components (by weight) may be as follows: water-soluble resin from about 1-5%, triethanolamine from about 1-5%, polyacrylic acid from about 1-5%, surfactant from about 0.01-0.15%, silicon from about 15-25% and water from about 65-75%. Super P may be included in the above compositions in the amount from about 0.3-0.5%. In one specific embodiment, the components may be water-soluble resin 3.95%, triethanolamine 3.05%, polyacrylic acid 1.59%, surfactant 0.09%, and silicon 20.64%, with total DI water in the slurry of 70.69%. In another specific embodiment, the components may be water-soluble resin 3.95%, triethanolamine 3.05%, polyacrylic acid 1.59%, surfactant 0.09%, silicon 20.22%, and Super P 0.41%, with total DI water in the slurry of 70.69%.

In a further aspect, and in addition to the various modifiers and/or additives described above, the primary water-based polymers useful as binders as described above may also have another polymer present that functions as a secondary polymer. This secondary polymer may assist with control of electrode porosity by modifying the carbon yield. There may be one, or more than one, secondary polymers present.

When the direct coated silicon dominant anodes as described herein undergo a pyrolysis process, this may negatively affect the electrode/cell. Specifically, the pyrolysis may negatively affect any or all of (a) tensile strength of the copper current collector causing the anode to expand >1% in X and Y dimensions (and also in the Z dimension) during the cell's formation and cycling, (b) cell's cycle life, (c) cell's rate capability, and (d) adhesion of the electrode materials to the copper current collector. Most importantly, anode expansion may raise a concern regarding the safety of the cell and creates other complications such as anode disfiguration (warping or other changes) or disintegration during cycling. By controlling the porosity of the anode, the anode's expansion may be optimized, and its performance, rate capability, and adhesion may be improved. To control the porosity, secondary resins (secondary polymers) may be used. These secondary resins have a lower carbon yield with <30% contribution to the pyrolytic carbon in order to increase the overall porosity of the anode. Such anodes are shown herein to have lower X and Y expansion compared with silicon dominant anodes that lack a secondary polymer. On top of the reduction in the X and Y expansion, addition of a secondary resin with lower carbon yield may also improve the tensile strength, cycle life, rate capability, and adhesion of the active material to copper. In addition, an increase in the through resistance of the anode with use of the secondary resin may also be observed.

As demonstrated herein, electrodes with active material layers that are held together with certain pyrolyzed carbon show improved performance vs other electrode materials. Silicon based anodes (especially >50% silicon), in particular, may have superior characteristics for one or more of energy density, cost, low temperature performance, safety, and fast charging. The silicon anodes may be made by starting with slurries where certain resins are dissolved or suspended in water (e.g. water-based polymer binders). In some embodiments, slurries that contain these resins and active materials such as silicon then undergo a pyrolysis process (>500° C.) which may be advantageous for electrical conductivity, fast charge capability and cycle life compared with other commercialized and non-commercialized silicon containing anodes. In some embodiments, high carbon yield resins like polyamide-imide (PAI) and poly-imide (PI) resins may be utilized as the primary carbon precursor for both water-based slurries. The slurries may be directly coated on copper foil and calendered to form the green (or wet) anodes. These anodes may then be pyrolyzed at >500° C. (such as at about 400° C.) under inert atmosphere to form silicon dominant anodes which are assembled into cells. The cells may be formed and cycled at various test conditions.

As discussed above, anodes may have X, Y and Z expansion. For example, X and Y expansion may be >1%, and Z expansion may be >3% for a 5-layer~1 Ah cell (e.g. with 6 anodes and 5 cathodes) after formation and during cycling due to the large expansion of the silicon particles (100-300%) during lithiation. Such expansion is undesirable as it can make designing cells more complex and potentially hurt cycle life due to weakening of the carbon matrix and disintegration of the anode during cycling. The X, Y, and Z expansion may be partially or mostly irreversible. To mitigate the anode expansion, a secondary resin may be added to the slurry. The secondary resin should have a significantly lower carbon yield compared with the main resin (e.g. PAI or PI) and contributes <30% of the pyrolytic carbon. The secondary resin creates a well-controlled porous matrix that provides enough voids for the silicon particles to expand and as a result reduce one or more of the X, Y and/or Z expansion.

Example secondary polymers that can be used to control the porosity of the final electrode include; but are not limited to; those polymers listed above as viscosity modifiers and also the following: Ammonium Lignosulfonate; Kraft Lignin; Formaldehyde based Resins; melamine-formaldehyde based resins; Silane based resins (gelest); silicones; polyurethanes; poly(vinyl acetate)/poly(vinyl alcohol) complexes; TOCRYL (acrylic emulsion); poly(methacrylic acid); polymethyl methacrylate; ACRONAL (water-based acrylic and stryrene-acrylic emulsion) polymers; STYROFAN (carboxylated styrene-butadiene) binders; Acrylic Resins; poly (acrylic acid); glycogen; carbohydrates (other);

Cellulose crystals; cellulose nano-crystals; HEC (Hydroxy Ethyl Cellulose); CMHEC (Carboxy methyl hydroxy ethyl cellulose); cellulose; Starch; Pullulan (polysaccharide polymer); Dextran; chitosan; Helios Resins (includes polyester, polyacrylic, polyester and styrene/acrylic polymers; specifically DOMOPOL (polyester); DOMACRYL (polyacrylic); DOMALKYD (polyester) and DOMEMUL (styrene/acrylic)); rotaxane; and polymeric microbeads.

In some embodiments, a lithium-ion battery comprising an anode according to one or more embodiments described herein, may demonstrate one or more of the following advantages: increased cycle life, increased adhesion, reduced cost, improved safety, improved coulombic efficiency, increased electrical conductivity, reduced X & Y expansion, reduced Z expansion, improved porosity, improved capacity retention, improved flexibility and/or increased energy density.

In a further aspect, the water-based polymer binders and various modifiers and/or additives described herein may be utilized in a system where the solvent is eliminated or substantially reduced, resulting in a slurry where the solid content is increased. In some embodiments, the solid content of the slurry may be equal to or greater than 50%, 70%, 80%, 90% or higher. In one embodiment, the system is a solvent-free system. That is, the polymer binders may be part of an energy storage device in which no solvent is used (water or other solvent). For example, silicon can be combined with a resin material in a solvent-free extrusion process or a two-step process involving deposition and hot roll pressing.

Since the solvent is reduced or eliminated, the materials would be processed under high heat, pressure, shear, and/or a combination thereof. The overall amount of polymers versus active material may also be reduced by 20%, 30%, 50% or more (due, at least in part, to not having to process the slurry in a standard low viscosity mixer) which may have performance benefits such as higher initial coulombic efficiency, higher reversible capacity, and better cycle life.

The water-based polymer binders described herein may be advantageously utilized within an energy storage device. In some embodiments, energy storage devices may include batteries, capacitors, and battery-capacitor hybrids. In some embodiments, the energy storage device comprises lithium. In some embodiments, the energy storage device may comprise at least one electrode, such as an anode and/or cathode. In some embodiments, at least one electrode may be a Si-based electrode. In some embodiments, the Si-based electrode is a Si-dominant electrode, where silicon is the majority of the active material used in the electrode (e.g., greater than 50% silicon). In some embodiments, the energy storage device comprises a separator. In some embodiments, the separator is between a first electrode and a second electrode.

In some embodiments, the amount of silicon in the electrode material (active material) includes between about 30% and about 95% by weight, between about 50% and about 85% by weight, and between about 75% and about 95% by weight. In other embodiments, the amount of silicon in the electrode material may be at least about 30% by weight; greater than 0% and less than about 95% by weight; or between about 50% and about 95% by weight. In some embodiments, the amount of silicon is about 95-99%; about 96-99% or about 97-99%. In some embodiments, the electrode is silicon dominant (>50% silicon); in other embodiments, the amount of silicon is 70% or more. Furthermore, the silicon particles may or may not be pure silicon. For example, the silicon particles may be substantially silicon or may be a silicon alloy. In one embodiment, the silicon alloy includes silicon as the primary constituent along with one or more other elements.

Figure 2:
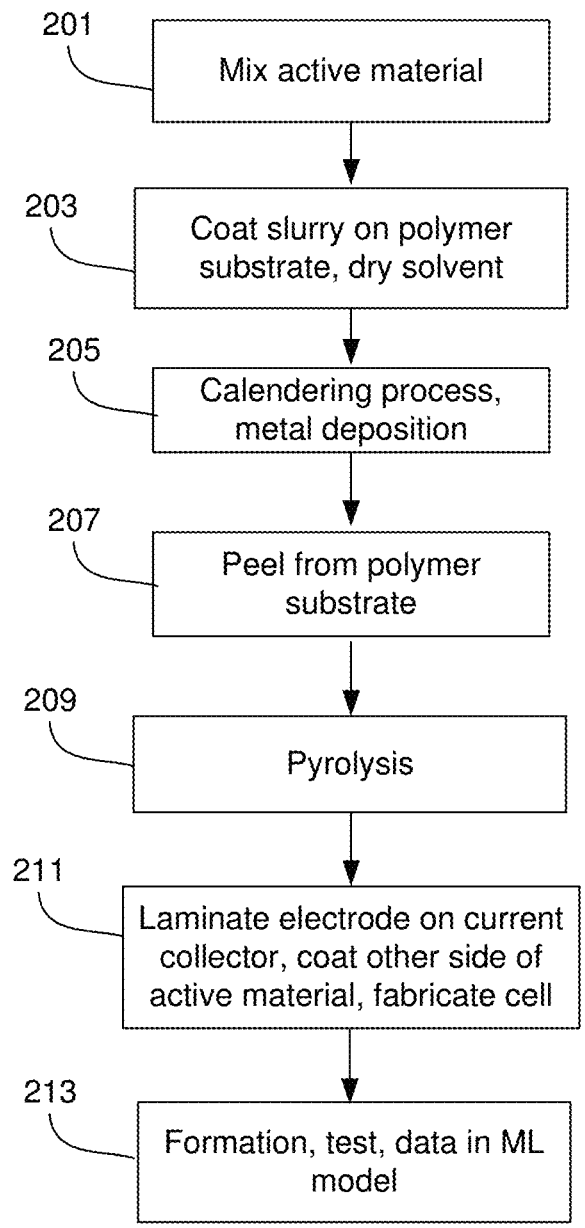
FIG. 2 is a flow diagram of a lamination process for forming a silicon-dominant anode cell, in accordance with an example embodiment of the disclosure.

FIG. 2 is a flow diagram of a lamination process for forming a silicon-dominant anode cell, in accordance with an example embodiment of the disclosure. This process employs a pyrolysis process on a substrate, layer removal, and a lamination process to adhere the active material layer to a current collector. This strategy may also be adopted by other anode-based cells, such as graphite, conversion type anodes, such as transition metal oxides, transition metal phosphides, and other alloy type anodes, such as Sn, Sb, Al, P, etc.

The raw electrode active material is mixed in step 201. In the mixing process, the active material may be mixed with a binder/resin (such as water-soluble polyimide (PI), polyamideimide (PAI), Phenolic or other water-soluble resins and mixtures and combinations thereof), solvent, rheology modifiers, surfactants, pH modifiers, and conductive additives to form a slurry to use as an electrode coating layer. The materials may comprise carbon nanotubes/fibers, graphene sheets, metal polymers, metals, semiconductors, and/or metal oxides, for example. In one embodiment, silicon powder with a 1-30 or 5-30 µm particle size, for example, may then be dispersed in polyamic acid resin, polyamide-imide, or polyimide (15-25% solids in N-Methyl pyrrolidone (NMP) or DI water) at, e.g., 1000 rpm for, e.g., 10 minutes, and then the conjugated carbon/solvent slurry may be added and dispersed at, e.g., 2000 rpm for, e.g., 10 minutes to achieve a slurry viscosity within 2000-4000 cP and a total solid content of about 30-40%. Particle sizes may be either as the D50 (median diameter), and/or as the size range—D10 to D90). The pH of the slurry can be varied from acidic to basic, which may be beneficial for controlling the solubility, conformation, or adhesion behavior of water-soluble polyelectrolytes, such as polyamic acid, carboxymethyl cellulose, or polyacrylic acid. Ionic or non-ionic surfactants may be added to facilitate the wetting of the insoluble components of the slurry or the substrates used for coating processes.

The particle size and mixing times may be varied to configure the electrode coating layer density and/or roughness. Furthermore, cathode electrode coating layers may be mixed in step 201, where the electrode coating layer may comprise lithium cobalt oxide (LCO), lithium iron phosphate, lithium nickel cobalt manganese oxide (NMC), Ni-rich lithium nickel cobalt aluminum oxide (NCA), lithium manganese oxide (LMO), lithium nickel manganese spinel, LFP, Li-rich layer cathodes, LNMO or similar materials or combinations thereof, mixed with carbon precursor and additive as described above for the anode electrode coating layer.

In step 203, the slurry may be coated on a substrate. In this step, the slurry may be coated onto a Polyester, polyethylene terephthalate (PET), or Mylar film at a loading of, e.g., 2-4 mg/cm$^2$ and then undergo drying to an anode coupon with high Si content and less than 15% residual solvent content. This may be followed by an optional calendering process in step 205, where a series of hard pressure rollers may be used to finish the film/substrate into a smoother and denser sheet of material.

In step 207, the green film may then be removed from the PET, where the active material may be peeled off the polymer substrate, the peeling process being optional for a polypropylene (PP) substrate since PP can leave ~2% char residue upon pyrolysis. The peeling may be followed by a pyrolysis step 209 where the material may be heated to 400-1250C for 1-3 hours, cut into sheets, and vacuum dried using a two-stage process (120° C. for 15 h, 220° C. for 5 h).

In step 211, the electrode material may be laminated on a current collector. For example, a 5-20 μm thick copper foil may be coated with polyamide-imide with a nominal loading of, e.g., 0.2-0.6 mg/cm² (applied as a 6 wt % varnish in NMP and dried for, e.g., 12-18 hours at, e.g., 110° C. under vacuum). The anode coupon may then be laminated on this adhesive-coated current collector. In an example scenario, the silicon-carbon composite film is laminated to the coated copper using a heated hydraulic press. An example lamination press process comprises 30-70 seconds at 300° C. and 3000-5000 psi, thereby forming the finished silicon-composite electrode.

In step 213, the cell may be assessed before being subject to a formation process. The measurements may comprise impedance values, open-circuit voltage, and thickness measurements. During formation, the initial lithiation of the anode may be performed, followed by delithiation. Cells may be clamped during formation and/or early cycling. The formation cycles are defined as any type of charge/discharge of the cell that is performed to prepare the cell for general cycling and is considered part of the cell production process. Different rates of charge and discharge may be utilized in the formation steps.

Figure 3:
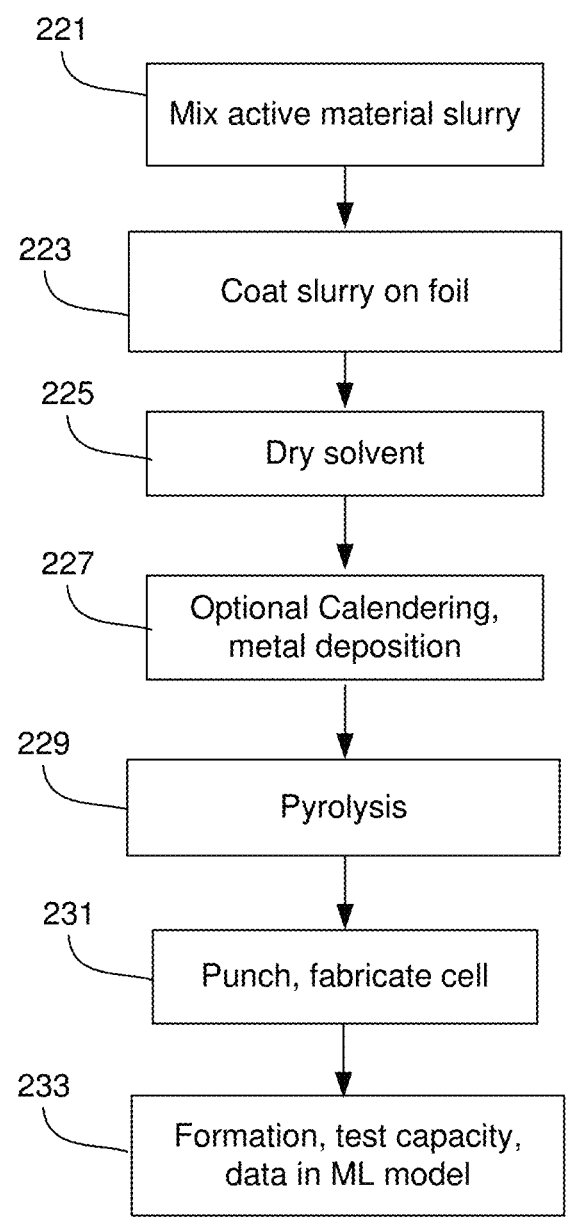
FIG. 3 is a flow diagram of a direct coating process for forming a silicon-dominant anode cell, in accordance with an example embodiment of the disclosure.

FIG. 3 is a flow diagram of a direct coating process for forming a silicon-dominant anode cell, in accordance with an example embodiment of the disclosure. This process comprises physically mixing the active material, conductive additive, and binder together, and coating it directly on a current collector before pyrolysis. This example process comprises a direct coating process in which an anode or cathode slurry is directly coated on a copper foil using a binder.

In step 221, the active material may be mixed, e.g., a binder/resin, solvent (such as DI water, or other environmentally benign solvents or their mixtures and combinations thereof), and conductive additives. The materials may comprise carbon nanotubes/fibers, graphene sheets, metal polymers, metals, semiconductors, and/or metal oxides, for example. Silicon powder with a 1-30 μm particle size (either as the D50 (median diameter), and/or as the size range—D10 to D90), for example, may then be dispersed in a polymer binder solution at, e.g., 1000 rpm for, e.g., 10 minutes, and then the conjugated carbon/solvent slurry may be added and dispersed at, e.g., 2000 rpm for, e.g., 10 minutes to achieve a slurry viscosity within 2000-4000 cP and a total solid content of about 30-40%.

Furthermore, cathode active materials may be mixed in step 221, where the active material may comprise lithium cobalt oxide (LCO), lithium iron phosphate, lithium nickel cobalt manganese oxide (NMC), lithium nickel cobalt aluminum oxide (NCA), lithium manganese oxide (LMO), lithium nickel manganese spinel, or similar materials or combinations thereof, mixed with a binder as described above for the anode active material.

In step 223, the slurry may be coated on copper foil. In the direct coating process described here, an anode slurry is coated on a current collector with residual solvent followed by a calendering process for densification. Similarly, cathode active materials may be coated on a foil material, such as aluminum, for example. The active material layer may undergo drying in step 225 resulting in reduced residual solvent content. An optional calendering process may be utilized in step 227 where a series of hard pressure rollers may be used to finish the film/substrate into a smoother and denser sheet of material. In step 227, the foil and coating proceed through a roll press for lamination.

In step 229, the active material may be pyrolyzed by heating to 400-1000° C. such that carbon precursors are partially or completely converted into glassy carbon. Pyrolysis can be done either in roll form or after punching. If done in roll form, the punching is done after the pyrolysis process. The pyrolysis step may result in an anode active material having silicon content greater than or equal to 50% by weight, where the anode has been subjected to heating at or above 400 degrees Celsius. In an example scenario, the anode active material layer may comprise 20 to 95% silicon and in yet another example scenario may comprise 50 to 95% silicon by weight. In instances where the current collector foil is not pre-punched/pre-perforated, the formed electrode may be perforated with a punching roller, for example. The punched electrodes may then be sandwiched with a separator and electrolyte to form a cell. In some embodiments, the anode active material has silicon content greater than or equal to 70% by weight. Additionally, in some embodiments, pyrolysis may be performed at a lower temperature, such as between about 300-900° C., about 300-750° C., about 300-500° C. or about 300-400° C.

Further, once pyrolyzed, the remainder of the anode (that is not silicon) may be pyrolytic carbon. In some embodiments, when strengthening additives are utilized, the remainder of the anode that is not silicon may comprise both pyrolytic carbon and strengthening additives. In some embodiments, the amount of pyrolytic carbon may be less than or equal to 30%; or be less than or equal to 15%. When strengthening additives are present, the amount of strengthening additives may be less than or equal to 30%.

In step 233, the cell may be assessed before being subject to a formation process. The measurements may comprise impedance values, open-circuit voltage, and thickness measurements. During formation, the initial lithiation of the anode may be performed, followed by delithiation. Cells may be clamped during formation and/or early cycling. The formation cycles are defined as any type of charge/discharge of the cell that is performed to prepare the cell for general cycling and is considered part of the cell production process. Different rates of charge and discharge may be utilized in the formation steps.

In some aspects, energy storage devices such as batteries are provided. In some embodiments, the energy storage device includes a first electrode and a second electrode, wherein at least one of the first electrode and the second electrode is a Si-based electrode. In some embodiments, the energy storage device includes a separator between the first electrode and the second electrode. In some embodiments, the energy storage device includes an electrolyte, which may be provided as an electrolyte composition.

In some embodiments, the second electrode is a Si-dominant electrode. In some embodiments, the second electrode comprises a self-supporting composite material film. In some embodiments, the composite material film comprises greater than 0% and less than about 95% by weight of silicon particles, and greater than 0% and less than about 90% by weight of one or more types of carbon phases, wherein at least one of the one or more types of carbon phases is a substantially continuous phase that holds the composite material film together such that the silicon particles are distributed throughout the composite material film. In further embodiments, the composite material film comprises greater than 0% and less than about 99% by weight of silicon particles; greater than 50% and less than about 99% by weight of silicon particles; greater than 70% and less than about 99% by weight of silicon particles; or greater than 80% and less than about 99% by weight of silicon particles.

In some embodiments, the battery may be capable of at least 200 cycles with more than 80% cycle retention when cycling with a C-rate of >2C cycling between an upper voltage of >4V and a lower cut-off voltage of <3.3V. In other embodiments, the battery may be capable of at least 200 cycles with more than 80% cycle retention when cycling with a C-rate of >2C cycling between an upper voltage of >4V and a lower cut-off voltage of <3.3V.

Example devices and processes for device fabrication are generally described below, and the performances of lithium-ion batteries with different electrode compositions may be evaluated. Slurry properties with various additives and modifiers may be assessed.

In this example, a slurry (Formulation 1) composed of PAI and PAA may be prepared and coated on a 15 µm copper foil. The coated anode may be calendered at 70° C., punched to small pouches and pyrolyzed at 650° C., 5°/min ramp, and 180 min dwell time under argon atmosphere.

TABLE 1

| Formulation 1 (wt %) | |
| --- | --- |
| Silicon powder | 20.92% |
| PAI solution (6%) in DI water | 66.91% |
| Polyacrylic acid (PAA) solution (12%) in DI water | 12.06% |
| Surfactant | 0.1% |

The slurry (Formulation 1) has a viscosity of 2500 cp at room temperature. and pH of ~5.0. The PAI component may be used as the primary carbon source (primary polymer) for the silicon composite matrix, but has relatively low viscosity by itself (~100 cP in this instance). PAA may be used as both viscosity modifier (required to bring the slurry to the process window for a slot die coater) and pH modifier (promoting adhesion to the substrate) as well as serving as another carbon source.

Figure 4:
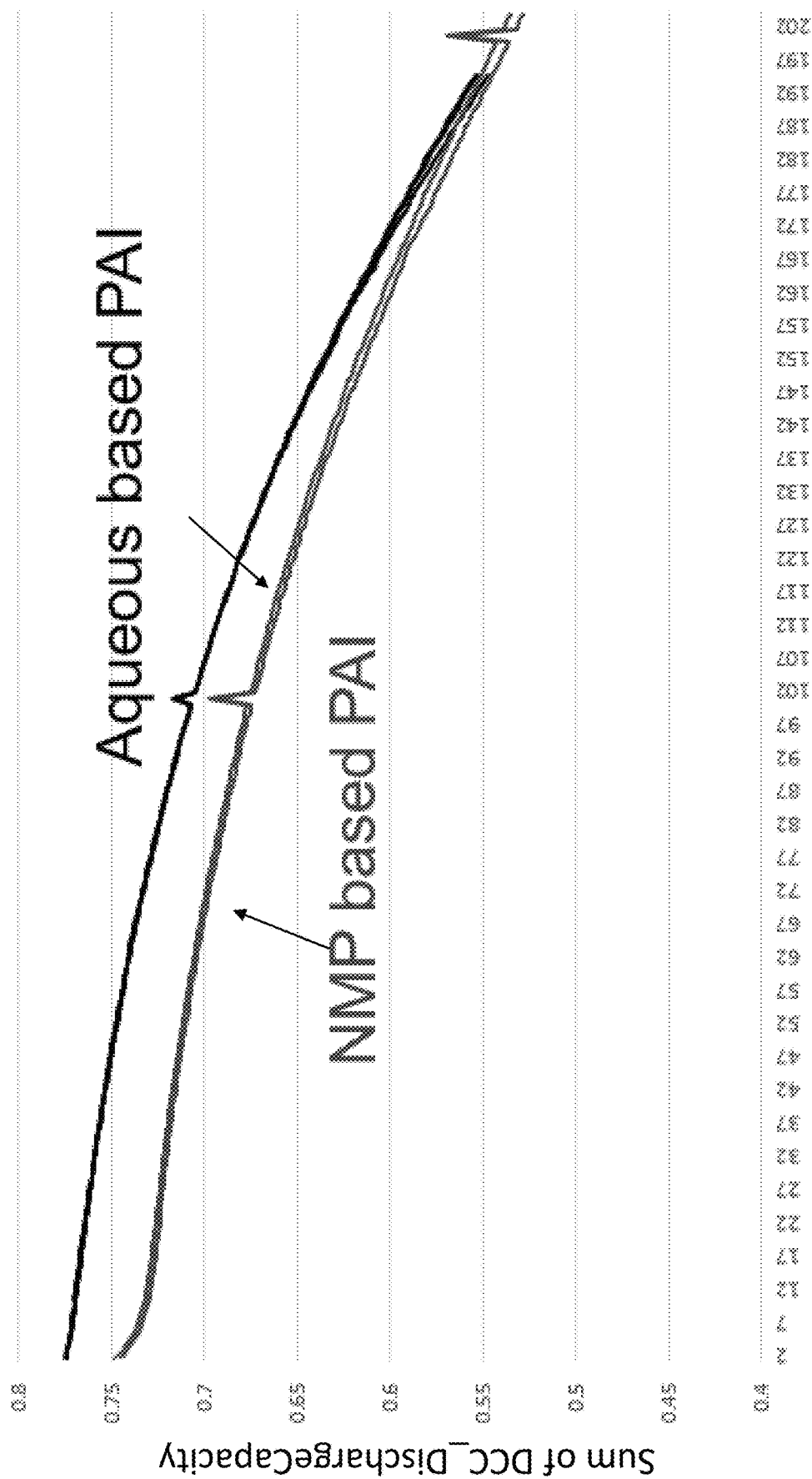
FIG. 4 compares the performance of an aqueous based PAI resin (Formulation 1) to a NMP based PAI resin, in accordance with an example embodiment of the disclosure.

FIG. 4 compares the performance of the aqueous based PAI resin (Formulation 1) to the NMP based PAI resin. It specifically shows the cycling performance of the anode compared with the control (an NMP based anode) tested at 2C (4.2V)-0.5C (2.75V) at room temperature.

In another example, a slurry (Formulation 2) composed of the following materials may be prepared and coated on a 15 µm copper foil. In this case, PAA may be replaced with a 10% solution of polyvinyl alcohol (PVA) in DI water as viscosity modifier. The coated anode may be calendered at 70° C., punched to small pouches and pyrolyzed at 650° C., 5°/min ramp, and 180 min dwell time under argon atmosphere.

TABLE 2

| Formulation 2 (wt %) | |
| --- | --- |
| Silicon powder | 16.97% |
| PAI solution (6%) in DI water | 54.36% |
| Polyvinyl alcohol (PVA) solution (10%) in DI water | 25.41% |
| DI water | 3.17% |
| Surfactant | 0.09% |

Figure 5:
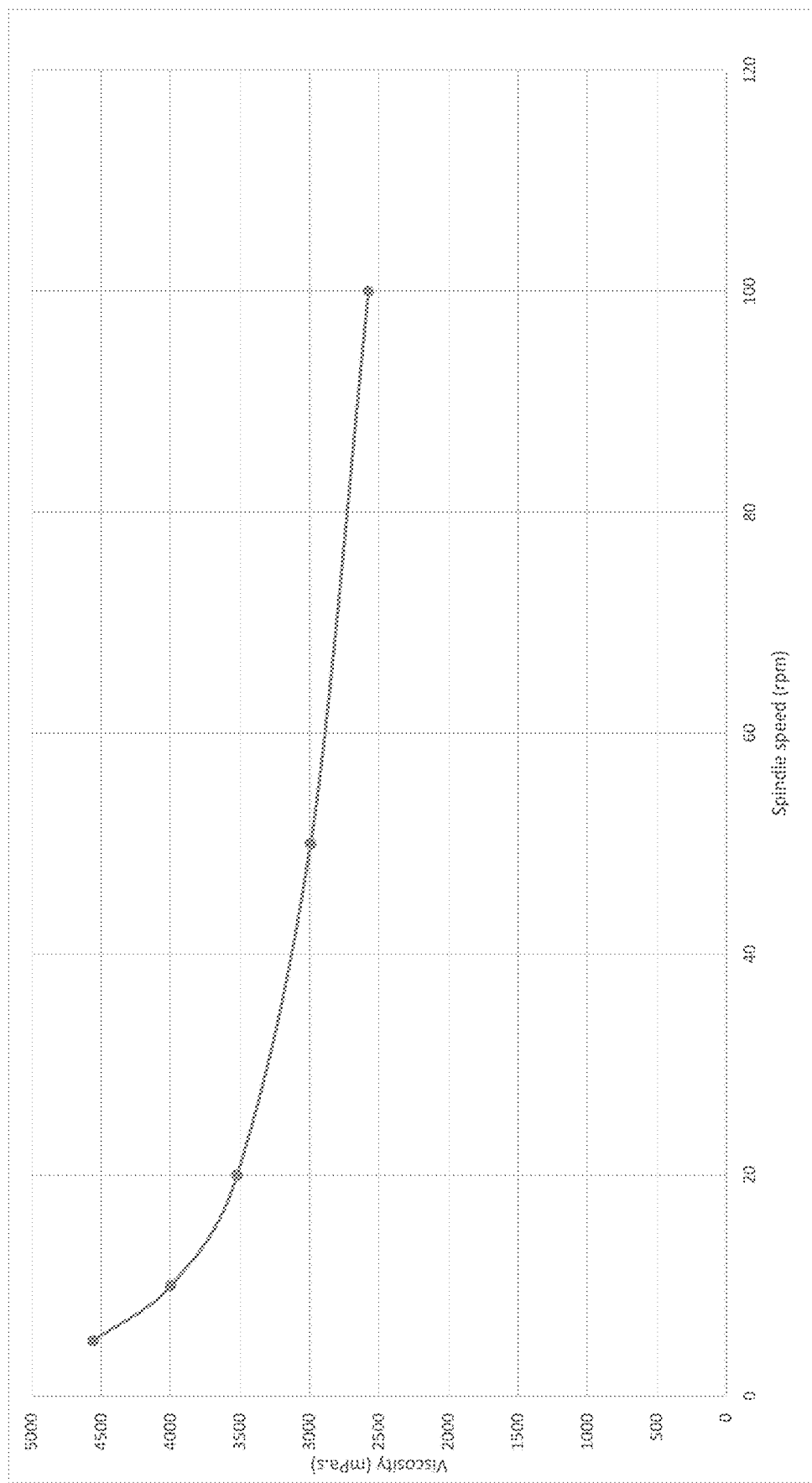
FIG. 5 shows the viscosity vs. spindle speed for Formulation 2, measured with a Brookfield rotational viscometer, in accordance with an example embodiment of the disclosure.

FIG. 5 shows the viscosity vs. spindle speed for Formulation 2, measured with a Brookfield rotational viscometer. The slurry (Formulation 2) had a viscosity of 2600 cp at r.t. and pH of ~7.3. PVA acts as a viscosity modifier.

Anodes from slurry Formulation 1 and Formulation 2 may be pyrolyzed at 650° C. for 3 hours before assembling into cells.

In another example, Super P carbon may be added to an aqueous based slurry (Formulation 3) to increase the Initial Coulombic Efficiency (ICE) of the aqueous based anode. For this purpose a slurry with the following formulation may be prepared and coated on a 15 um copper foil. The coated anode may be calendered at 70° C., punched to small pouches and pyrolyzed at 650° C., 5°/min ramp, and 180 min dwell time under argon atmosphere.

TABLE 3

| Formulation 3 (wt %) | |
| --- | --- |
| Silicon powder | 20.03% |
| PAI solution (6%) in DI water | 68.63% |
| PAA solution (12%) in DI water | 10.04% |
| Super P | 1.20% |
| Surfactant | 0.1% |

As a result of the Super P addition to the slurry formulation the anode through resistance may be reduced by 50% or more, as shown in the Table 4 below.

TABLE 4

| Anode Formulation | Through resistance Ω |
| --- | --- |
| Pristine aqueous based anode | 1.22 |
| Aqueous based anode + Super P | 0.53 |

Figure 6:
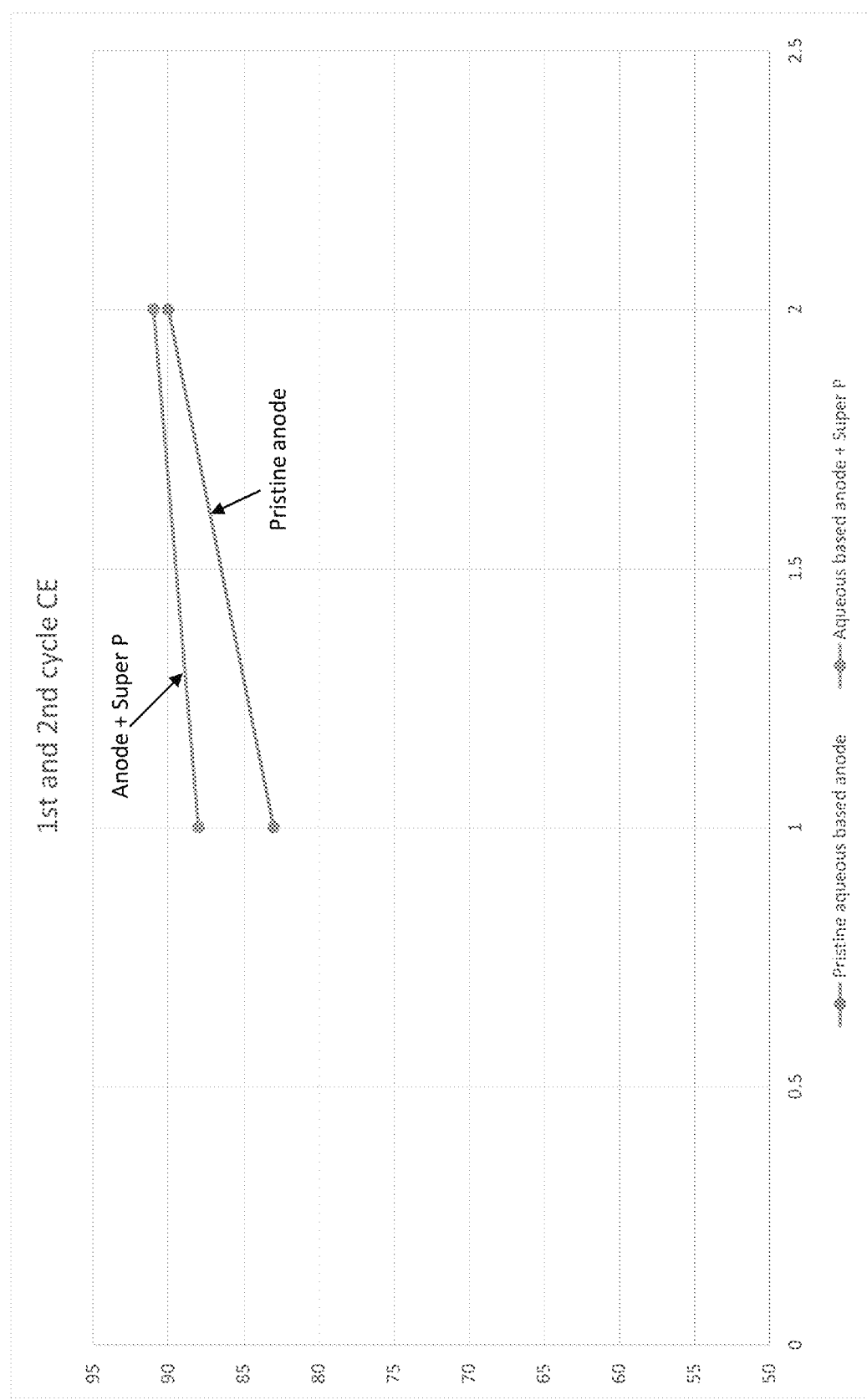
FIG. 6 shows initial coulombic efficiency for cells containing anodes with and without Super P, in accordance with an example embodiment of the disclosure.

FIG. 6 shows initial coulombic efficiency reported for cells containing anodes with and without Super P. Specifically, the figure shows the 1st and 2nd cycle coulombic efficiency of the Formulation 3 anode versus the pristine electrode with no Super P additive (Formulation 1).

In another example, vapor grown carbon fiber (VGCF) may be added to the aqueous based slurry (Formulation 4) to increase the Initial Coulombic Efficiency (ICE) of the aqueous based anode. For this purpose a slurry with Formulation 4 may be prepared and coated on a 20 um copper foil. The coated anode may be calendered at 60° C., punched to small pouches and pyrolyzed at 650° C., 5°/min ramp, and 180 min dwell time under argon atmosphere. The slurry had a viscosity of about 2000 cp at room temperature.

TABLE 5

| Formulation 4 (wt %) | |
| --- | --- |
| Silicon powder | 22.94% |
| PAI solution (6%) in DI water | 72.71% |
| PAA solution (12%) in DI water | 3.71% |
| VGCF | 0.53% |
| Surfactant | 0.11% |

In another example, the effect of the slurry pH on the adhesion and performance of the aqueous based silicon dominant anodes may be investigated using two slurries.

One slurry was Formulation 1 above, which has a pH of about 5.0. The other slurry was Formulation 5 (Table 6, below), which has a pH of about 7.5. Formulation 5 adds Trizma base to Formulation 1 to increase the pH of the slurry from 5.0 to 7.5.

TABLE 6

| Formulation 5 (wt %) | |
| --- | --- |
| Si powder | 20.04% |
| PAI solution (6%) | 64.09% |
| PAA solution (12%) | 11.56% |
| Surfactant | 0.10% |
| Trizma base | 4.21% |

Anodes from slurry Formulation 1 and Formulation 5 may be pyrolyzed at 650° C., 5°/min ramp, and 180 min dwell time under argon atmosphere before assembling into cells.

Figure 7:
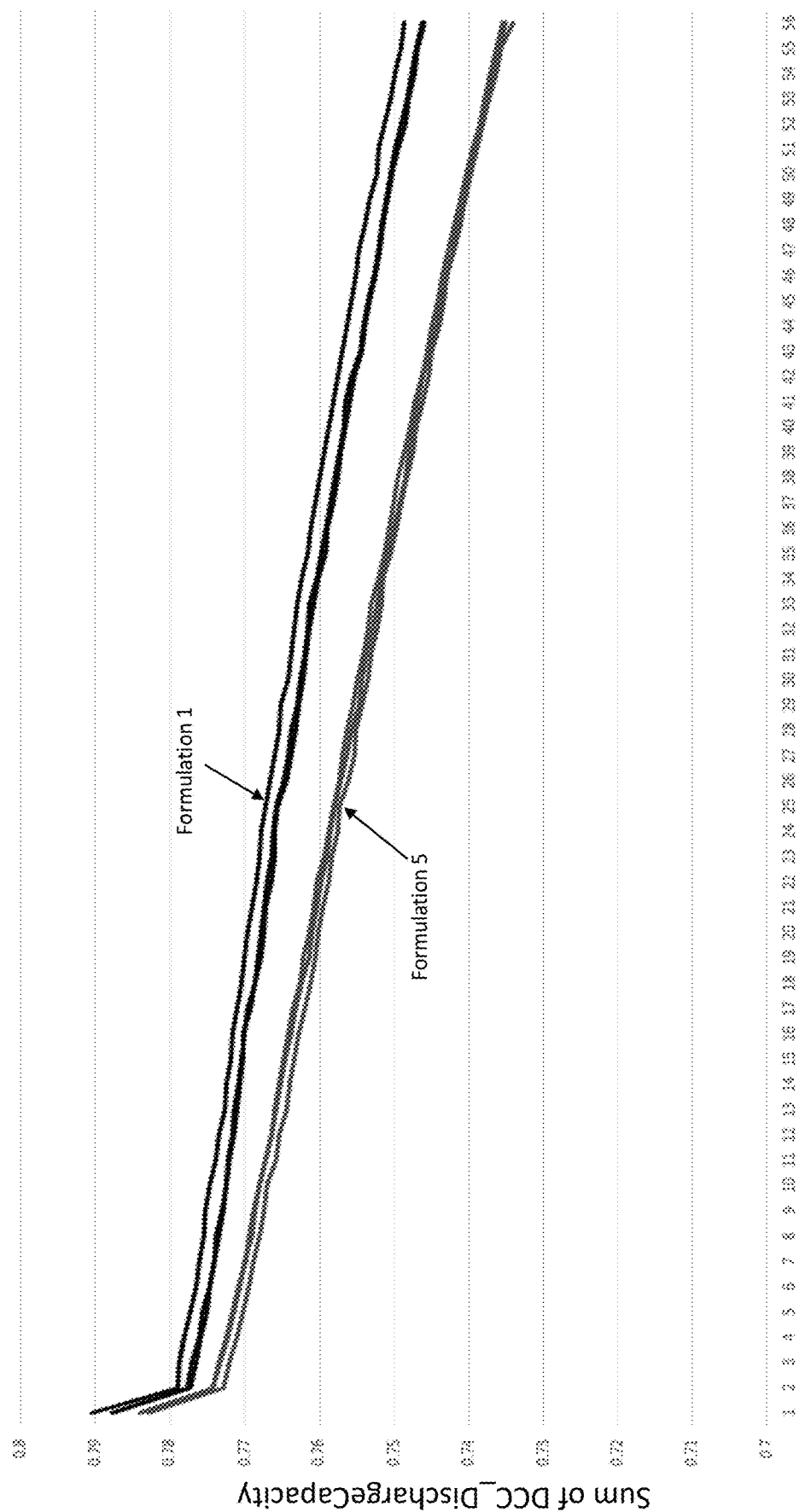
FIG. 7 shows capacity retention of the cells with silicon dominant anodes made with slurries with various pH (NCM cathode between 4.2V-2.75V), in accordance with an example embodiment of the disclosure.

FIG. 7 shows the capacity retention of the cells with each slurry versus the NCM811 cathode. As is evident from the figure, the cells made with the slurry of Formulation 1 show improved capacity retention compared with the cell made with the slurry of Formulation 5. In this example all cells may be cycled between 4.2V(2C)-2.75V(0.5C).

Further tests of the anode properties may be performed. For example, Table 7 shows the result of the adhesion test for pyrolyzed anodes with pH~5 and pH~7 slurries. The numbers are based off of the amount of weight that pyrolyzed anodes could hold before the electrode material detached from the copper current collector.

TABLE 7

| Adhesion test | Grams weight held before detachment from copper |
| --- | --- |
| Formulation 1 (pH~5.0) | 100 |
| Formulation 5 (pH~7.5) | 60 |

Comparison of the adhesion test showing the pyrolyzed anode with slurry Formulation 1 (pH~5) may have 40% better adhesion than the pyrolyzed anode with slurry Formulation 5 (pH~7.5).

In the above examples, aqueous based PAI (6% in deionized (DI) water) with a carbon yield of ~52% at 650° C. may be used as carbon precursor and the main carbon matrix holding silicon particles together. This 6% solution of PAI in DI water may be prepared using the following formulation at less than 90° C. Triethanolamine may be used as a complexing amine, which functions as a pH modifier to allow the PAI resin to remain soluble or dissolve in water.

TABLE 8

| (wt %) | |
| --- | --- |
| Aqueous based PAI (wet cake; contains: 35% polymer, 63% water, 2% organic material) | 17.09% |
| DI Water | 78.29% |
| Triethanolamine | 4.62% |

Figure 8:
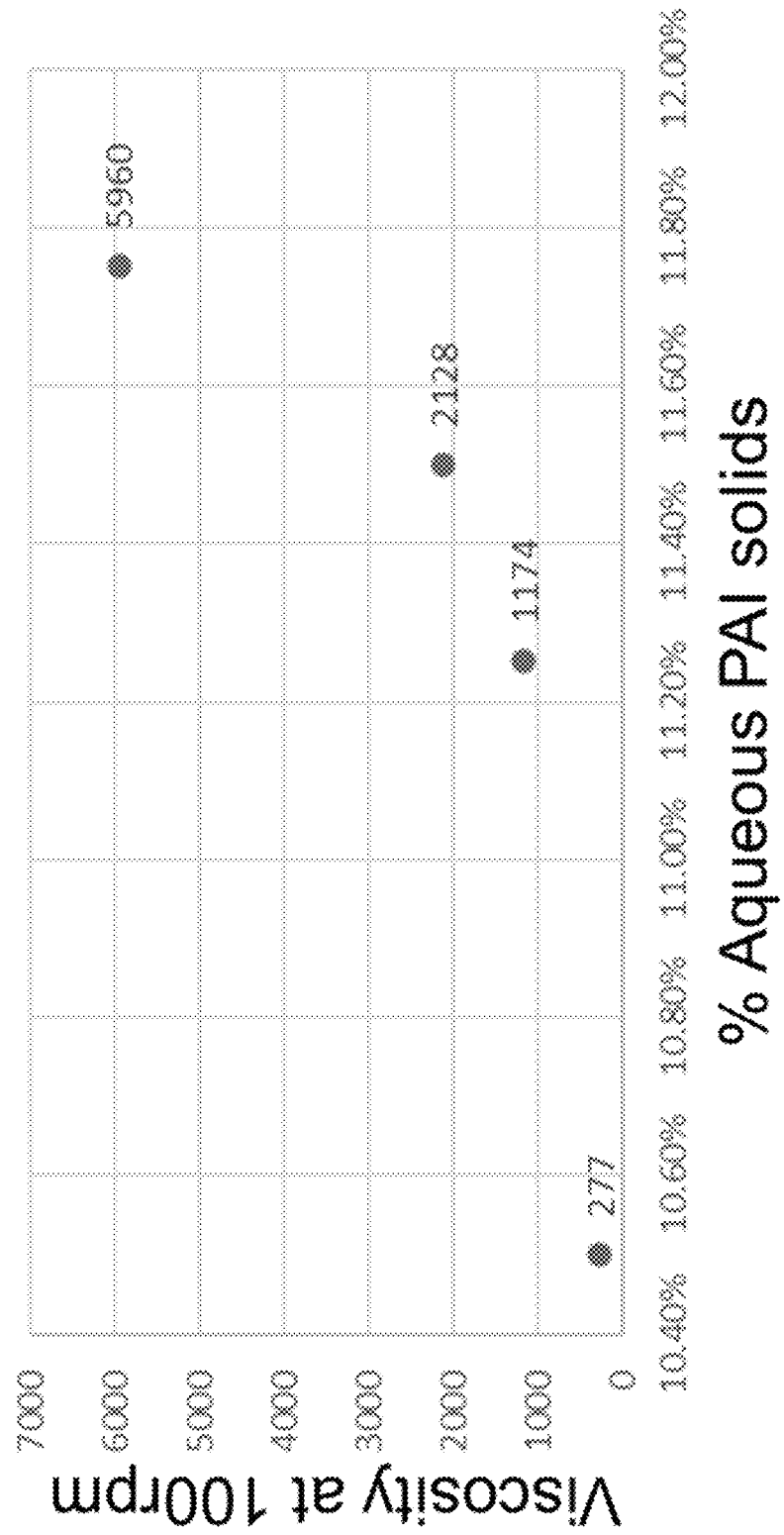
FIG. 8 shows aqueous binder viscosities, at 100 rpm, at different concentrations of PAI with 1.5 equivalent of complexing amine (N-Methyldiethanolamine) per molecule of the polymer, in accordance with an example embodiment of the disclosure.

In another example, the PAI polymer and amine (base) concentration may be modified to control the viscosity of the binder solution without the need of any additional further viscosity modifiers. In FIG. 8, polymer binder concentration may be adjusted to change viscosity while keeping 1.5 equivalents of complexing amine, N-Methyldiethanolamine, per unit of the polymer. Specifically, FIG. 8 shows aqueous binder viscosities, at 100 rpm, of different concentrations of PAI with 1.5 equivalents of complexing amine, N-Methyldiethanolamine, per molecule of the polymer. As above, the complexing amine, N-Methyldiethanolamine, functions as a pH modifier to allow the PAI resin to remain soluble or dissolve in water.

Similarly, viscosity of the aqueous binder solution can be adjusted by changing the base concentration while keeping polymer concentration constant. Increasing the viscosity by adding a volatile compound (rather than additional polymer) allows the formulation to be tuned for various applications. For instance, to increase porosity in a coating it may be preferable to add more volatile material to the formulation. Typically, this would result in a decrease in viscosity, which may negatively impact the coating process, but in this case the viscosity would increase, which can be offset by adding extra solvent (which further increases volatile content as desired in this scenario). The same concept may applied in reverse to achieve a lower viscosity without reducing the solid content.

Figure 9:
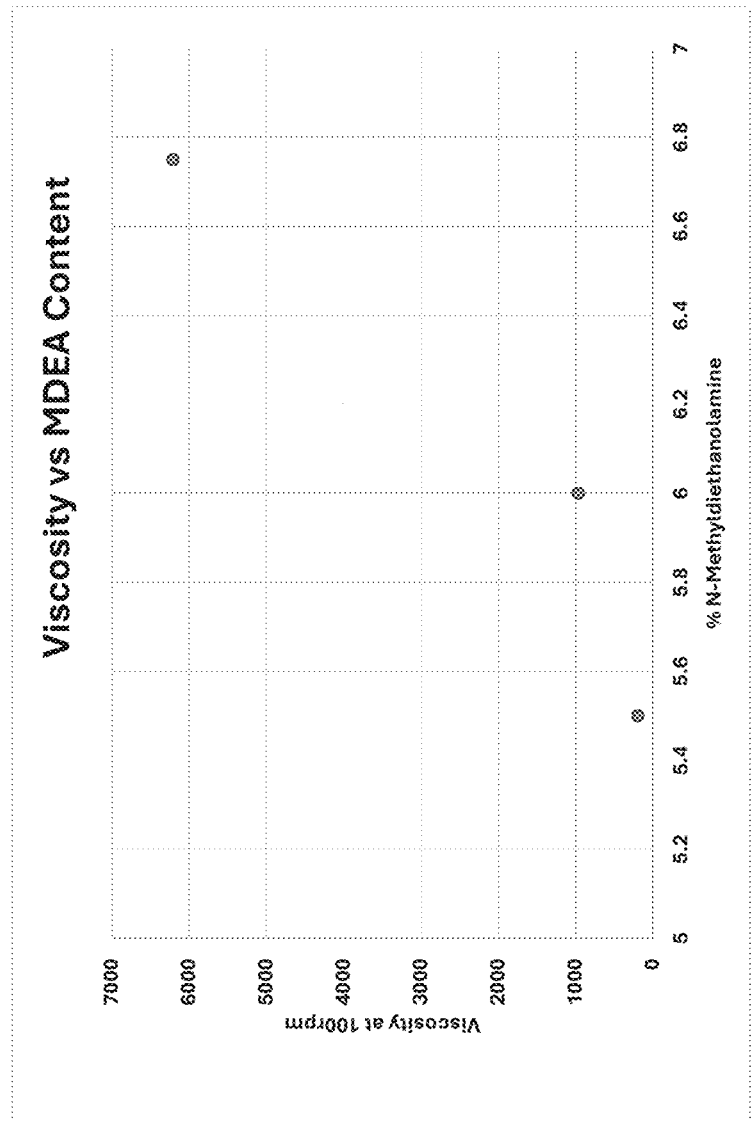
FIG. 9 shows changes in binder viscosity with changes in concentration of N-Methyldiethanolamine (while keeping polymer solids at 9%), in accordance with an example embodiment of the disclosure.

For example, FIG. 9 shows binder viscosity changes when the concentration of N-Methyldiethanolamine is changed while keeping the polymer solids at 9%.

From FIGS. 8 and 9 it can be seen that one can use the above polymer binder formulations to design an aqueous electrode slurry to target a specific viscosity for coating process. Since these slurries can be made without viscosity modifiers, they tend to be basic (i.e., in the 7-9 pH range) depending on the amount of complexing amine used.

A further example of a slurry for coating may have (by weight) about 28-29% of Si, 6-7% of aqueous PAI solids, 3-4% of complexing amine with the remaining as water. After pyrolysis process the final composition will be close to 90% Si with the remainder being pyrolyzed carbon derived from the aqueous binder.

Figure 10:
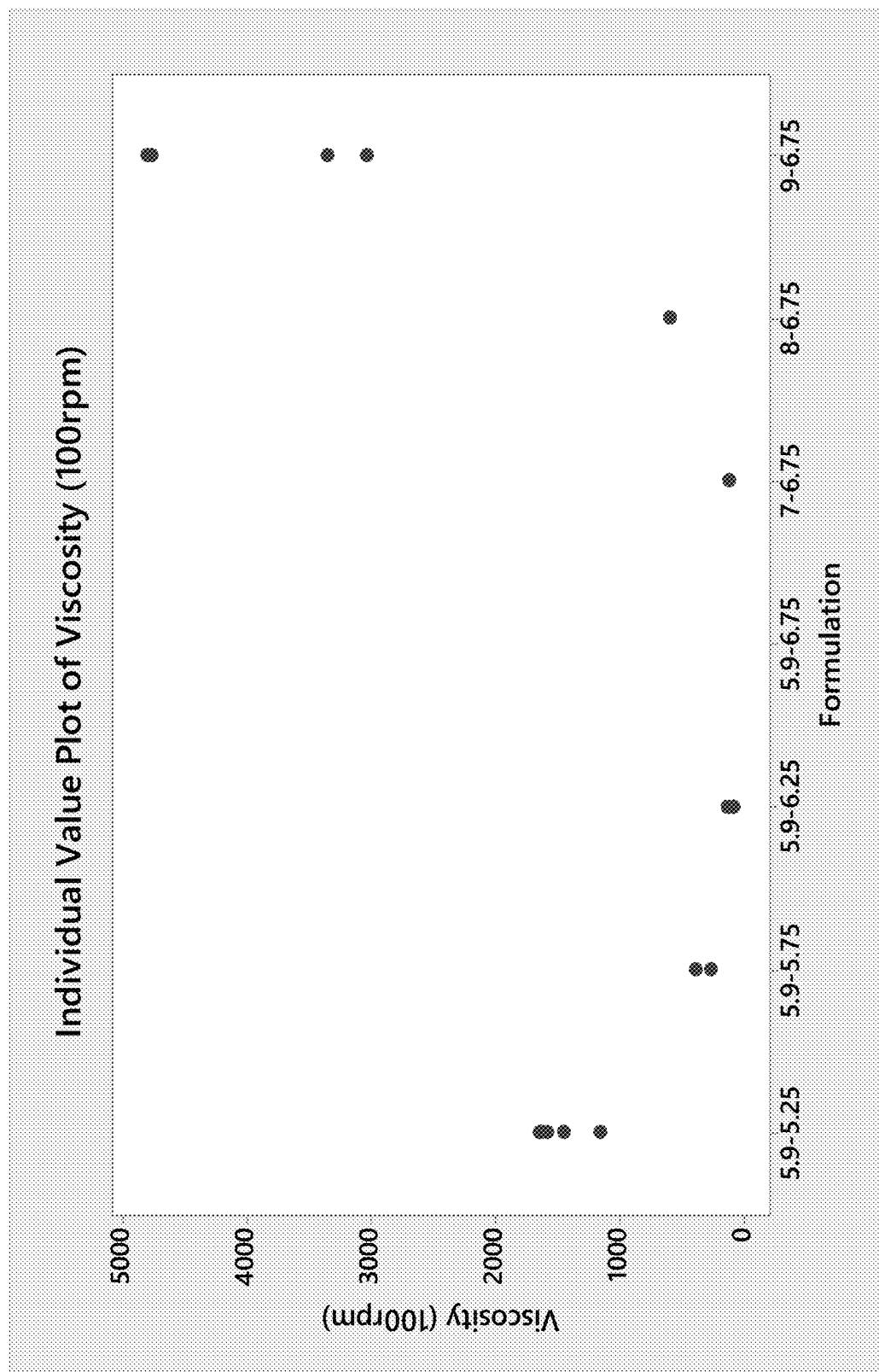
FIG. 10 shows constant triethanolamine concentration with increased aqueous PAI solids in order to increase final binder viscosity, in accordance with an example embodiment of the disclosure.

One can use other complexing amines to adjust aqueous PAI binder viscosity. For example, triethanolamine may be used in varying concentration to modify binder viscosity for slurry preparation. Or the triethanolamine concentration may be kept constant and aqueous PAI solids increased in order to increase final binder viscosity as shown in FIG. 10. To adapt to various coating techniques, the viscosity to solid content relationship may be tuned by adding different amounts of complexing base. For example, a high solid content and low viscosity formulation may be preferred for a high-throughput slot die coating process, in which case adding extra base may prove beneficial. A process with lower throughput may have different optimal solid content and viscosity, in which case a different amount of polymer and/or base may be preferable.

FIG. 10 shows constant triethanolamine concentration with increased aqueous PAI solids in order to increase slurry viscosity. In the first four formulations in FIG. 10, aqueous PAI solids may be kept constant at 5.9% whereas triethanolamine may be increased from 5.25 to 6.75%. For the last 3 formulations, aqueous PAI solids increased from 7 to 9% while keeping triethanolamine constant. Viscosity at 5.9% PAI solids with 6.75% triethanolamine was too low to be measured reliably. Binder formulations with higher viscosities in FIG. 10 may be chosen for slurry preparation, as discussed below.

For example, Formulation 6 may be created using 5.9% aqueous PAI solution containing 5.25% triethanolamine in a slurry containing 22-23% Si by weight. This slurry may be prepared and coated on current collector and pyrolyzed to give close to 90% Si with rest as pyrolyzed carbon derived from the aqueous PAI. Similarly, Formulation 7 may be created using 9% aqueous PAI solution containing 6.75% triethanolamine in a slurry containing 30-31% Si by weight. This slurry may be prepared and coated on current collector and pyrolyzed to give close to 90% Si with rest as pyrolyzed carbon derived from the aqueous PAI.

Figure 11:
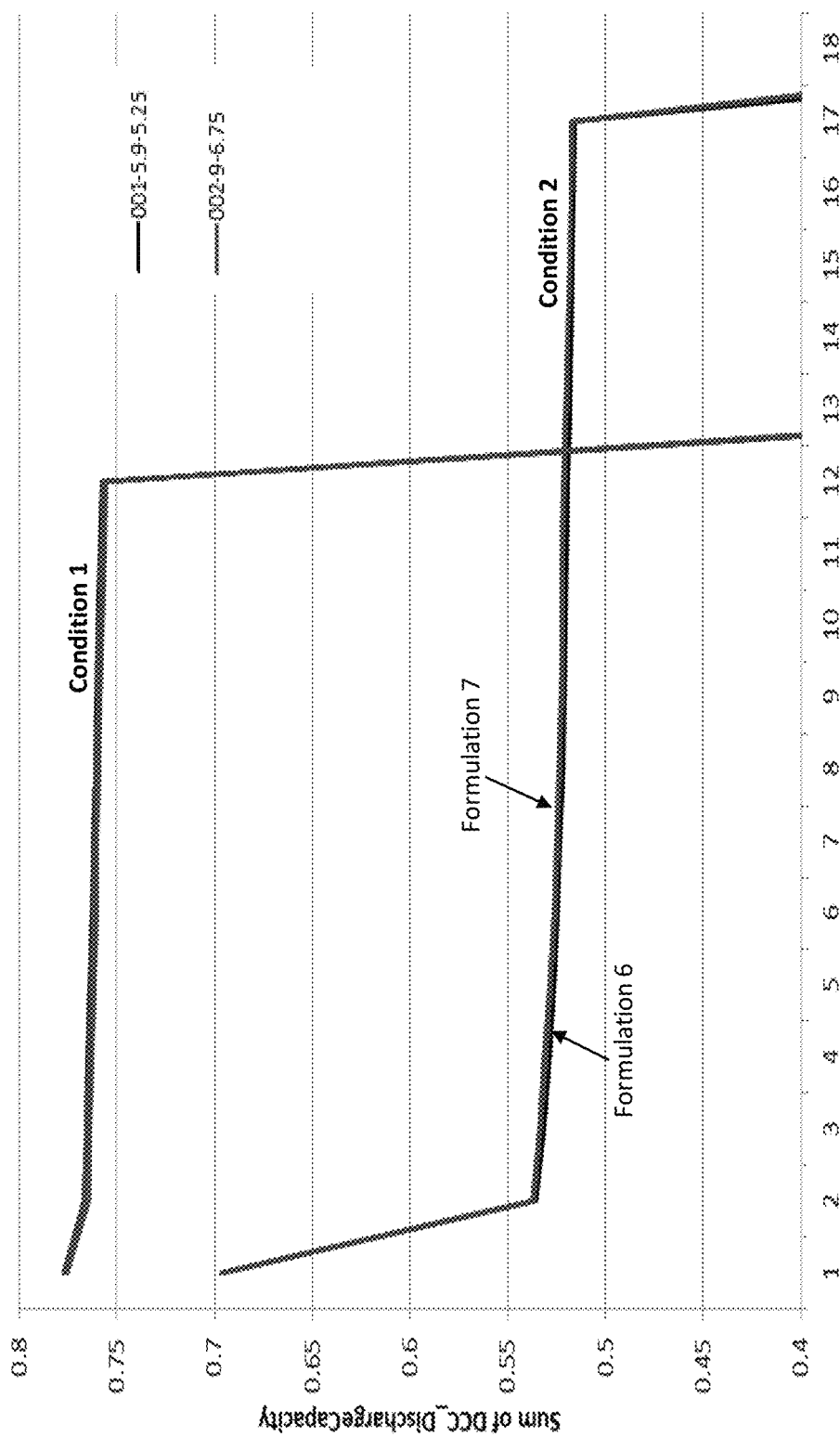
FIG. 11 shows discharge capacity of cells per cycle of both Formulation 6 and Formulation 7 when cycled under two different cycling conditions, Condition 1: (2C/0.5C 4.2-2.75V); Condition 2: (4C/0.5C 4.2-3.1V), in accordance with an example embodiment of the disclosure.

FIG. 11 shows discharge capacity of cells per cycle of both Formulation 6 and Formulation 7 when cycled under two different cycling conditions. Condition 1: (2C/0.5C 4.2-2.75V); Condition 2: (4C/0.5C 4.2-3.1V). Cathode used was NCM811.

Figure 12:
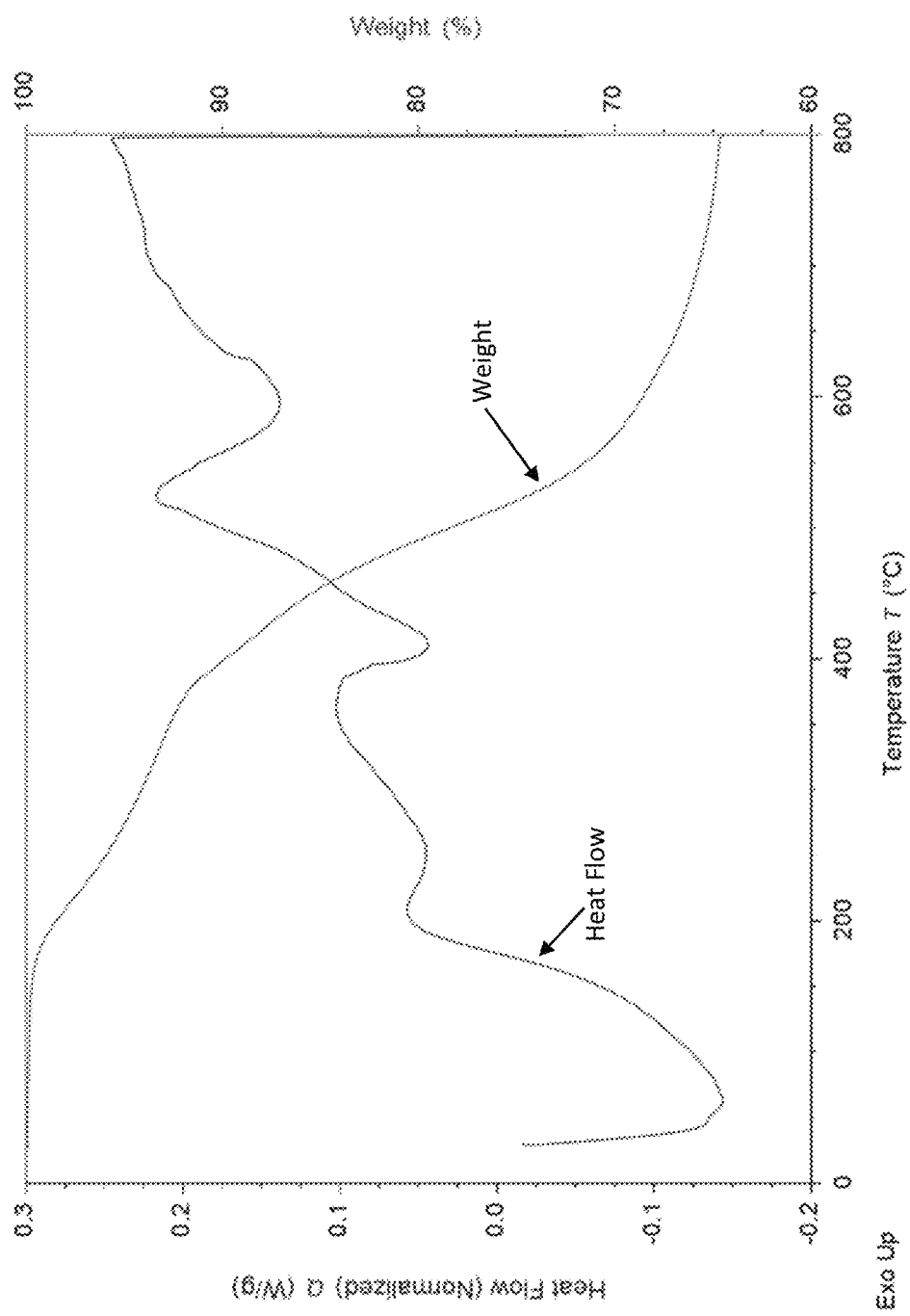
FIG. 12 shows thermogravimetric analysis (TGA) of an aqueous based phenolic resin, in accordance with an example embodiment of the disclosure.

Phenolic based resins are another primary aqueous-based polymer that may be utilized. These resins are attractive mainly due to the high carbon yield. In general, phenolic resin can provide ~60% carbon yield upon pyrolyzation (FIG. 12: TGA of aqueous based phenolic resin). Char yield can be easily adjusted by combining with a secondary polymer with a lower char yield.

Figure 13:
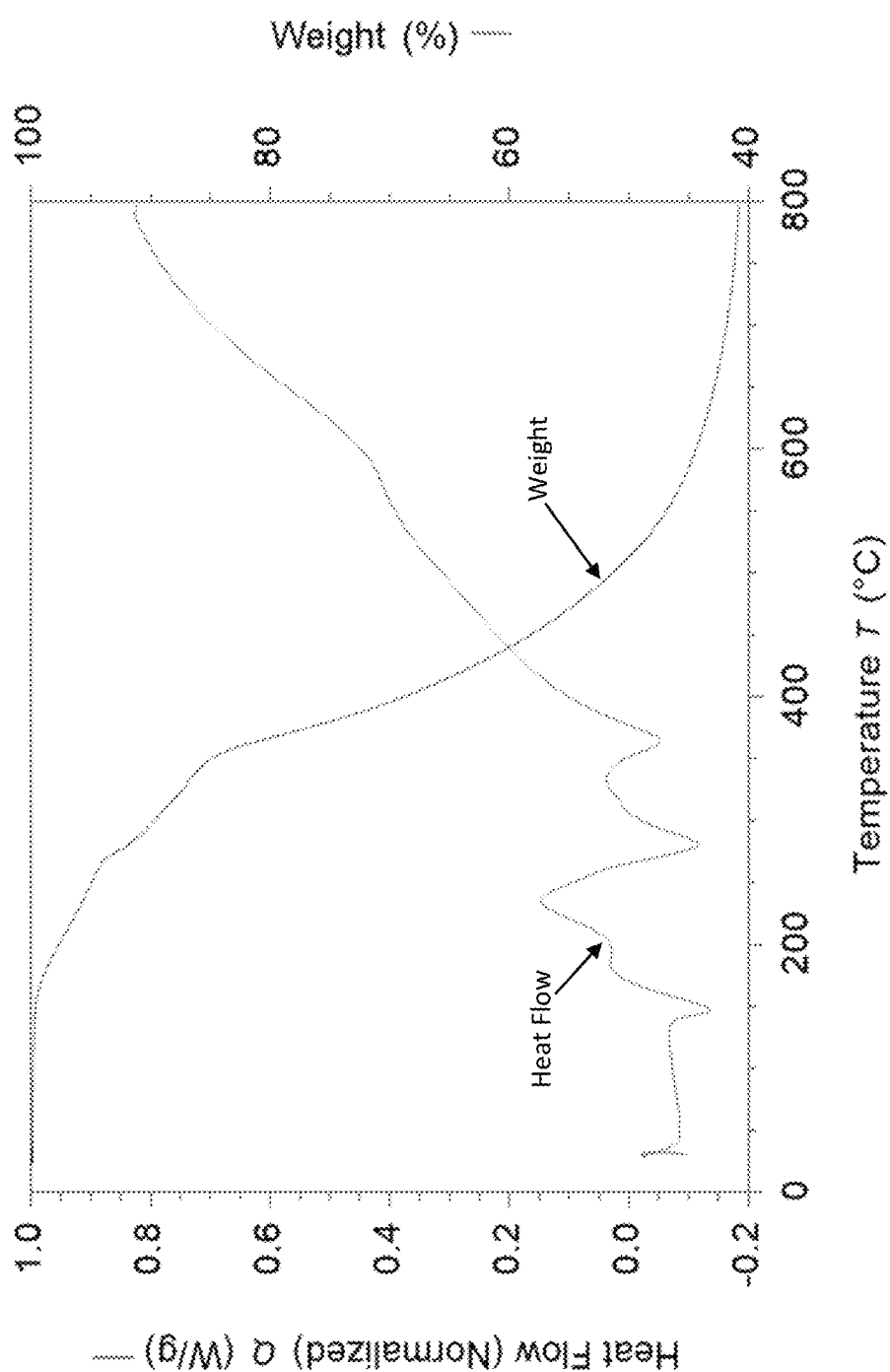
FIG. 13 shows thermogravimetric analysis (TGA) of an aqueous based phenolic-PMVMA blend (Phenolic:PMVMA 1:0.5 based on solid content), in accordance with an example embodiment of the disclosure.

By introducing PMVMA as a viscosity modifier to improve the coating quality of the Si slurry, the carbon yield may be able to be maintained at ~40% (FIG. 13). In this example, the solid weight ratio of phenolic:PMVMA may be kept at 1:0.5. FIG. 13 shows the TGA of aqueous based phenolic-PMVMA blend (Phenolic:PMVMA 1:0.5 based on solid content).

In another example, the viscosity of phenolic based resin may be adjusted by adding PMVMA (Poly(methyl vinyl ether-alt-maleic anhydride)/acidic or PDADM (poly(acrylamide-co-diallyldimethylammonium chloride). Different compositions of PMVMA:Phenolic resin may be investigated as viscosity modifiers. A slurry (Formulation 8) may be prepared according to the following composition (Table 9), where a solid weight ratio of Phenolic-PMVMA blend may be (1:16).

TABLE 9

| Formulation 8 (wt %) | |
| --- | --- |
| Silicon powder | 23.19% |
| DI water | 31.37% |
| Phenolic-PMVMA | 45.44% |

Figure 14:
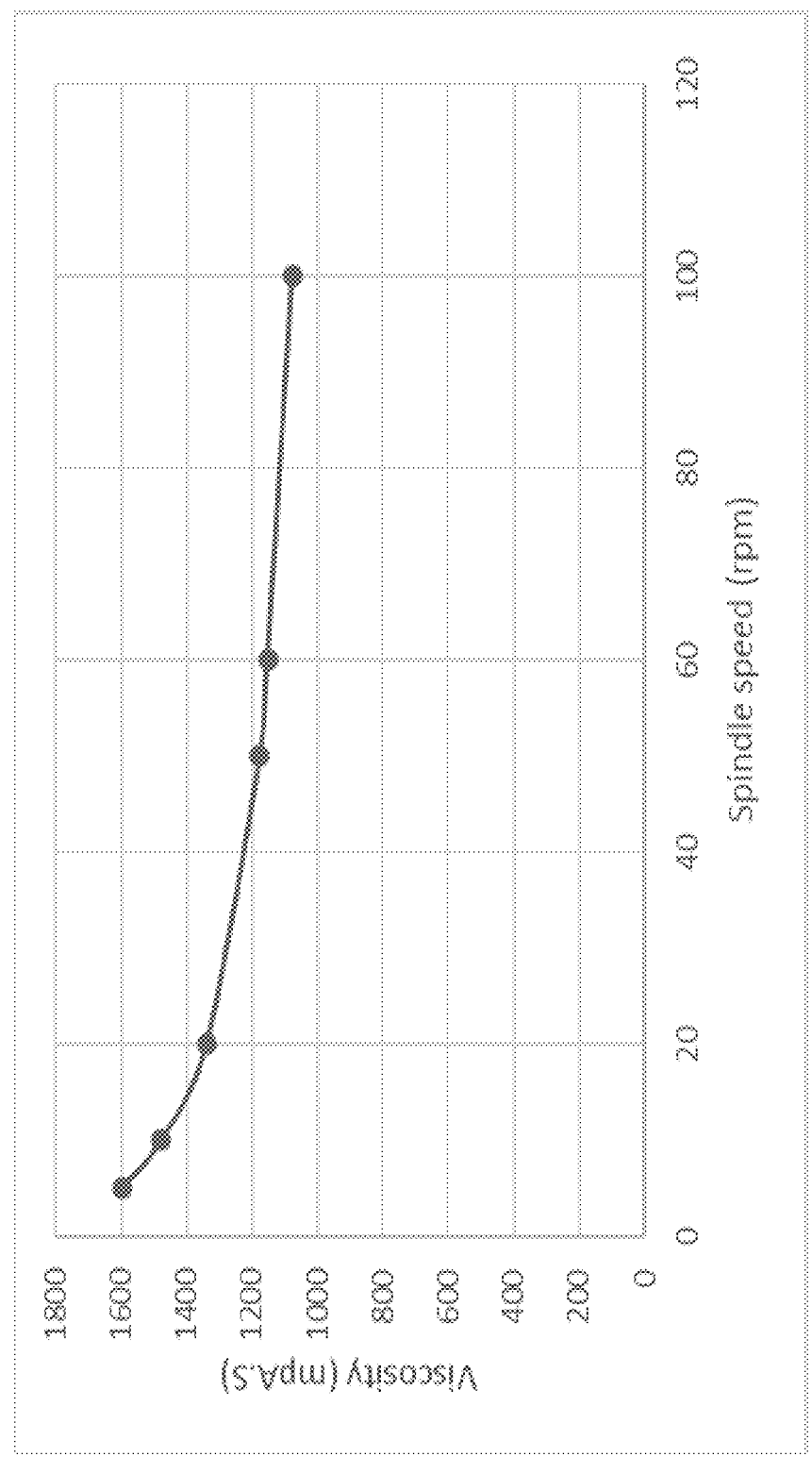
FIG. 14 shows the viscosity vs. spindle speed for the slurry prepared using Phenolic-PMVMA as the binder, in accordance with an example embodiment of the disclosure.
Figure 15:
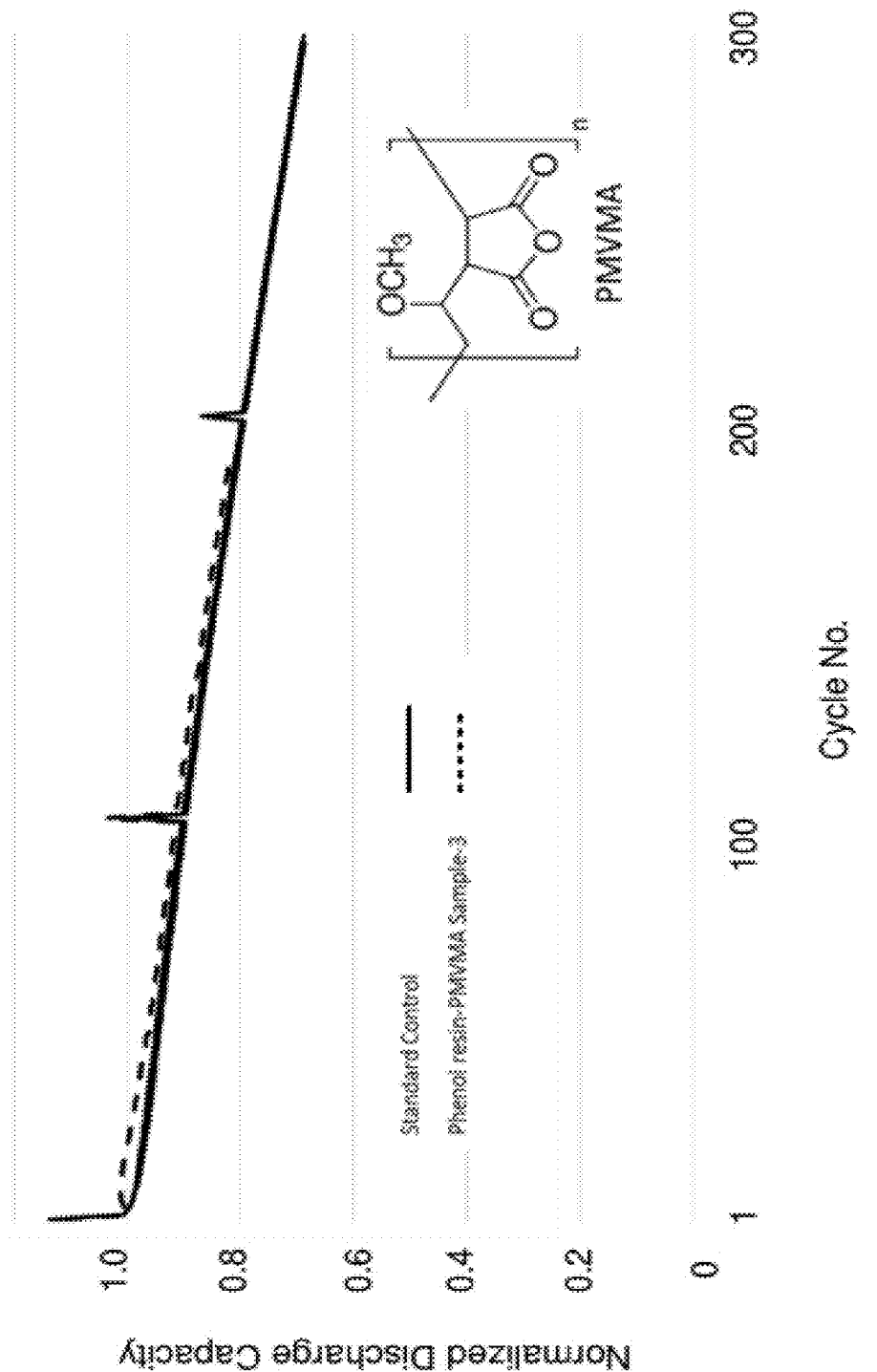
FIG. 15 shows the normalized capacity retention of a cell with standard bonded anodes prepared using organic solvent versus a cell with anodes prepared using a phenolic resin-PMVMA polymer blend, in accordance with an example embodiment of the disclosure.

The slurry (Formulation 8) showed a viscosity of 1600 cp at room temperature with PMVMA acting as a viscosity modifier. FIG. 14 shows the viscosity vs. spindle speed for the slurry prepared using Phenolic-PMVMA as the binder. In both Formulation 8 and Formulation 9 the slurry was able to coat and prepare Si dominant anodes. Anodes were pyrolyzed at 650° C. under Ar. FIG. 15 shows normalized capacity retention of a cell with standard bonded anodes prepared using organic solvent (NMP; standard control) versus a cell with anodes prepared using a phenolic resin-PMVMA polymer blend. This electrochemical cycling data shows similar 2C cycling performance compared with NMP based Si anode.

In another example, the viscosity of phenolic (Ph) resin was modified using PDADM. The slurry was prepared using the following formulation (Table 10: Formulation 9).

TABLE 10

| Formulation 9 (wt %) | |
| --- | --- |
| Silicon powder | 31.54% |
| DI water | 10.37% |
| Phenolic-PDADM | 58.09% |

Figure 16:
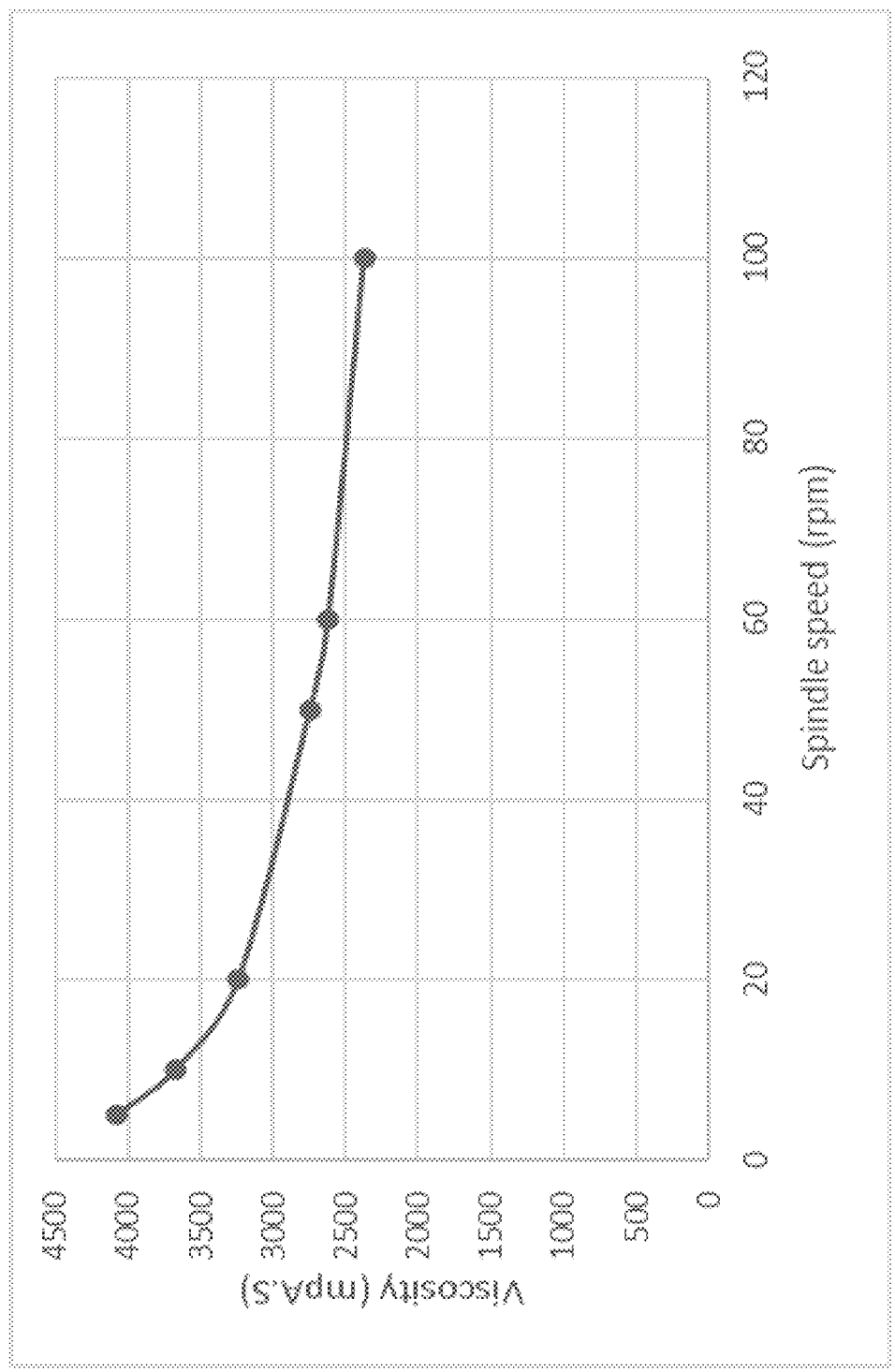
FIG. 16 shows the viscosity vs. spindle speed for the slurry prepared using phenolic-PVMVA as the binder, in accordance with an example embodiment of the disclosure.

The Phenolic-PDADM composite of Formulation 9 contains Ph:PDADM (1:0.5) based on the solid weight. FIG. 16 shows the viscosity vs. spindle speed for the slurry.

In further example, additional phenolic resin slurries were prepared and tested. One slurry was prepared using the following formulation (Table 11: Formulation 10), where the solid weight ratio of Phenolic-PMVMA blend is (1:8.2).

TABLE 11

| Formulation 10 (wt %) | |
| --- | --- |
| Silicon powder | 32.54% |
| DI water | 10.85% |
| Phenolic-PMVMA | 56.62% |

A slurry (Formulation 11) with pristine PMVMA only may be prepared utilizing a 20 wt. % PMVMA solution with DI water (Table 12: Formulation 11).

TABLE 12

| Formulation 11 (wt %) | |
| --- | --- |
| Silicon powder | 27.98% |
| DI water | 9.87% |
| PMVMA | 62.15% |

Figure 17:
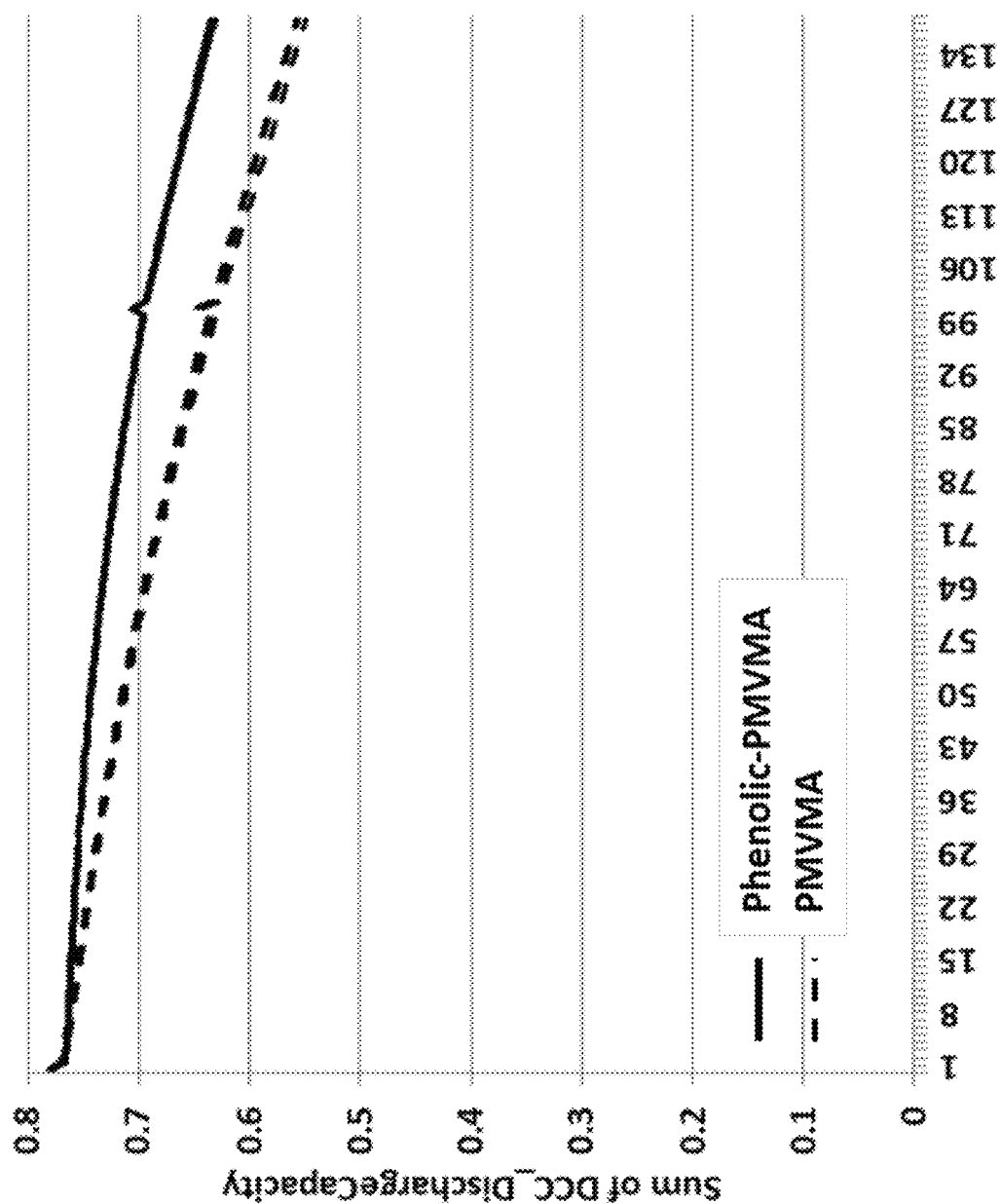
FIG. 17 shows a comparison of capacity retention of cells with silicon dominant anodes fabricated with aqueous based phenolic-PMVMA blend (Formulation 8) vs. PMVMA (Formulation 10), in accordance with an example embodiment of the disclosure.

Addition of phenolic resin to PMVMA (Formulation 8) showed significant improvement in 2C cycling performance of aqueous based Si anode compared with aqueous based Si anodes prepared with pristine PMVMA (Formulation 10) (FIG. 16). Specifically, FIG. 17 shows a comparison of capacity retention of the cells with silicon dominant anodes fabricated with aqueous based phenolic-PMVMA blend (Formulation 8) vs. PMVMA (Formulation 10).

Figure 18:
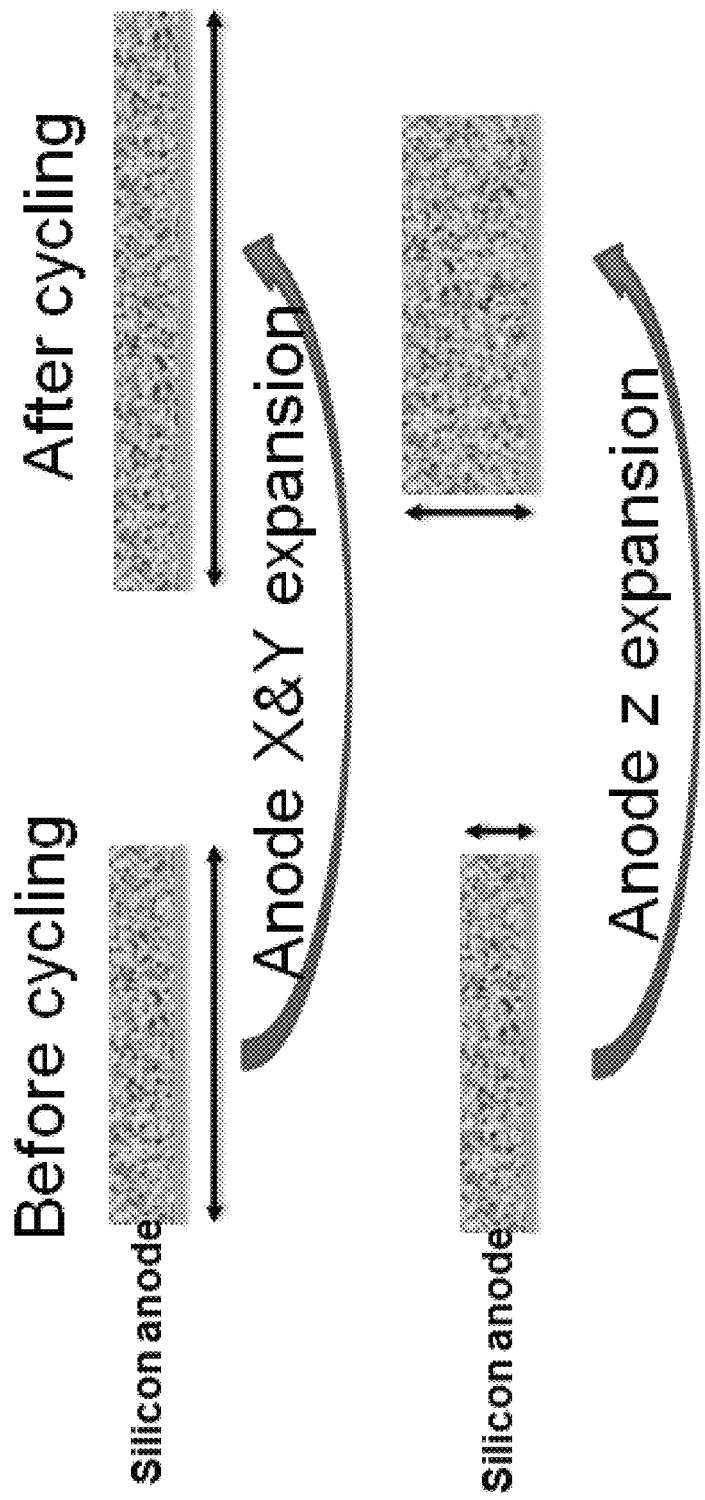
FIG. 18 shows a schematic of an electrode's expansion before and after the lithiation of the anode, in accordance with an example embodiment of the disclosure.

In another example, electrode porosity may be controlled with secondary resins. FIG. 18 shows a schematic of an electrode's expansion before and after the lithiation of the anode. In one embodiment, a secondary resin with lower carbon yield such as polyacrylic acid, polyvinyl alcohol, etc. may be used to increase the porosity. In further embodiments, the primary polymer (resin) is present at a weight percentage of about 60-70%, while the secondary polymer is present at a weight percentage of about 10-20%.

A slurry (Table 13: Formulation 12) utilizing both primary and secondary polymers may be prepared and coated on a 15 um copper foil. The coated anode may be calendared at 70° C., punched to small pouches and pyrolyzed at 650° C., 5°/min ramp, and 180 min dwell time under argon atmosphere.

TABLE 13

| Formulation 12 (wt %) | |
| --- | --- |
| Silicon | 20.64% |
| Water soluble PAI solution (6-10%) | 66.02% |
| Polyacrylic acid solution (10-12%) | 13.24% |
| Surfactant | 0.10% |

The slurry of Formulation 12 had a viscosity of 2000 cp at room temperature and pH of 5.1. PAA is used as the secondary resin to increase the porosity of the anode after pyrolysis.

Table 14 below shows the X and Y expansion of an anode made from a primary water-based PAI resin slurry along with a secondary PAA resin (low char yield) versus an anode with an organic-based PAI resin slurry with no secondary low char yield resin as the control. The expansion of the anode is measured before and after the formation process in which the cell is charged at 1C to 4.2 V with a taper down to 0.05C, and then it is discharged at 1C to 2 V with a taper down to 0.2C

TABLE 14

| Anode type | X-expansion % | Y-Expansion % |
|---|---|---|
| Anode with water-based PAI resin + PAA | 0.63 | 0.58 |
| Anode with organic-based PAI resin | 1.23 | 1.01 |

Table 15 below shows the Z-expansion of the cell after charging the cells at 1C to 3.3 V with a taper down to 0.05C after the formation. The result shows more than 50% reduction in the Z expansion of the cell.

TABLE 15

| Cell type | Cell Z-expansion % |
|---|---|
| Cell with water-based PAI resin + PAA | 1.9 |
| Cell with organic-based PAI resin | 3.1 |

Table 16 shows the calculated porosity (derived from thickness and loading) and density of the anodes.

TABLE 16

| Anode type | Porosity % | Density g/cc |
|---|---|---|
| Anode with water-based PAI resin + PAA | 53 | 1.04 |
| Anode with organic-based PAI resin | 45 | 1.10 |

Figure 19:
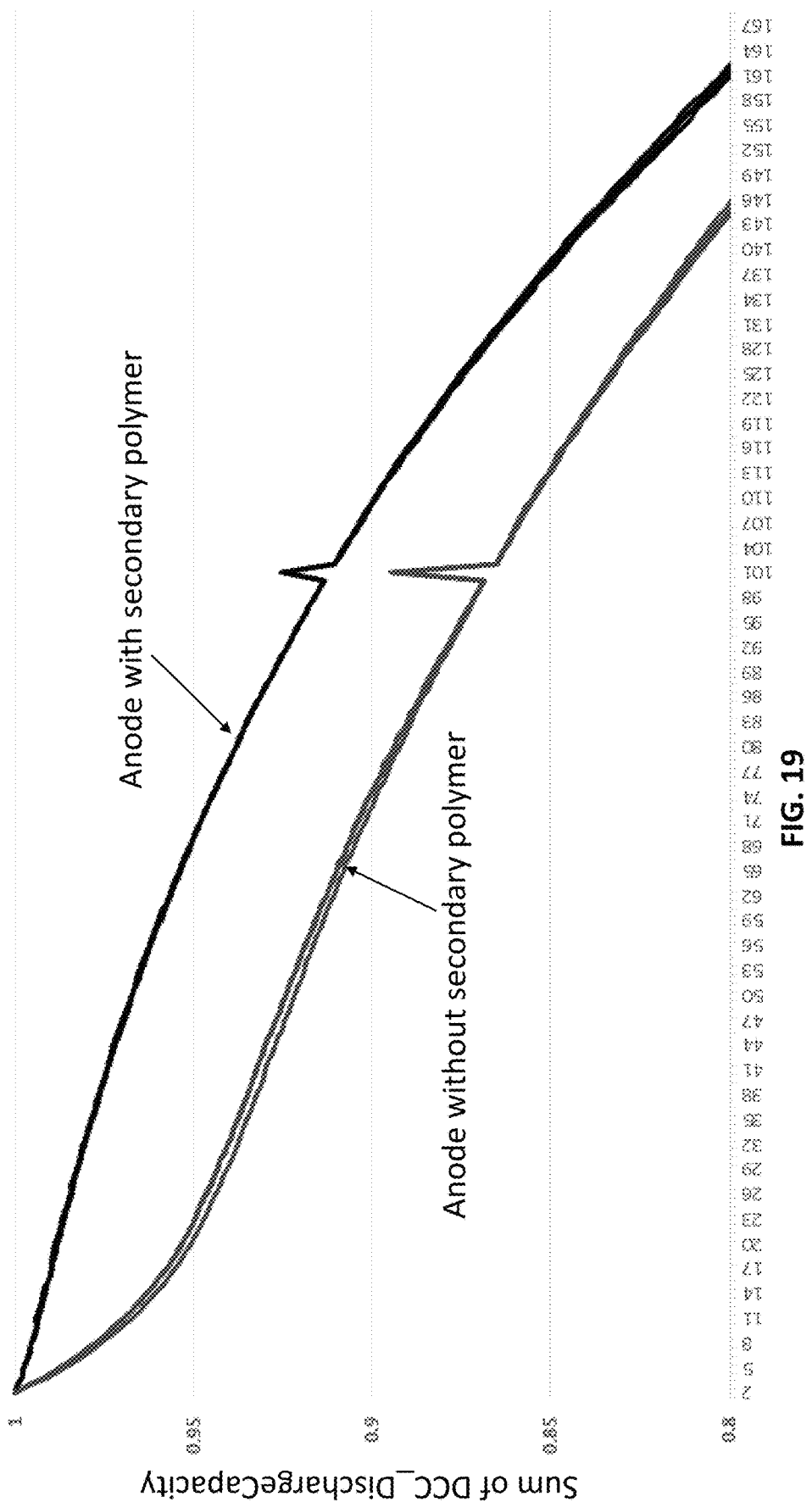
FIG. 19 shows the performance of a cell with a secondary resin compared to a cell without a secondary resin (as control), in accordance with an example embodiment of the disclosure.

The increased porosity and change in the carbon matrix of the anode with the secondary resin improves the performance of the cell when compared with the anode without the secondary resin. FIG. 19 shows the performance of the cell with the secondary resin (using the water-based PAI resin slurry) compared with the cell without the secondary resin (using the organic-based PAI resin slurry) as control. The cycling is performed between 2C (4.2V)-0.5C (2.75V).

Adhesion of the anode active material to the copper for the anode with the secondary resin (using the water-based PAI resin slurry), compared with the cell without the secondary resin (using the organic-based PAI resin slurry) is shown in Table 17 below wherein the higher the number the better the adhesion. In this example, the performance of PAA and PVA as secondary resins is tested. An Instron model #34SC1B22450 may be used for the adhesion test. A 90 degree peel test may be performed using the anode with scotch tape attached to the electrode. Tape dimensions: Crosshead Level 13.00 in. Tape Width 0.75 in., with a fixture separation of 1.50 in. and a peel speed set to 200 mm/min.

TABLE 17

| Anode type | gram force (gf) |
|---|---|
| Anode with water-based PAI resin + PVA | 532 |
| Anode with water-based PAI resin + PAA | 364 |
| Anode with organic-based PAI resin | 290 |

In Table 18, through resistance of the anode with the secondary resin (using the water-based PAI resin slurry) is compared with the cell without the secondary resin (using the organic-based PAI resin slurry). In this test 4% super P additive is used in both anode formulations.

TABLE 18

| Anode type | Dry resistance ($\Omega$) |
|---|---|
| Anode with water-based PAI resin + PAA + 4% Super P | 0.53 |
| Anode with organic-based PAI resin + 4% Super P | 1.27 |

The initial coulombic efficiency (ICE) of the anode with the secondary resin (using the water-based PAI resin slurry), compared with the cell without the secondary resin (using the organic-based PAI resin slurry) is shown in Table 19 below. In this test also 4% super P additive is used in both anode formulations. Half-cell test is performed by discharging the cell at 0.1C to 0.05 V with a taper down to 0.005C, then the cell is put on rest for 60 minutes, followed by charging at 0.1C to 1.5 V. Advantages to these formulations include, but are not limited to, more porosity leading to less electrode expansion and higher N/P ratio leading to better capacity retention.

TABLE 19

| Anode type | ICE % |
|---|---|
| Anode with water-based PAI resin + PAA + 4% Super P | 88 |
| Anode with organic-based PAI resin + 4% Super P | 74 |

In another example, electrodes having a high amount of silicon in the pyrolyzed anode may be formed. FIG. 20 illustrates some sample formulations. Amounts of silicon in the slurry may be from about 25-50% with a water soluble polymer binder from about 50-75%. Suitable water soluble polymers have high heat capability and good weight (char) yield post pyrolysis, and include polyamideimide. Slurries may also have from about 0.1-0.15% surfactant and may optionally contain from about 0.5-2%% other carbon materials (such as carbon black). These slurries may create, for example, pyrolyzed anodes having about 90% Si, with about 10% pyrolytic carbon; anodes having about 94% Si, with about 6% pyrolytic carbon; anodes having about 96% Si, with about 4% pyrolytic carbon; and anodes having about 94% Si, with about 4% pyrolytic carbon, and about 2% carbon black. In some embodiments, the amount of Si can be as much as 95%, 96%, 97%, 98% or 99%.

Further regarding high Si content (i.e., >90%), slurries may be made with high solids content (i.e., >50%; in some embodiments, up to 55% or more). Table 20 shows 4 different formulations with increasing Si content which are mixed using dispersion and flow sonication and coated on 15 um electroplated Cu foil using a transfer roll coater at different target loadings to achieve similar final loading upon pyrolysis. No carbon additive was used in this example, although some amount of carbon additive may be incorporated to enhance electrical conductivity without sacrificing end result.

TABLE 20

| Group | Formulation | Target Solids % | Measured Solids % | Target Coat Load (mg/cm2) | Density (g/cc) | Actual Pyro Loading (mg/cm2) |
|---|---|---|---|---|---|---|
| 1 | 90% Si | 33.16 | 31.55 | 4 | 1.14 | 3.61 |
| 2 | 86% Si | 27.11 | 27.23 | 4.2 | 1.14 | 3.65 |
| 3 | 94% Si | 44.01 | 41.56 | 3.81 | 1.11 | 3.48 |
| 4 | 96% Si | 53.33 | 50.74 | 3.71 | 1.08 | 3.63 |

Si used was micrometer sized with particle size distribution ranging from 1 μm to 30 μm. A premix of Si with aqueous polyamideimide binder was achieved using an overhead dispersion blade mixer at 2000 rpm for over 30 mins. The premix was then flowed in a sonication flow cell at a flow rate of 45 ml/min. The amplitude of the 0.5" diameter probe was set to 100% at 20 kHz under continuous mode. The flow conditions were optimized to achieve uniform Si dispersion in the slurry. A much higher flow rate will reduce the residence time of Si agglomerates in the flow cell which is detrimental to achieve uniform dispersion. A much lower flow rate will cause too much residence time which will improve Si dispersion but will heat up the slurry too much affecting slurry viscosity properties as well as increasing process time. The flow rate in the range of 30 to 60 ml/min helped in achieving good dispersion without heating slurry too much. The effectiveness of dispersion also depends on the probe and the flow cell design. A good dispersion of Si may also be achieved using a more traditional industrial planetary mixing process. However such process also needs to be greatly optimized to high solid content formulations.

The slurry was coated on electrodeposited Cu foil using a transfer coater. Thin coatings at low loading were achieved by adjusting knife gap in the coater and good adhesion was obtained by optimizing drying conditions at coating. They were calendered at 70° C. to 79 μm thickness and pyrolyzed at 700° C., 2 h dwell time under forming gas flow. During pyrolysis, the binder loses weight and undergoes carbonization thereby increasing electrical conductivity. Similarly, one may design anodes with a very low char yield content binder effectively increasing Si content further than 96%. While that design will improve porosity and further reduce anode expansion it will have some tradeoffs such as higher resistance and lower adhesion of the active content on the metal foil.

The silicon-carbon composite electrodes were assembled into lithium-ion cells, containing cathodes, separator, and electrolyte solution. The cathodes were comprised of 15 μm aluminum foil coated with a 23 mg/cm$^2$, 3.02 g/cc film containing 94% NCM811, 34% conductive carbon additive, and 34% PVdF. The separator was a 16 μm porous polypropylene membrane, coated with 3.5 μm thick films consisting of a mixture of PVdF and PMMA. The electrolyte solution consisted of 1.2M LiPF$_6$ in organic carbonates. The cell design had a nominal capacity of 740 mAh. The cells were tested using constant current/constant voltage charge profiles and constant current discharge profiles. The upper voltage limit was 4.1V, and the lower voltage limit was 2.75 and 3.2V. The two cycling regimes are shown below in Table 21.

TABLE 21

| Cycle No. | Cycling Regime 1 |
|---|---|
| 1 | Rest 1 minute, Charge at 0.33 C to 4.1 V until 0.05 C, rest 5 minutes, discharge at 0.33 C to 2.75 V, rest 5 minutes |
| 2 | Rest 1 minute, Charge at 2 C to 4.1 V until 0.05 C, rest 5 minutes, discharge at 0.5 C to 2.75 V, rest 5 minutes |
| 3-100 | Same as Cycle 2 |
| 101 | Same as Cycle 1 |
| 102-200 | Same as Cycle 2 |
| 201 | Same as Cycle 1 |
| 202-300 | Same as Cycle 2 |

| Cycle No. | Cycling regime 2 |
|---|---|
| 1 | Rest 1 minute, Charge at 0.33 C to 4.1 V until 0.05 C, rest 5 minutes, discharge at 0.33 C to 3 V, rest 5 minutes |
| 2 | Rest 1 minute, Charge at 4 C to 4.1 V until 0.05 C, rest 5 minutes, discharge at 0.5 C to 3.2 V, rest 5 minutes |
| 3-100 | Same as Cycle 2 |
| 101 | Same as Cycle 1 |
| 102-200 | Same as Cycle 2 |
| 201 | Same as Cycle 1 |
| 202-300 | Same as Cycle 2 |
| . . . | Stop automatically at 80% of 2nd cycle capacity (0.538 times the Nominal Capacity) |

The initial discharge capacity and the capacity retention, past formation, increases with increase in silicon content and is shown in FIGS. 21-24. The porosity of the electrode increases with increasing Si content. The extra space accommodates Si expansion better thereby keeping xy expansion low.

Figure 21:
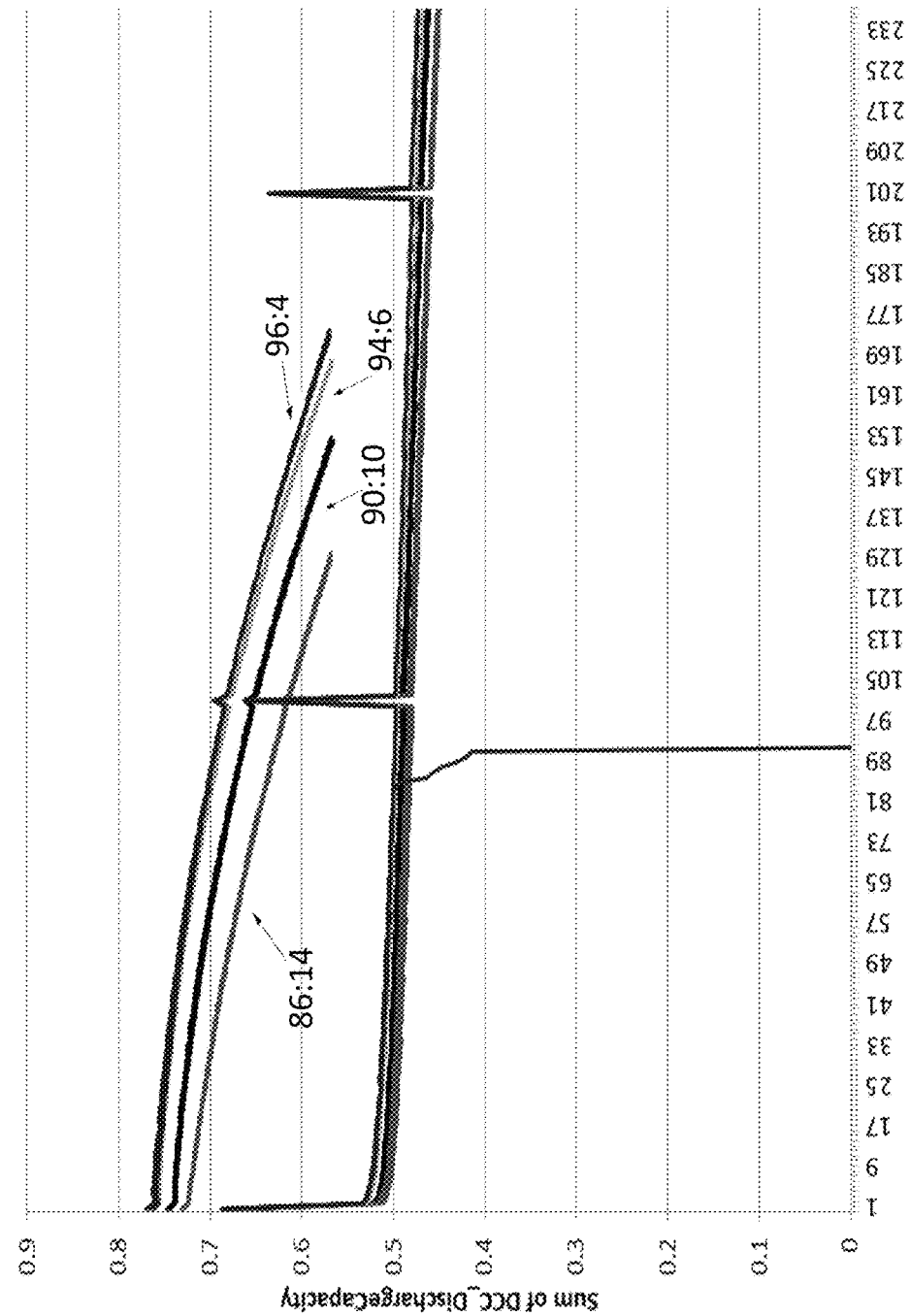
FIG. 21 shows discharge capacity (mAh) vs. cycle life under two different cycling regimes, in accordance with an example embodiment of the disclosure.

FIG. 21 shows the discharge capacity (mAh) vs. cycle life under the above two different cycling regimes.

Figure 22:
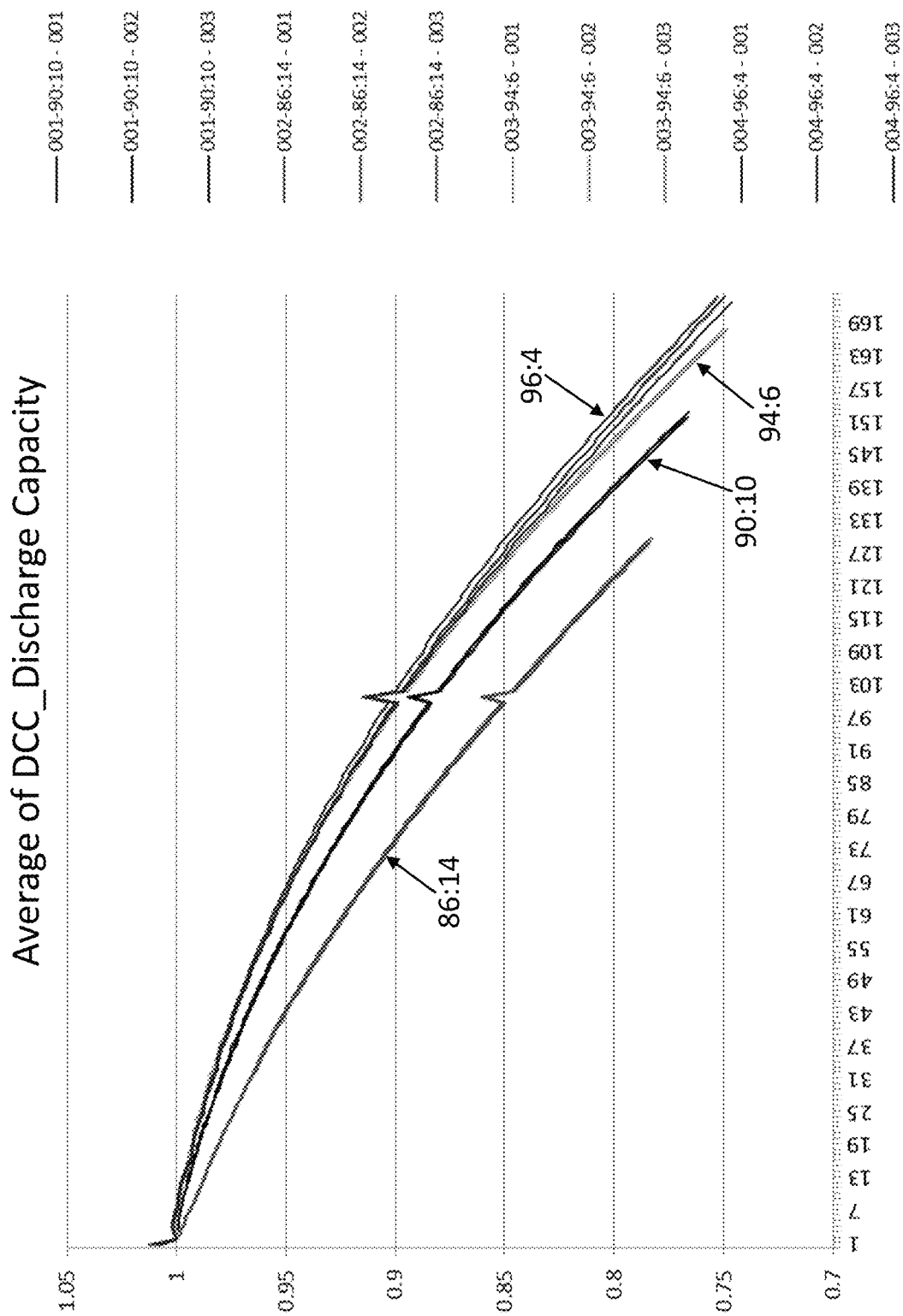
FIG. 22 shows capacity retention vs. cycle life under cycling regime 1, in accordance with an example embodiment of the disclosure.

FIG. 22 shows the capacity retention vs. cycle life under cycling regime 1.

Figure 23:
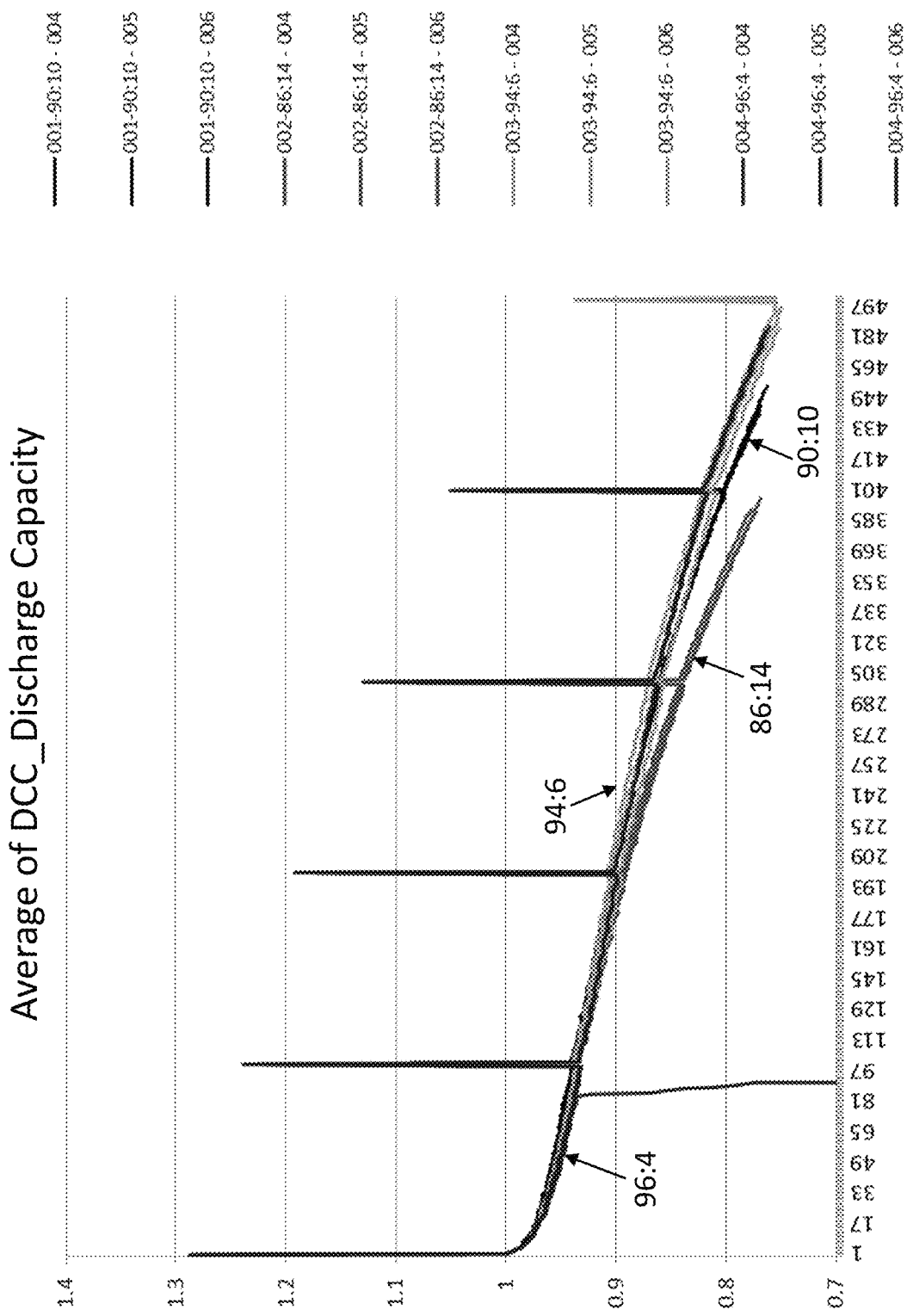
FIG. 23 shows capacity retention vs. cycle life under cycling regime 2, in accordance with an example embodiment of the disclosure.

FIG. 23 shows the capacity retention vs. cycle life under cycling regime 2.

Figure 24:
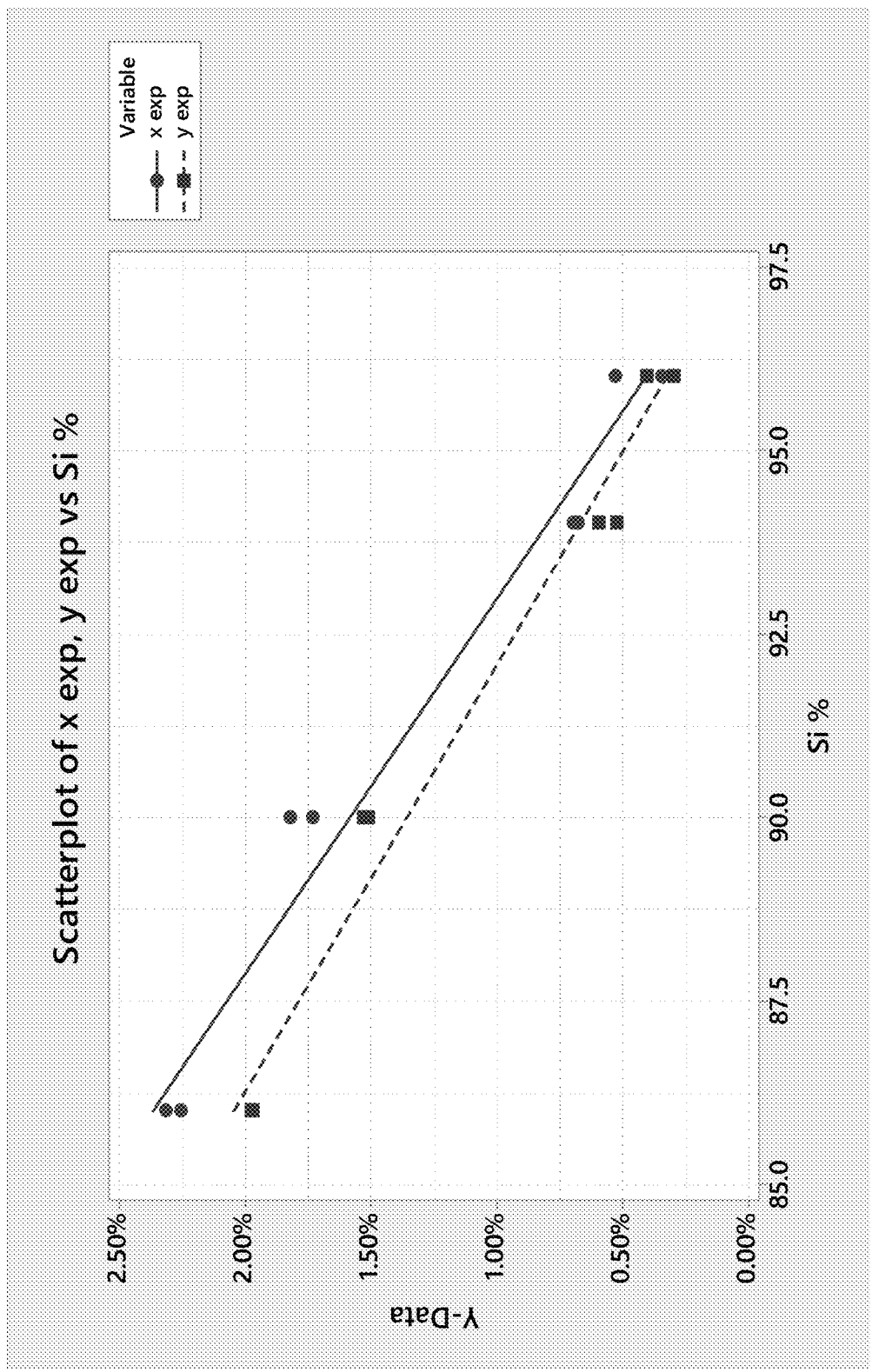
FIG. 24 shows anode x (width) and y (length) expansion post formation in discharge state vs. a pristine electrode, in accordance with an example embodiment of the disclosure.

FIG. 24 shows anode x (width) and y (length) expansion post formation in discharge state vs. a pristine electrode. The expansion reduces with increase in Si content.

Pyrolyzed electrodes may have the potential for poor mechanical properties such as adhesion, flexibility and cracking. Lowering the pyrolysis temperature may ameliorate mechanical problems but can result in poor performance mainly due to inadequate electronic conductivity of the electrode. Using certain type of additives, such as 1D and 2D carbon structures, may significantly improve the conductivity of the electrode even at low content (i.e. relatively small amounts) and low pyrolysis temperature. Additionally, decreasing the amount of polymer to be pyrolyzed (i.e. increasing the Si content) allows minimization of any negative impact of low temperature pyrolytic carbon (incomplete polymer pyrolysis). Adding a low char yield secondary polymer can also help to improve the flexibility of the electrode in cases where the primary carbon matrix remains too rigid even at lower pyrolysis temperature. In some embodiments, carbon structures such as carbon nanotubes, carbon nanofibers, graphene and other 1D, 2D, or 3D carbons are used in the electrode design to increase conductivity without sacrificing energy density.

In one embodiment, an electrode may comprise silicon and a primary polymer which may be partially pyrolyzed at temperature >350° C. to create a matrix that remain flexible. In some embodiments, the polymer may be selected from the PI and PAI family and equivalents, including water soluble (aqueous) versions thereof. To such electrodes, a 1D or 2D carbon structure additive may be added to provide conductivity. Further, a secondary polymer with low char yield may be added to improve flexibility of the electrode. In certain embodiments, the electrode may comprise high Si content (>90%). In other embodiments, the electrode may have a maximum primary polymer content: 10%.

Advantages to electrodes having the above compositions include improvement of anode flexibility, improvement of anode adhesion, reduction of XY expansion, reduction of foaming during mixing and coating, and improved cycle life and initial Coulombic efficiency (ICE).

In an embodiment, a highly flexible Si-dominant anode may be created from a precursor comprising a water soluble (aqueous based) polymer, with a secondary polymer (sacrificial polymer) and a carbon additive, which may be a 1D or 2D carbon additive. In some embodiments, an anode is created from a water soluble polyamide imide (WPAI) solution with various additives therein. The control of pyrolysis temperature is an important feature and, in some embodiments, these electrodes may be pyrolyzed at temperatures as low as about 300 degrees Celsius. In some embodiments, the pyrolosis temperature may be from about 400-750° C., or about 400-500° C. In these materials, polymers such as polyvinyl alcohol (PVA), and/or poly ethylene oxide (PEO) may be added as secondary polymers (sacrificial polymers).

In some embodiments, the water soluble (aqueous based) polymer solution (such as WPAI) may be modified with the addition of a base such as methyl diethanolamine (MDEA). Such bases may be present in the water soluble (aqueous based) polymer solution in amounts of from about 30-60% by weight. In one embodiment, PAI water solubility and viscosity is controlled by methyl diethanolamine concentration. The latter increases pH of the binder.

Other bases that could be used to modify the water soluble polymer include, but are not limited to, Triethanolamine; Triethylamine; Tripropylamine; Tributylamine; Tripentylamine; Trihexylamine; Trioctylamine; Triphenylamine; N-Methyldiethanolamine; Butyldiethanolamine; Diethylamine; Ethylamine; Tetrabutylammonium hydroxide; Tetramethylammonium hydroxide; Tetramethylammonium hydroxide; Triisopropanolamine; Trolamine; Amino-2-propanol; Triisobutylamine; N-Isopropyl-N-methyl-tert-butylamine; 2-Amino-2-methyl-1-propanol; 1-Amino-2-butanol; 2-Amino-1-butanol; Diethanolamine; Ethanolamine; 2-Dimethylaminoethanol; N-Phenyldiethanolamine; 2-(Dibutylamino)ethanol; 2-(Butylamino)ethanol; N-tert-Butyldiethanolamine; N-Ethyldiethanolamine; Avridine; and 2-(Diisopropylamino)ethanol.

Carbon additives suitable for use in these anodes may be a 1D or 2D carbon structure, including but not limited to single-walled carbon nanotubes (SWCNT), multi-walled carbon nanotubes (MWCNT), carbon nanofibers, cross-linked carbon nanotubes (CCN). One example of a 2D carbon structure is crosslinked carbon nanotubes (CCN) which may be used in powder form or pre-dispersed in a solution such as dilute CMC. Carbon nanotubes have a high aspect ratio and high electrical conductivity, and thus could provide enough electrical conductivity for anodes. This reduces the need for pyrolytic carbon generated by treatment. With their high modulus, carbon nanotubes (CNT) are often utilized to enhance the strength of a polymer matrix. However, the low wettability and high surface area of carbon nanotubes may deteriorate the mechanical properties of the polymer matrix if the surface tension is not carefully tuned.

In one example, the PAI may be a water soluble, modified PAI that is an amic acid/amide copolymer (WPAI). Heat treatment between 200° C. to 400° C. may lead to the crosslinking of this modified PAI due to the imidization reaction or esterification reaction between amic acid and other hydroxyl group-containing polymers that may be present. Further increase in heat treatment temperature leads to thermal degradation (>≈400° C.) and carbonization (>≈600° C.) of the polymer matrix (PAI). In a further embodiment, PEO is included as a secondary polymer, with a 2D carbon additive of crosslinked carbon nanotubes (CCN). The thermal degradation of PEO starts at 320° C., and, depending on the temperature program, PEO could be degraded completely at 360° C. to 400° C. When the anode precursor containing water soluble PAI (WPAI), PEO and CCN is pyrolyzed at 400° C., PEO is removed while most PAI remains intact. Experiments show that porous structures created by removing PEO are beneficial for improving anode flexibility. If the anode is pyrolyzed at higher temperatures, the PAI will further degrade to form a pyrolytic carbon. With the degradation of the PAI structure at temperatures above 450 or 500° C., the polymer will also lose its inherent flexibility, leading to anode brittleness.

The aim of incorporating a polymer such as PEO into the system is to address XY expansion, adhesion, and flexibility of the anode while maintaining its cycling performance. Moreover, such a precursor system may also address the foaming issues with the slurry during the mixing and coating of the anode. The above anode may show improved performance over other aqueous-based Si anodes.

In this example, an anode may be made from the pyrolysis of a slurry composed of a WPAI precursor (primary polymer) with PEO as a sacrificial polymer (secondary polymer), and CCN as a carbon additive. Table 22 shows the composition of the slurry for this anode. It may be coated on a 15 μm electroplated copper foil, and the coated anode subsequently calendered at 80° C., punched to small pouches and pyrolyzed at different temperatures as indicated below. The final composition after pyrolysis was targeted to be Si/pyrolyzed carbon=90/10 for 650° C. pyrolysis. The composition of 500° C. and 400° C. pyrolyzed anodes may have higher polymer residue and less pyrolyzed carbon.

TABLE 22

| | |
|---|---|
| Si powder | 19.48% |
| WPAI solution (9.75%) in water | 38.76% |
| Surfactant | 0.11% |
| 0.8% CCN dispersion | 27.05% |
| PEO (10.2%) solution | 14.61% |

Figure 25:
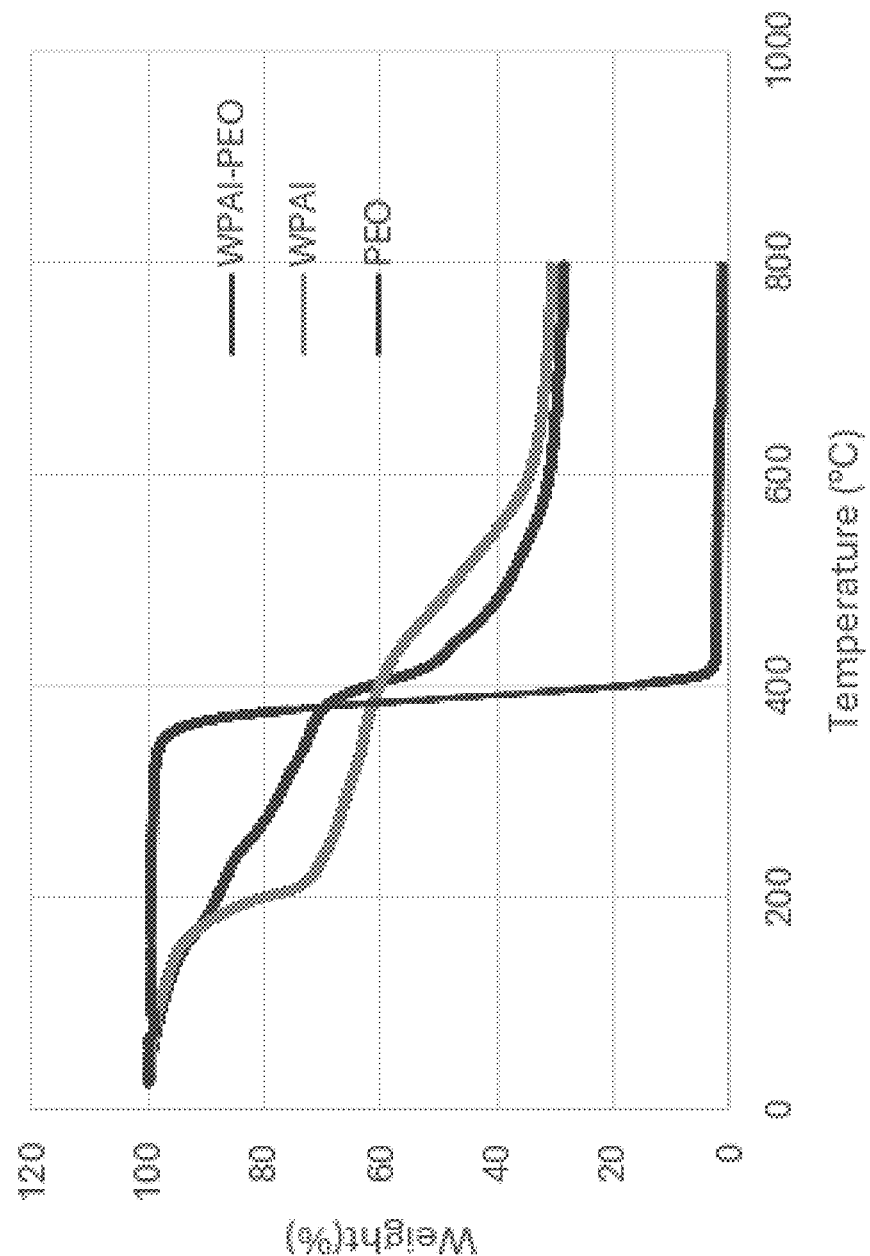
FIG. 25 shows TGA analysis of water soluble PAI (WPAI)-PEO, WPAI and PEO, in accordance with an example embodiment of the disclosure.

A TGA analysis of the precursor system of water soluble PAI (WPAI), PEO, and WPAI/PEO was conducted under argon as a protective gas. The samples were subjected to heating rate set at 5° C./min from 50° C. to 800° C. See FIG. 25. The WPAI/PEO sample is prepared according to the following procedure: WPAI (9.75% WPAI, 4.68% MDEA in water) and PEO (10.2%) solution are mixed with the same ratio as the anode slurry described earlier. The solution was then dried in the oven at 80° C. overnight. At 400° C., PEO samples were completely decomposed. For the WPAI/PEO mixture, if all of the MDEA and PEO are removed while WPAI is intact, the yield is around 47%. When the temperature reaches 400° C., the yield of the sample is around 60%. Thus, assuming MDEA is completely removed (MDEA boiling point 247° C.), a significant quantity of PEO is still not removed. The TGA data does not fully represent the real pyrolysis process of the anode as the material in the TGA equilibriates faster. However, the data suggests that with the WPAI present, PEO is less easily removed.

Figure 26B:
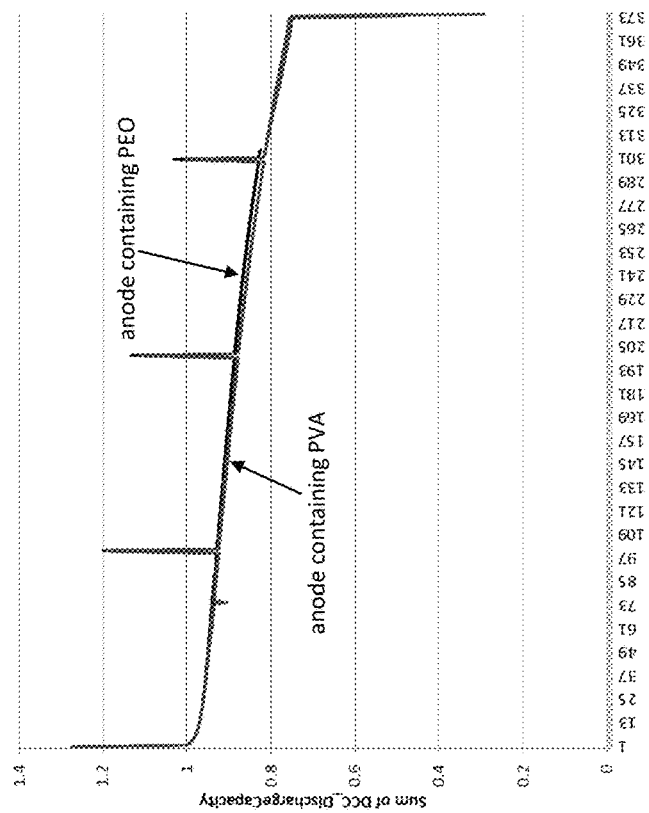
FIGS. 26A-26B compare cycling performance of pyrolyzed anodes using PEO as a secondary polymer (black line)
Figure 26A:
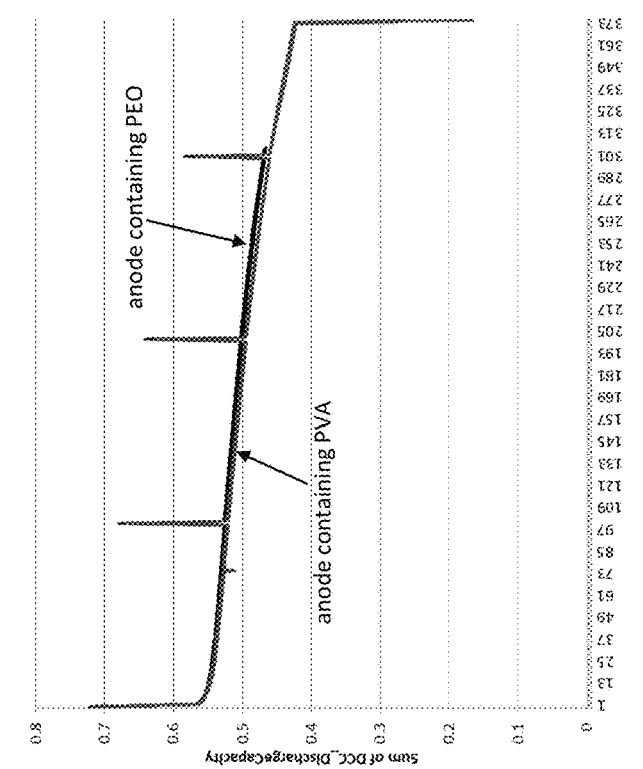

Cycling performance of anodes pyrolyzed at 700° C. was then evaluated (See FIGS. 26A and 26B). Anodes made from WPAI precursor (primary polymer) with PEO as a sacrificial polymer (secondary polymer), and CCN as a carbon additive were pyrolyzed at 700° C. (e.g., 2 hours under $Ar/H_2$ forming gas) and cycled against a $LiNi_{0.8}Mn_{0.1}Co_{0.1}O_2$ (NMC811) cathode (94% active ratio and 23 mg/cm$^2$ loading) in a pouch cell format. Formation of cells was performed at 1C for charge and 1C for discharge in the 4.1-2.0 V voltage range, with a 0.05C current taper at the end of charge and a 0.2C current taper at the end of discharge. Cell capacity was 0.78 Ah. 4C/0.5C constant current cycling was performed at 4C for charge and 0.5C for discharge in the 4.1-3.0 V voltage range. The cycling performance of the pyrolyzed anode from the WPAI/PEO/CCN precursor is compared to an anode made using polyvinyl alcohol (PVA) as the secondary polymer (WPAI/PVA/CCN) as shown in FIGS. 26A and 26B. The black lines show the cycling of the anode containing PEO while the red lines show the cycling of the anode containing PVA. From FIGS. 26A and 26B, we may conclude that the cycling retention to 80% of anodes based on the two different precursor systems are almost identical.

In another example, anodes made from WPAI precursor (primary polymer) with PEO as a sacrificial polymer (secondary polymer), and CCN as a carbon additive were pyrolyzed at different temperatures to observe the effect. The WPAI/PEO sample is prepared according to the following procedure: WPAI (9.75% WPAI, 4.68% MDEA in water) and PEO (10.2%) solution are mixed with the same ratio as the anode slurry described earlier. As shown in Table 23 below, anodes pyrolyzed at 650° C., 500° C., and 400° C. were cycled against $LiNi_{0.8}Co_{0.15}Al_{0.05}O_2$ (NCA) cathodes in a single layer pouch cell format. Formation of the cell was performed at 0.1 C charging to 4.2 V with a 0.01C taper, and 0.1 C discharging to 2.5 V. 0.5C/0.5C constant current cycling was performed at 0.5C for charge and 0.5C for discharge in the 4.2-3.1 V voltage range.

TABLE 23

| Anode | Resin | Pyrolysis | Target loading (mg/cm$^2$) | Coated post-pyro loading (mg/cm$^2$) | Target Density (g/cm$^3$) |
|---|---|---|---|---|---|
| 1 | WPAI(MDEA)/PEO | 650° C./3 hr, Ar | 3.8 | 4.28 | 0.85 |
| 2 | WPAI(MDEA)/PEO | 650° C./3 hr, Ar | 3.8 | 4.23 | 1.1 |
| 3 | WPAI(MDEA)/PEO | 500° C./3 hr, Ar | 3.8 | 3.89 | 1.1 |
| 4 | WPAI(MDEA)/PEO | 400° C./3 hr, Ar | 3.8 | 3.86 | 1.1 |

Figures 27A, 27B:
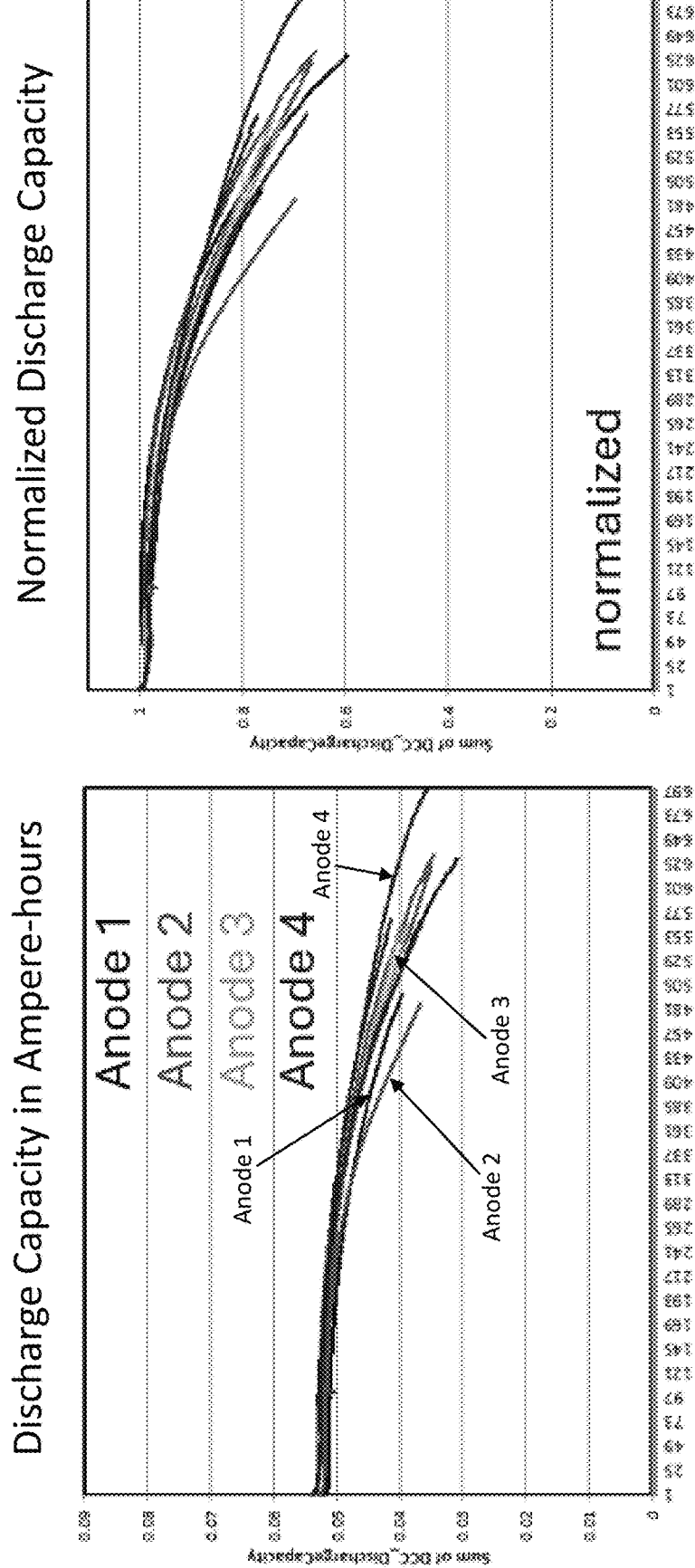
FIGS. 27A-27B show the cycling performance of anode pyrolyzed at different temperatures, in accordance with an example embodiment of the disclosure.

FIGS. 27A and 27B show the cycling performance of these anodes pyrolyzed at different temperatures. Anode 4 (anode pyrolyzed at 400° C.) showed the longest cycle life. Anode 4 had higher retention of capacity as the cells cycled on average. Higher retention can be seen in both the normalized and non-normalized plots as Anode 4 is "higher" than the others (meaning it has higher capacity retained at a certain number of cycles vs the others).

Initial Coulombic efficiency (ICE) is a key parameter to reflect the amount of the irreversibly consumed lithium. Low ICE can be a serious limitation for the practical application of Si anodes. In a further example, the ICE of anode versions 1-4 above are compared against lithium metal using the 50% capacity of the anode versus lithium metal foil in half pouch cells. The procedure for the half cell test after pouch cell assembly is as follows in Table 24.

TABLE 24

| Cycle No. | Details |
|---|---|
| 1 | Data Recording Every 10 Second or 10 mV Rest 12 hours, Discharge at 0.1 C to 0.05 V until 0.005 C, rest 60 minutes, charge at 0.1 C to 1.5 V, rest 60 minutes |
| 2 | Discharge at 0.1 C to 0.05 V until 0.005 C, rest 60 minutes, charge at 0.1 C to 1.5 V, rest 60 minutes |
| . . . | Same as Cycle 2 |

Figure 28:
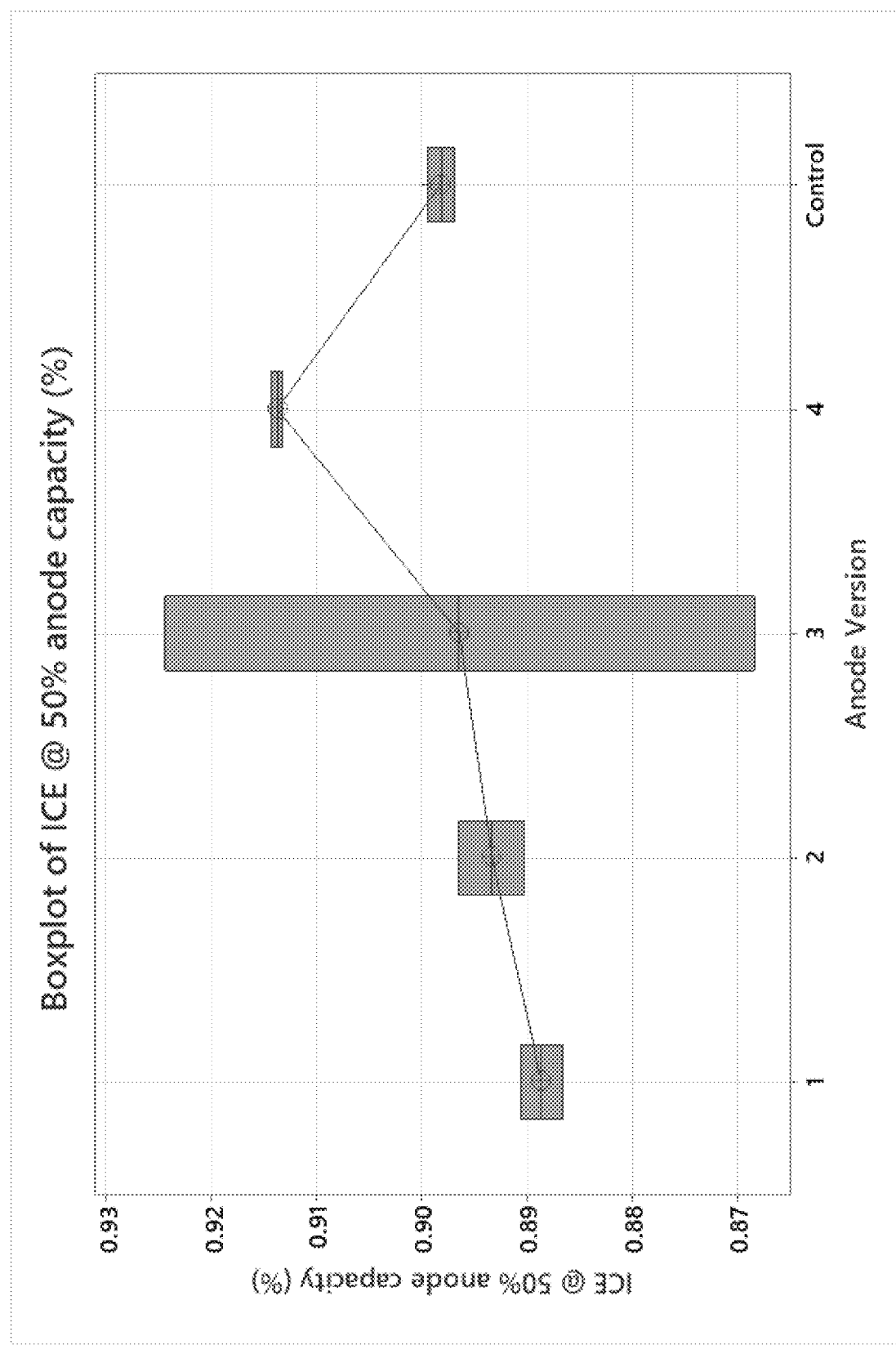
FIG. 28 shows the ICE of anodes at 50% capacity when assembled against lithium metal foil in a half-cell pouch, in accordance with an example embodiment of the disclosure.

FIG. 28 shows the ICE of the anodes at 50% lithiation. To measure the partial lithiation ICE, halfcells were built using lithium metal as the counter electrode. The anodes were lithiated at 11 mA to 90 mAh (NMC811 cathode capacity, to mimic the anode utilization in a full cell) or to 0.05V until 1.1 mA, and then de-lithiated to 1.5 V. The control anode is an anode with pyrolyzed polyimide as a precursor. The control anode has a formulation of Si:SuperP:Pyrolytic carbon of 86:4:10 which was pyrolyzed at 600° C. in $Ar/H_2$ forming gas (~5% hydrogen in argon) for 2 hours after a ramp at a ramp rate of 5 deg C./min. Anode 4 has a higher ICE compared the others, suggesting that with lower pyrolysis temperature the anode still has good reversibility under the test conditions.

Figure 29B:
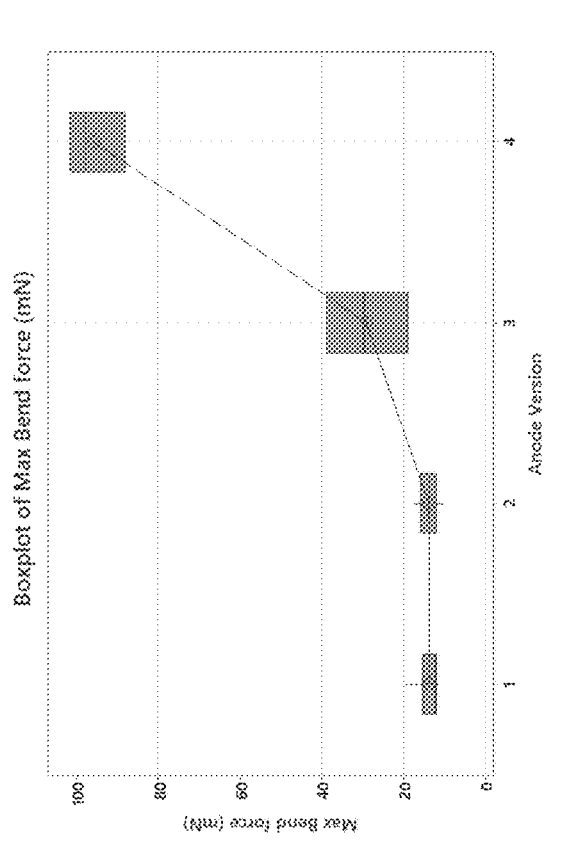
FIGS. 29A-29B show the bending radius (FIG. 29A) and bend force (FIG. 29B) of anodes with different pyrolysis temperature, in accordance with an example embodiment of the disclosure.
Figure 29A:
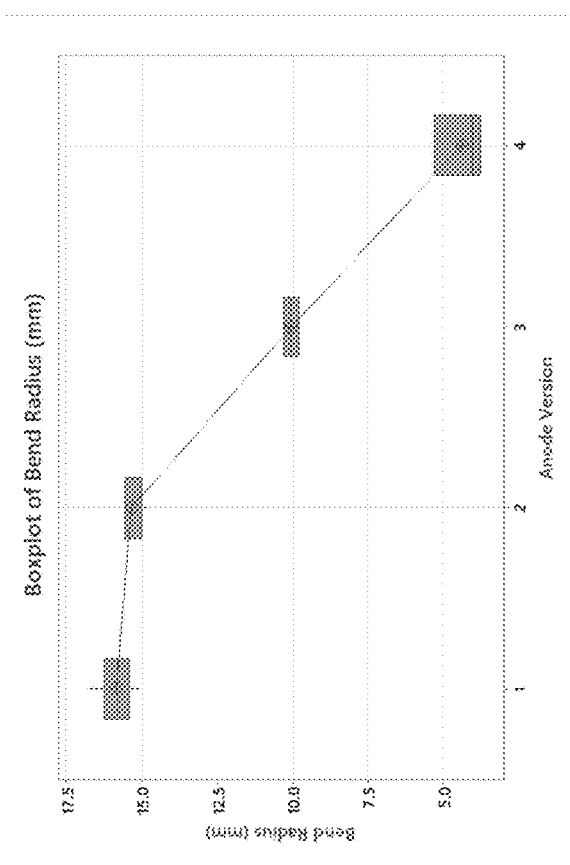

Pyrolysis temperature has a significant impact on the flexibility of anodes prepared herein (e.g. pyrolyzed WPAI/PEO/CCN). FIG. 29 shows the bending radius (FIG. 29A) and maximum bend force (FIG. 29B) of anodes with different pyrolysis temperature (see Table 23, above). The bend test was performed with an Instron machine as shown in FIG. 30. The flexibility of anodes pyrolyzed at different temperatures are in the following order: Anode 4 (400° C.)>Anode 3 (500° C.)>Anode 1 & Anode 2(650° C.). Further testing proved that the Anode 4 can pass a 2 mm mandrel bend test (FIGS. 31 and 32) (no cracking when wound around a 2 mm diameter mandrel). Bend radius is measured to the inside curvature of the anode as the gap between Instron fixtures (shown in FIG. 30) reduces, and is the minimum radius one can bend the anode without kinking.

Figure 31:
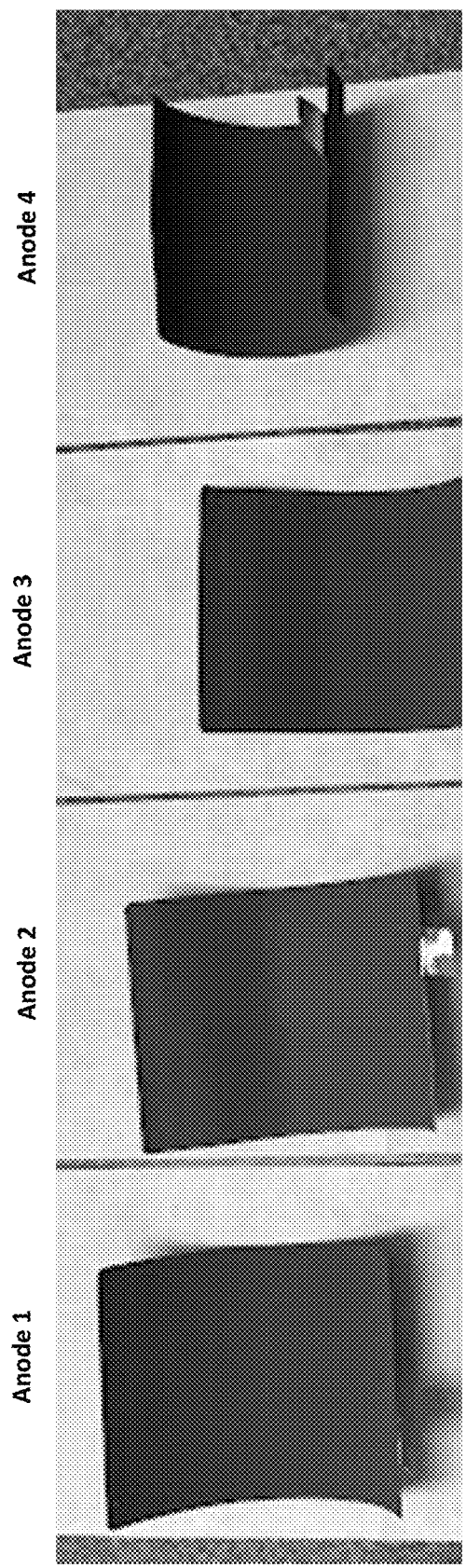
FIG. 31 shows the 4 mm mandrel test of anodes pyrolyzed at different temperatures, in accordance with an example embodiment of the disclosure.
Figure 32:
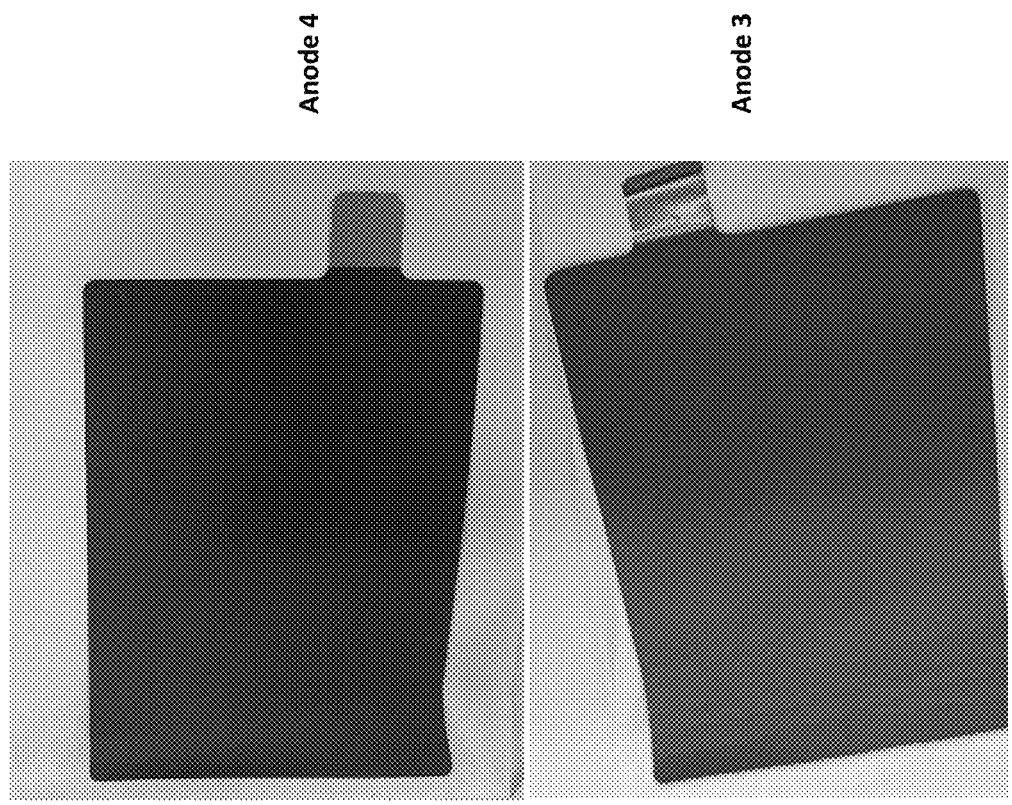
FIG. 32 shows a photo image of Anode 4 (top) after the 2 mm mandrel test versus Anode 3 (bottom) after the 4 mm mandrel test, in accordance with an example embodiment of the disclosure.

Specifically regarding the mandrel tests, FIG. 31 shows the 4 mm mandrel test of anodes pyrolyzed at different temperatures where anodes 1-4 were wound against a 4 mm mandrel to check for signs of cracking and flaking. Only Anode 4 (pyrolysis temperature 400° C.) passed the test. FIG. 32 shows a photo image of Anode 4 (top) after the 2 mm mandrel test versus Anode 3 (bottom) after the 4 mm mandrel test. Anode 3 despite being tested against a mandrel with a higher diameter (milder winding test) shows signs of cracking and flaking.

Figure 33D:
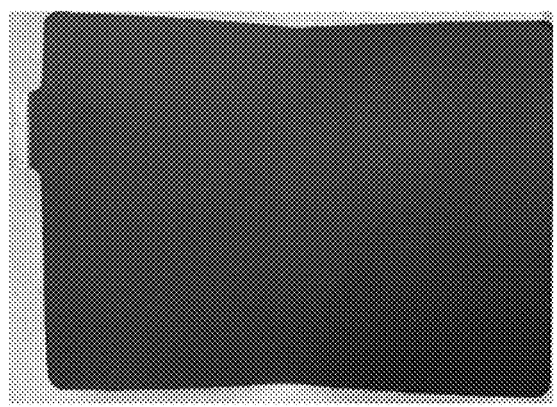
FIGS. 33A-33D show anode bending tests, in accordance with an example embodiment of the disclosure.
Figure 33C:
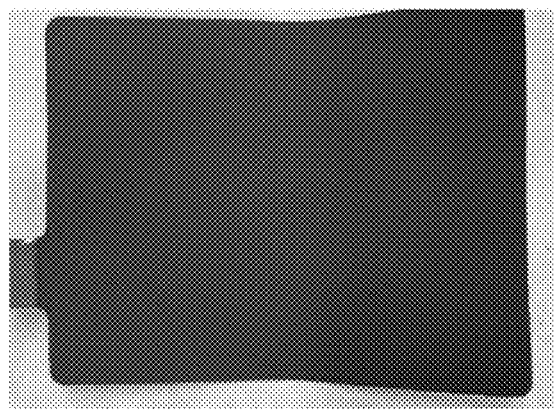
Figure 33B:
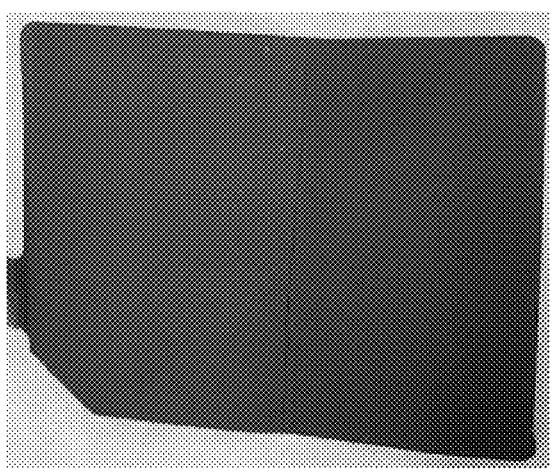
Figure 33A:
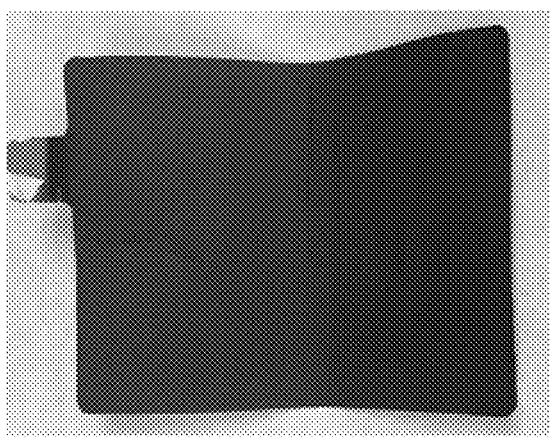

In a further example, the flexibility was compared between an WPAI/PEO/CCN anode as described above and an anode made from the pyrolysis of a slurry composed of a WPAI precursor with CCN as additive without PEO both pyrolyzed at 400° C. The only difference between the anodes is that the comparison anodes do not contain PEO in their formula. The aim of this experiment is to test the role of PEO in the improvement of anode flexibility. FIG. 33 displays the bend test results of the two anodes. FIG. 33A shows the anode without PEO after a 4 mm bending test; FIG. 33B shows the anode without PEO after a 2 mm bending test; FIG. 33C shows the WPAI/PEO/CCN anode after a 4 mm bending test; and FIG. 33D shows the WPAI/PEO/CCN anode after a 2 mm bending test. The anode without PEO exhibits obvious cracks after both 4 mm and 2 mm bending while the WPAI/PEO/CCN anode remains intact after bending tests. Thus, the addition of PEO as the secondary (sacrificial) polymer improves anode flexibility.

Experimentally, we demonstrated that adhesion and foaming issues could be significantly alleviated with pyrolysis of the WPAI/PEO/CCN precursor systems. The use of PEO as a secondary (sacrificial) polymer brings the benefit of significantly less foam in the slurry mixing process. Additionally shown is that the flexibility of anodes is improved by adjusting the pyrolysis temperature. Specifically, anodes exhibited much better flexibility when the pyrolysis temperature is reduced to about 400° C. The improvement of anode flexibility probably is caused by several reasons, including but not limited to (1) The addition of CCN as carbon additive dramatically enhances the electrical conductivity of anodes. Thus, lower pyrolysis temperature is required for the Si anodes to achieve a comparable conductivity level as compared with anode pyrolyzed at 600° C. and above without conductive carbon additive; and (2) A suitable pyrolysis temperature is selected to ensure: (a) WPAI is not or is less thermally degraded to maintain its flexibility; (b) PEO is partially/completely degraded to create porous structures.

Specifically disclosed herein is an electrode made from silicon active material, a current collector, a pyrolyzed carbon/polymer matrix that is not fully pyrolyzed, and a conductive additive. In certain embodiments, the pyrolyzed carbon/polymer matrix is created from two polymers, such as the WPAI and PEO described above. Other polymers such as those disclosed herein can be used for either the primary or secondary polymer; for example, PAI, modified PAI, PI, PAN, etc. can be used as the primary polymer. Further, in addition to electrodes using two polymers as described above, only one polymer can be used that is only partially pyrolyzed. With respect to partial pyrolysis, in some embodiments the polymer weight loss is, for example, 20-80%, 30-70%, or around 50% of the maximum weight loss according to TGA (i.e., partially down the TGA curve). Also contemplated is the addition of polymer to infiltrate an anode after pyrolysis so that the final matrix is comprised of pyrolyzed and non-pyrolyzed matrix material. In some embodiments, not fully pyrolyzed means that if the pyrolysis temperature is increased, more weight loss of the polymeric binder may be seen.

In one embodiment, a battery electrode is disclosed comprising an electrode coating layer on a current collector, the electrode coating layer comprising silicon, an aqueous-based polymer, a secondary polymer and a conductive additive. The aqueous-based polymer and said secondary polymer may be at least partially pyrolyzed into carbon during making of the electrode, thus forming a pyrolyzed electrode; and the amount of silicon in the pyrolyzed electrode may be about 95-99% by weight, about 96-99% by weight or about 97-99% by weight. In some embodiments, the conductive additive is a carbon additive, which may be a 1D or 2D carbon structure. The 1D or 2D carbon structure may be single-walled carbon nanotubes (SWCNT), multi-walled carbon nanotubes (MWCNT), carbon nanofibers, or crosslinked carbon nanotubes (CCN). In some embodiments, the aqueous-based polymer comprises polyimides, polyamideimides, phenolic resins, polysiloxanes, polyurethanes, polyvinyls, acrylics, polysaccharides, and derivatives thereof. In other embodiments, the electrode coating layer may be modified by addition of a base. In further embodiments, the electrode coating layer is pyrolyzed at around 400 degrees Celsius. In some embodiments, the battery electrode is in a lithium ion battery.

In another embodiment, a method of forming a battery electrode is disclosed comprising creating an electrode coating layer from an electrode slurry comprising silicon, an aqueous-based polymer, a secondary polymer and a conductive additive; fabricating a battery electrode by coating the slurry on a current collector; and at least partially pyrolyzing said electrode coating layer into carbon, thus forming a pyrolyzed electrode. The amount of silicon in the pyrolyzed electrode may be about 95-99% by weight, about 96-99% by weight or about 97-99% by weight. In some embodiments, the conductive additive is a carbon additive, which may be a 1D or 2D carbon structure. The 1D or 2D carbon structure may be single-walled carbon nanotubes (SWCNT), multi-walled carbon nanotubes (MWCNT), carbon nanofibers, or crosslinked carbon nanotubes (CCN). In some embodiments, the aqueous-based polymer comprises polyimides, polyamideimides, phenolic resins, polysiloxanes, polyurethanes, polyvinyls, acrylics, polysaccharides, and derivatives thereof. In other embodiments, the electrode coating layer may be modified by addition of a base. In further embodiments, the electrode coating layer is pyrolyzed at around 400 degrees Celsius. In some embodiments, the battery electrode is in a lithium ion battery.

Combining high Si content, low temperature pyrolysis and 1D/2D conductive additives in an electrode may have one or more of the following benefits: 1) High Si anode (higher than 94% Si) have the advantages including better cycle life, lower expansion, etc. 2) Compared with high temperature pyro (higher than 600° C.), lowering the pyrolysis temperature and incorporating a secondary polymer such as PEO can improve the adhesion and flexibility of the anode. 3) Introducing 1D or 2D carbon additives compensates for the loss the electrical conductivity of the anode from lower temperature pyrolysis while strengthens the continuous carbon network which benefits the both electron transfer and mechanical robustness of the anode.

As utilized herein the terms "circuits" and "circuitry" refer to physical electronic components (i.e. hardware) and any software and/or firmware ("code") which may configure the hardware, be executed by the hardware, and or otherwise be associated with the hardware. As used herein, for example, a particular processor and memory may comprise a first "circuit" when executing a first one or more lines of code and may comprise a second "circuit" when executing a second one or more lines of code. As utilized herein, "and/or" means any one or more of the items in the list joined by "and/or". As an example, "x and/or y" means any element of the three-element set {(x), (y), (x, y)}. In other words, "x and/or y" means "one or both of x and y". As another example, "x, y, and/or z" means any element of the seven-element set {(x), (y), (z), (x, y), (x, z), (y, z), (x, y, z)}. In other words, "x, y and/or z" means "one or more of x, y and z". As utilized herein, the term "exemplary" means serving as a non-limiting example, instance, or illustration. As utilized herein, the terms "e.g.," and "for example" set off lists of one or more non-limiting examples, instances, or illustrations. As utilized herein, a battery, circuitry, or a device is "operable" to perform a function whenever the battery, circuitry, or device comprises the necessary hardware and code (if any is necessary) or other elements to perform the function, regardless of whether performance of the function is disabled or not enabled (e.g., by a user-configurable setting, factory trim, configuration, etc.).

While the present invention has been described with reference to certain embodiments, it will be understood by those skilled in the art that various changes may be made and equivalents may be substituted without departing from the scope of the present invention. In addition, many modifications may be made to adapt a particular situation or material to the teachings of the present invention without departing from its scope. Therefore, it is intended that the present invention not be limited to the particular embodiment disclosed, but that the present invention will include all embodiments falling within the scope of the appended claims.

What is claimed is:

1. A pyrolyzed battery electrode comprising:
   a pyrolyzed electrode coating layer on a current collector, the pyrolyzed electrode coating layer formed from an electrode coating layer comprising silicon, a water soluble polymer, a secondary polymer and a conductive additive;
   wherein said water soluble polymer and said secondary polymer are at least partially pyrolyzed into carbon during making of the electrode, thus forming said pyrolyzed electrode coating layer; and
   wherein the amount of silicon in the pyrolyzed electrode coating layer is about 95-99% by weight.

2. The pyrolyzed battery electrode according to claim 1, wherein the amount of silicon in the pyrolyzed electrode coating layer is about 96-99% by weight.

3. The pyrolyzed battery electrode according to claim 2, wherein the amount of silicon in the pyrolyzed electrode coating layer is about 97-99% by weight.

4. The pyrolyzed battery electrode according to claim 1, wherein said conductive additive is a carbon additive.

5. The pyrolyzed battery electrode according to claim 4, wherein said carbon additive is single-walled carbon nanotubes (SWCNT), multi-walled carbon nanotubes (MWCNT), carbon nanofibers, or crosslinked carbon nanotubes (CCN).

6. The pyrolyzed battery electrode according to claim 1, wherein said water soluble polymer is selected from the group consisting of polyimides, polyamideimides, phenolic resins, polysiloxanes, polyurethanes, polyvinyls, acrylics, polysaccharides, and derivatives thereof.

7. The electrode according to claim 1, wherein said electrode coating layer further comprises a base.

8. The pyrolyzed battery electrode according to claim 1, which is pyrolyzed at a temperature between about 400-500 degrees Celsius.

9. A lithium ion battery, comprising a pyrolyzed battery electrode according to claim 1.

10. A method of forming a pyrolyzed battery electrode comprising a pyrolyzed electrode coating layer on a current collector, the method comprising:
    creating an electrode slurry comprising silicon, an water soluble polymer, a secondary polymer and a conductive additive;
    fabricating a battery electrode by coating the slurry on a current collector to form an electrode coating layer; and
    at least partially pyrolyzing said electrode coating layer into carbon, thus forming a pyrolyzed electrode coating layer;
    wherein the amount of silicon in the pyrolyzed electrode coating layer is about 95-99% by weight.

11. The method according to claim 10, wherein the amount of silicon in the pyrolyzed electrode coating layer is about 96-99% by weight.

12. The method according to claim 11, wherein the amount of silicon in the pyrolyzed electrode coating layer is about 97-99% by weight.

13. The method according to claim 10, wherein said conductive additive is a carbon additive.

14. The method according to claim 13, wherein said carbon additive is single-walled carbon nanotubes (SWCNT), multi-walled carbon nanotubes (MWCNT), carbon nanofibers, or crosslinked carbon nanotubes (CCN).

15. The method according to claim 10, wherein said water soluble polymer is selected from the group consisting of polyimides, polyamideimides, phenolic resins, polysiloxanes, polyurethanes, polyvinyls, acrylics, polysaccharides, and derivatives thereof.

16. The method according to claim 10, wherein said electrode coating layer further comprises a base.

17. The method according to claim 10, wherein said at least partially pyrolyzing is carried out at a temperature between about 400-500 degrees Celsius.

* * * * *